(12) United States Patent
Nadaoka et al.

(10) Patent No.: US 10,519,623 B2
(45) Date of Patent: Dec. 31, 2019

(54) STAND OF FRONT LOADER, FRONT LOADER, AND WORK VEHICLE WITH SUPPORTING-TIME GUIDING HOLE

(71) Applicant: Kubota Corporation, Osaka (JP)

(72) Inventors: Ryuichi Nadaoka, Osaka (JP); Yuta Ozeki, Osaka (JP); Koshiro Hirakawa, Osaka (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 16/381,820

(22) Filed: Apr. 11, 2019

(65) Prior Publication Data

US 2019/0323202 A1 Oct. 24, 2019

(30) Foreign Application Priority Data

Apr. 19, 2018 (JP) .................................. 2018-80330

(51) Int. Cl.
*E02F 3/627* (2006.01)
*E02F 3/96* (2006.01)
*E02F 3/36* (2006.01)

(52) U.S. Cl.
CPC ............ *E02F 3/6273* (2013.01); *E02F 3/968* (2013.01); *E02F 3/3695* (2013.01)

(58) Field of Classification Search
CPC ........ E02F 3/6273; E02F 3/968; E02F 3/3695
See application file for complete search history.

(56) References Cited

U.S. PATENT DOCUMENTS

| | | | | |
|---|---|---|---|---|
| 4,275,984 A | * | 6/1981 | Lenertz | E02F 3/968 172/274 |
| 4,337,015 A | * | 6/1982 | Friesen | B62D 49/02 172/274 |
| 6,231,295 B1 | * | 5/2001 | Girstenbrei | E02F 3/6273 172/274 |
| 2011/0140402 A1 | * | 6/2011 | Lanting | E02F 3/968 280/763.1 |
| 2011/0318154 A1 | * | 12/2011 | Faivre | E02F 3/6273 414/685 |
| 2016/0348334 A1 | * | 12/2016 | Martinez | E02F 3/3627 |

FOREIGN PATENT DOCUMENTS

| | | |
|---|---|---|
| DE | 20320795 U1 | 3/2005 |
| JP | 11243713 A * | 9/1999 ............ E02F 3/6273 |
| JP | 2000-110190 A | 4/2000 |

(Continued)

OTHER PUBLICATIONS

Extended European Search Report issued in corresponding European Application No. 19169342.3, dated Sep. 27, 2019 (15 pages).

*Primary Examiner* — Gerald McClain
(74) *Attorney, Agent, or Firm* — Osha Liang LLP

(57) ABSTRACT

A stand of a front loader includes: a main body that is disposed on a boom and swings between a supporting position in which the main body supports a front loader and a storage position in which the main body is stored; a grounding-member swing shaft that is disposed on the main body and engages with the boom to hold the main body in the storage position; a swinging member swingably disposed on the boom; and an engagement lever disposed on the swinging member, wherein the main body has a guiding hole that guides the engagement lever to regulate a swinging range of the main body.

8 Claims, 44 Drawing Sheets

(56) References Cited

FOREIGN PATENT DOCUMENTS

| JP | 2000110190 | A | * | 4/2000 | | |
|---|---|---|---|---|---|---|
| JP | 2000170196 | A | * | 6/2000 | ............ | E02F 3/6273 |
| JP | 2004308161 | A | * | 11/2004 | ............ | E02F 3/6273 |
| JP | 2010-265674 | A | | 11/2010 | | |
| JP | 2010265674 | A | * | 11/2010 | | |

* cited by examiner

STAND OF FRONT LOADER, FRONT LOADER, AND WORK VEHICLE WITH SUPPORTING-TIME GUIDING HOLE

BACKGROUND

Technical Field

The present invention relates to technology of a stand of a front loader that is mounted on a work vehicle such as a tractor, a front loader, and a work vehicle.

Description of Related Art

Conventionally, technology relating to a stand of a front loader that is mounted on a work vehicle such as a tractor is well known. This technology is taught in, for example, patent literature 1.

Patent literature 1 teaches a stand for causing a front loader to stand independently when removed from a work vehicle. This stand is connected to a boom in a swingable manner and can be switched between a supporting attitude of being able to support the boom and a storage attitude of being stored in the boom.

However, to hold the stand taught in patent literature 1 in the supporting attitude or the storage attitude, the stand must be fixed in each attitude using a fixing pin. That is, when switching the attitude of the stand, a worker must pull out and insert the fixing pin. In this manner, the stand taught in patent literature 1 has room for improvement in that work of switching the attitudes is cumbersome, preventing the stand from being easily used.

CITATION LIST

Patent Literature

[Patent Literature 1] JP 2000-110190 A

SUMMARY

One or more embodiments of the present invention provide a stand of a front loader, a front loader, and a work vehicle that can be easily used.

Next, embodiments of the present invention are described.

That is, in one or more embodiments, equipped are a main-body portion that is provided on a boom and can swing between a supporting position of being able to support a front loader and a storage position of being stored, a storage-position holding portion that is provided on the main-body portion and can hold the main-body portion in the storage position by engaging with the boom, a swinging portion that is provided in a swingable manner on the boom, a guided portion that is provided on the swinging portion, and a guiding portion that is provided on the main-body portion and regulates a swinging range of the main-body portion by guiding the guided portion.

In one or more embodiments, the swinging portion can change a length thereof from a swing center thereof relative to the boom to the guided portion.

In one or more embodiments, further equipped is a supporting-position holding portion that is provided on the main-body portion and can hold the main-body portion in the supporting position by engaging with the guided portion when the main-body portion swings to the supporting position.

In one or more embodiments, the guided portion can move in an engaging direction of engaging with the supporting-position holding portion and a releasing direction of releasing the engagement with the supporting-position holding portion, and further equipped is a biasing member that biases the guided portion in the engaging direction.

In one or more embodiments, the supporting-position holding portion is formed as a long hole extending along a line that does not pass through a swing center of the main-body portion when viewed from a swing-shaft direction of the main-body portion.

In one or more embodiments, the guiding portion is equipped with a supporting-time guiding portion that is a portion that guides the guided portion when the main-body portion swings to the supporting position and extends along the line that does not pass through the swing center of the main-body portion when viewed from the swing-shaft direction of the main-body portion.

In one or more embodiments, the stand of a front loader is provided as at least a pair of left and right stands, and the supporting-position holding portions of the pair of left and right stands are respectively formed on side surfaces of the main-body portion that are in the same direction.

In one or more embodiments, further equipped is a grounding portion that is provided on the main-body portion and contacts the ground when supporting the front loader, wherein the storage-position holding portion connects the grounding portion to the main-body portion in a swingable manner, is provided on the main-body portion in a slidable manner, and, by sliding, can switch between a state of engaging with the boom and a state where the engagement with the boom is released.

In one or more embodiments, equipped is the stand of a front loader of any one of claims 1 to 8.

In one or more embodiments, equipped is the front loader of claim 9.

One or more embodiments of the present invention exhibit the following effects.

In one or more embodiments, the stand can be easily used.

In one or more embodiments, an attitude of the main-body portion can be adjusted according to a shape of the front loader, an attachment of the front loader, and the like.

In one or more embodiments, because the main-body portion can be held in the supporting position as well, the front loader can be stably supported.

In one or more embodiments, the main-body portion can be easily held in the supporting position. That is, the guided portion can be easily engaged with the supporting-position holding portion by a biasing force of the biasing member. Moreover, the engagement of the guided portion can be easily released by moving the guided portion in the releasing direction against the biasing force of the biasing member.

In one or more embodiments, up-and-down movement (change in attitude) when detaching and attaching the front loader can be permitted, enabling the front loader to be detached and attached easily.

In one or more embodiments, up-and-down movement (change in attitude) of the front loader when holding the main-body portion in the supporting position can be more readily permitted, enabling the front loader to be detached and attached easily.

In one or more embodiments, a state of the pair of stands (specifically, whether the main-body portion is held in the supporting position) can be confirmed at once by viewing the pair of stands from the same direction (one side) relative to the front loader, enabling confirmation work to be easily performed.

In one or more embodiments, the stand can be easily used. That is, the main-body portion can be held in the storage position and this holding can be released by a simple operation (sliding the storage-position holding portion). Moreover, a configuration can be simplified by (also) using the storage-position holding portion that holds the main-body portion in the storage position as a swing-shaft portion of the grounding portion.

In one or more embodiments, the stand can be easily used.

In one or more embodiments, the stand can be easily used.

DETAILED DESCRIPTION OF EMBODIMENTS

In the following description, the directions indicated by the arrows U, D, F, B, L, and R in the diagrams are respectively defined as up, down, front, back, left, and right.

Figure 1:
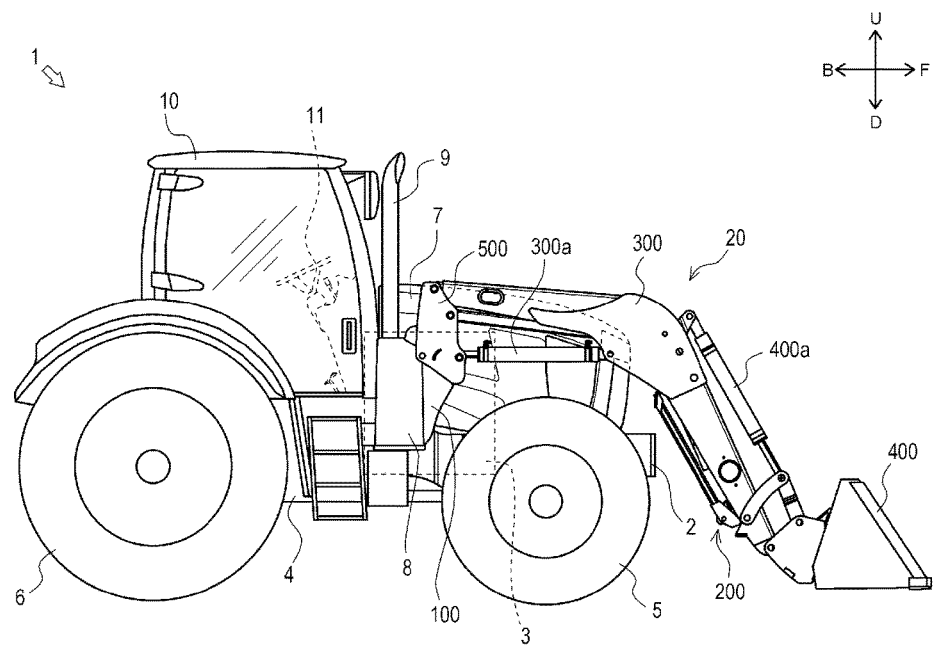
FIG. 1 is a side view illustrating an overall configuration of a tractor mounted with a front loader of one or more embodiments of the present invention.
Figure 2:
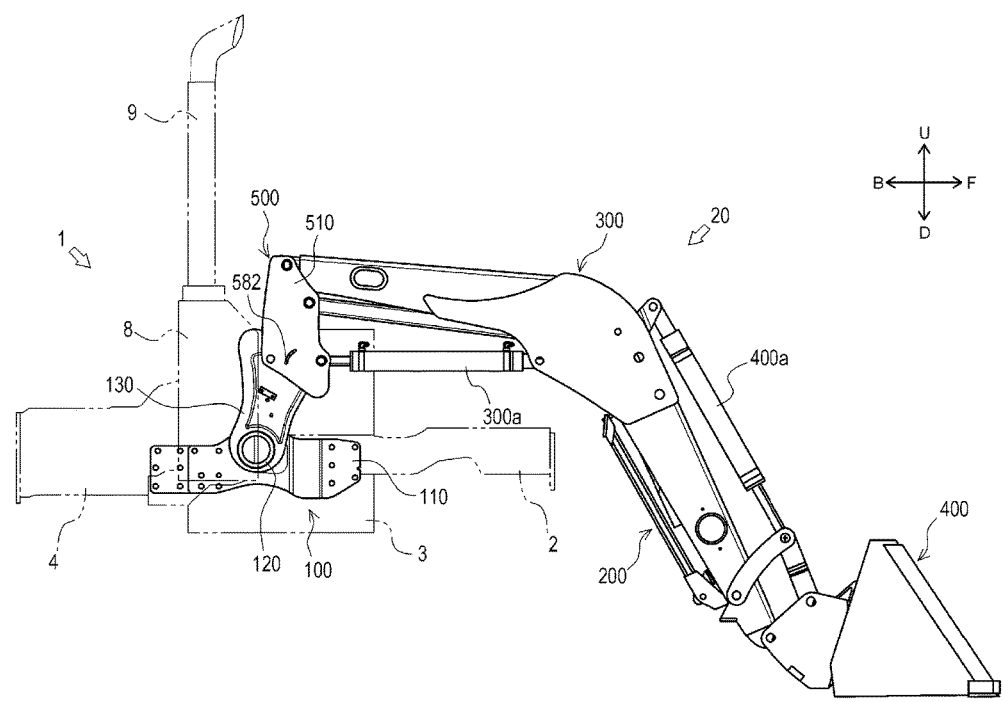
FIG. 2 is a side view of the front loader, which is installed on a body frame and the like, according to one or more embodiments.

First, an overall configuration of a vehicle body 1 of a tractor provided with a front loader 20 of one or more embodiments of the present invention is described using FIGS. 1 and 2.

The tractor is principally equipped with a body frame 2, an engine 3, a transmission case 4, a front wheel 5, a back wheel 6, a bonnet 7, an SCR unit 8, a muffler 9, a cabin 10, a steering wheel 11, and the front loader 20.

The body frame 2 is a frame-shaped member formed by appropriately combining a plurality of plates. The body frame 2 is formed in a substantially rectangular shape in a plan view. The body frame 2 is disposed in a front portion of the vehicle body 1, with a longitudinal direction thereof in a front-back direction. The engine 3 is fixed to a back portion of the body frame 2. The transmission case 4 is fixed to a back portion of the engine 3. A front portion of the body frame 2 is supported by a pair of left and right front wheels 5 via a front axle mechanism (not illustrated). A back portion of the transmission case 4 is supported by a pair of left and right back wheels 6 via a rear axle mechanism (not illustrated). The engine 3 is covered by the bonnet 7.

The SCR (selective catalytic reduction) unit 8, which is for purifying exhaust gas of the engine 3, is disposed to the right of the bonnet 7. The muffler 9, which exhausts the exhaust gas of the engine 3, is disposed above the SCR unit 8. The SCR unit 8 and the muffler 9 are fixed to the transmission case 4.

Power of the engine 3 is made transmittable to the front wheels 5 via the front axle mechanism and the back wheels 6 via the rear axle mechanism upon passing through a transmission (not illustrated) stored in the transmission case 4. The front wheels 5 and the back wheels 6 are rotationally driven by the power of the engine 3, enabling the tractor to travel.

The cabin 10 is provided behind the engine 3. An occupant space occupied by a driver is formed inside the cabin 10. The steering wheel 11, which is for adjusting a steering angle of the front wheels 5; various controls (not illustrated); a seat for the driver to sit on (not illustrated); and the like are disposed in this occupant space.

The front loader 20 is mounted on the front portion of the vehicle body 1. The front loader 20 is principally equipped with a pair of left and right main frames 100, a pair of left and right subframe units 500, a pair of left and right booms 300, a bucket 400, and a stand 200.

The main frames 100 are respectively fixed to the left and right of the vehicle body 1 (the body frame 2 and the transmission case 4). The subframe units 500 are detachably supported by an upper portion of each main frame 100. The booms 300 are rotatably supported by each subframe unit 500. The booms 300 are disposed so as to extend frontward and downward from the upper portions of the main frames 100. The bucket 400 is rotatably connected to a front end portion of the booms 300. The booms 300 can be rotated relative to the subframe units 500 by expanding and contracting a boom cylinder 300a. The bucket 400 can be rotated relative to the booms 300 by expanding and contracting a bucket cylinder 400a. In this manner, work such as moving dirt and sand can be performed by appropriately rotating the booms 300 and the bucket 400. Moreover, by using the stand 200, the front loader 20 can be made to stand independently upon being removed from the vehicle body 1.

Next, a detailed configuration of the main frame 100 is described using FIGS. 2 to 4 and 10.

The main frame 100, illustrated in FIG. 2, supports the subframe unit 500 that supports the boom 300. In other words, the main frame 100 supports the boom 300 via the subframe unit 500. The main frame 100 is principally equipped with a fixed frame 110, a connecting frame 120, and a supporting frame 130.

The fixed frame 110, illustrated in FIG. 2, is a portion that is fixed to the vehicle body 1. The fixed frame 110 is formed in a plate shape whose plate surface faces a left-right direction. The fixed frame 110 is fixed to the body frame 2 by a bolt or the like.

The connecting frame 120, illustrated in FIG. 2, connects the fixed frame 110 and the supporting frame 130, which is described below. The connecting frame 120 is formed in a substantially cylindrical shape whose axis is in the left-right direction. One end portion (left end) of the connecting frame 120 is inserted into the fixed frame 110 and appropriately fixed to the fixed frame 110 by welding.

Figure 3:
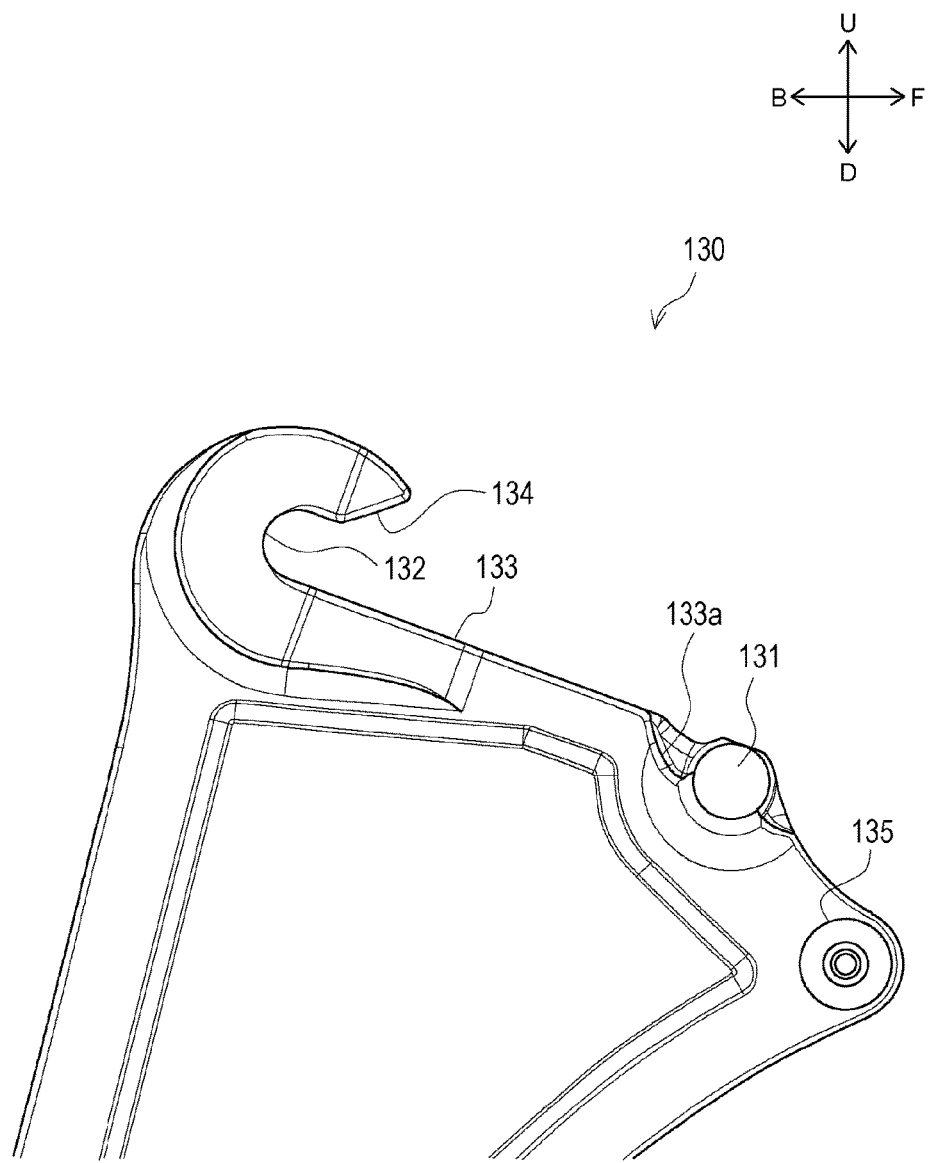
FIG. 3 is a right side view of an upper portion of a main frame according to one or more embodiments.

The supporting frame 130, illustrated in FIGS. 2 and 3, is a portion that supports the subframe unit 500. The supporting frame 130 is formed in a plate shape whose plate surface faces the left-right direction. The supporting frame 130 is disposed with a longitudinal direction thereof in an up-down direction. The connecting frame 120 is inserted into a lower portion of the supporting frame 130, and the supporting frame 130 and the connecting frame 120 are fixed by welding. The supporting frame 130 is formed with a main-frame-side pin 131, a main-frame-side hook 132, a main-frame-side lower slideway 133, a main-frame-side upper slideway 134, and a roller 135.

Figure 4:
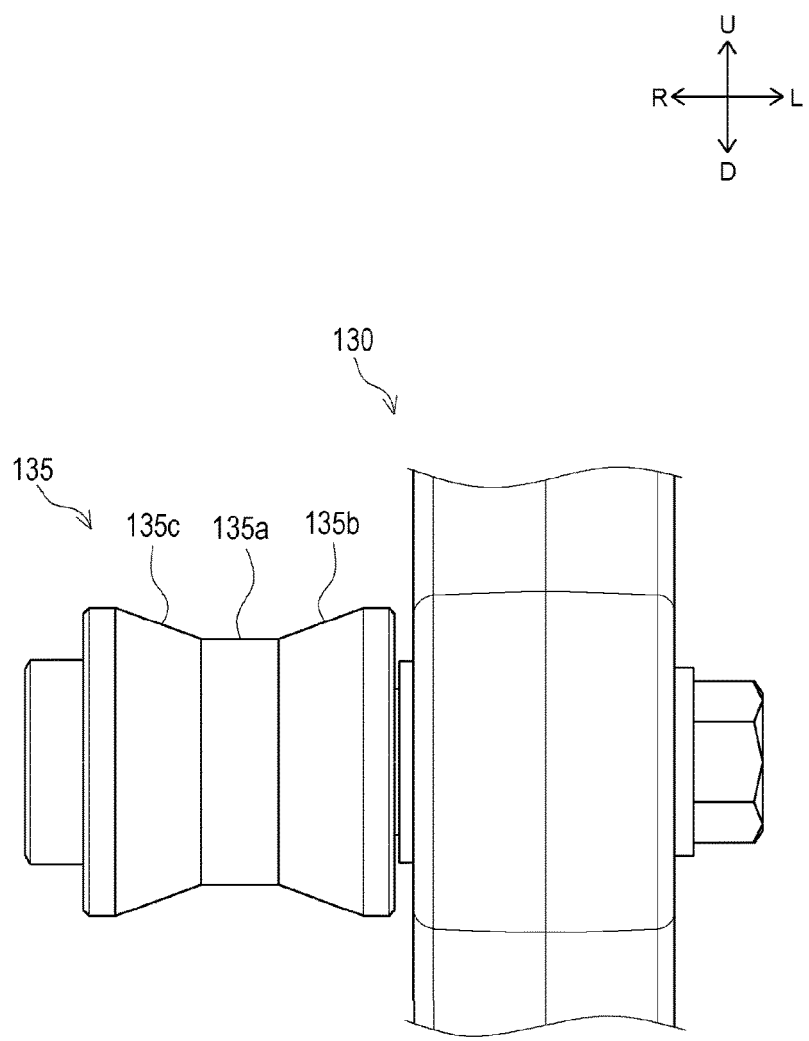
FIG. 4 is a front view of a roller installation portion of the main frame according to one or more embodiments.

Note that a pair of left and right supporting frames 130 is formed having left-right symmetry and is disposed in positions having left-right symmetry. FIGS. 3 and 4 illustrate the left supporting frame 130 among the pair of left and right supporting frames 130. Unless stated otherwise, described below is the left supporting frame 130, description of the right supporting frame 130 being omitted.

Figure 10:
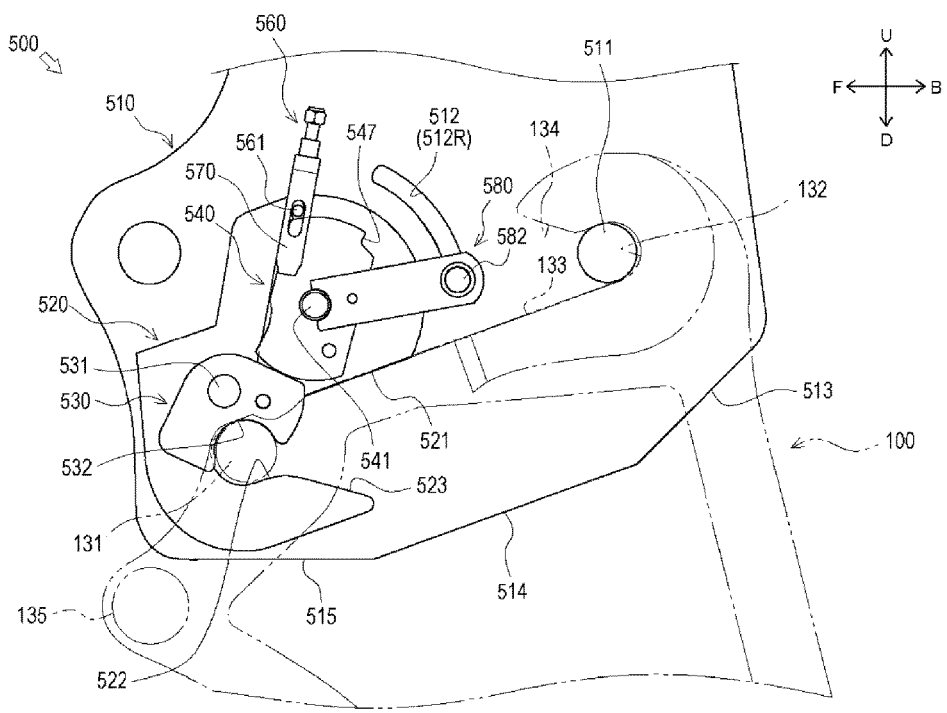
FIG. 10 is a left side view illustrating an attachment/detachment structure of the main frame and the subframe unit according to one or more embodiments.

The main-frame-side pin 131, illustrated in FIGS. 3 and 10, is a portion that is held by the subframe unit 500, which is described below (more specifically, a subframe-side hook 522 of a guide plate 520). The main-frame-side pin 131 is formed in an upper-front end portion of the supporting frame 130 and in a cylindrical shape whose axis is in the left-right direction. The main-frame-side pin 131 is formed protruding to the left and right from the supporting frame 130.

The main-frame-side hook 132, illustrated in FIGS. 3 and 10, is a portion that holds the subframe unit 500 that is described below (more specifically, a subframe-side pin 511 of a subframe 510). The main-frame-side hook 132 is formed to be substantially U-shaped, opening to the front in a side view (more specifically, frontward and downward), and can support the subframe-side pin 511, which is described below, from below. The main-frame-side hook 132 is formed in an upper-back end portion of the supporting frame 130 and above the main-frame-side pin 131.

The main-frame-side lower slideway 133, illustrated in FIG. 3, is for guiding the subframe unit 500 that is described below (more specifically, the subframe-side pin 511 of the subframe 510) to an installation position when mounting the subframe unit 500 on the main frame 100. The main-frame-side lower slideway 133 is formed in an upper end portion of the supporting frame 130 and in a flat shape having a surface facing substantially upward. More specifically, the main-frame-side lower slideway 133 is formed between the main-frame-side pin 131 and the main-frame-side hook 132 and as a frontwardly descending incline whose height in the up-down direction decreases in the course of heading frontward. The main-frame-side lower slideway 133 is not formed continuously to the main-frame-side pin 131, and a concave portion 133a is formed between the main-frame-side pin 131 and the main-frame-side lower slideway 133. By forming the concave portion 133a, deformation and damage of the main-frame-side pin 131 due to contact impact or the like at attachment/detachment can be prevented.

The main-frame-side upper slideway 134, illustrated in FIG. 3, is for guiding the subframe unit 500 that is described below (more specifically, the subframe-side pin 511 of the subframe 510) to the installation position when mounting the subframe unit 500 on the main frame 100. The main-frame-side upper slideway 134 is formed in a flat shape having a surface facing substantially downward so as to oppose the main-frame-side lower slideway 133. More specifically, the main-frame-side upper slideway 134 is formed so as to be continuous with an upper-front end portion of the main-frame-side hook 132 and as a backwardly descending incline whose height in the up-down direction decreases in the course of heading backward.

The roller 135, illustrated in FIGS. 3 and 4, is for guiding the subframe unit 500 that is described below to a vicinity of the installation position when mounting the subframe unit 500 on the main frame 100. The roller 135 is rotatably provided on an inner side of the supporting frame 130 (left-right central side of the vehicle body 1) with an axis thereof in the left-right direction. That is, at the left main frame 100, it is provided to the right of the supporting frame 130, and at the right main frame 100, it is provided to the left of the supporting frame 130. The roller 135 is provided in a front end portion of the supporting frame 130 and in front of and below the main-frame-side pin 131. More specifically, the roller 135 is provided so as to be positioned below a line connecting the main-frame-side pin 131 and the main-frame-side hook 132 in a side view. In this manner, the roller 135 is disposed in front of and below the main-frame-side pin 131, the main-frame-side hook 132, the main-frame-side lower slideway 133, and the main-frame-side upper slideway 134. The roller 135 is equipped with a roller central portion 135a, a roller proximal portion 135b, and a roller distal portion 135c.

The roller central portion 135a, illustrated in FIG. 4, is a portion configuring a left-right central portion of the roller 135. The roller central portion 135a is formed in a cylindrical shape whose axis is in the left-right direction. The roller central portion 135a is formed to have the same outer diameter across the left-right direction.

The roller proximal portion 135b, illustrated in FIG. 4, is a portion configuring a proximal portion (left portion) of the roller 135. The roller proximal portion 135b is formed to the left of and adjacent to the roller central portion 135a. The roller proximal portion 135b is formed in a truncated conical shape whose outer diameter gradually increases in the course of heading leftward.

The roller distal portion 135c, illustrated in FIG. 4, is a portion configuring a distal portion (right portion) of the roller 135. The roller distal portion 135c is formed to the right of and adjacent to the roller central portion 135a. The roller proximal portion 135b is formed in a truncated conical shape whose outer diameter gradually increases in the course of heading rightward.

In this manner, the roller 135 is formed in an hourglass shape whose central portion in a width direction (left-right direction) of the vehicle body 1 has a small diameter.

Next, a detailed configuration of the subframe unit 500 is described using FIGS. 5 to 13. Note that the pair of left and right subframe units 500 is formed having left-right symmetry; FIGS. 5 to 13 and FIGS. 14 to 16, which are described below, illustrate the left subframe unit 500 in the pair of left and right subframe units 500. Unless stated otherwise, described below is the left subframe unit 500, description of the right subframe unit 500 being omitted. Moreover, FIGS. 5 to 13 illustrates a state where the subframe unit 500 is mounted on the main frame 100 (mounted state); the following description is based on this mounted state.

The subframe unit 500 is a portion provided between the main frame 100 and the boom 300. An upper portion of the subframe unit 500 rotatably supports the boom 300 (see FIG. 2). The subframe unit 500 is equipped with the subframe 510, the guide plate 520, a thumb 530, a lock bar 540, a spring 550, a detent mechanism 560, a release arm 570, and an operation mechanism 580.

Figure 6:
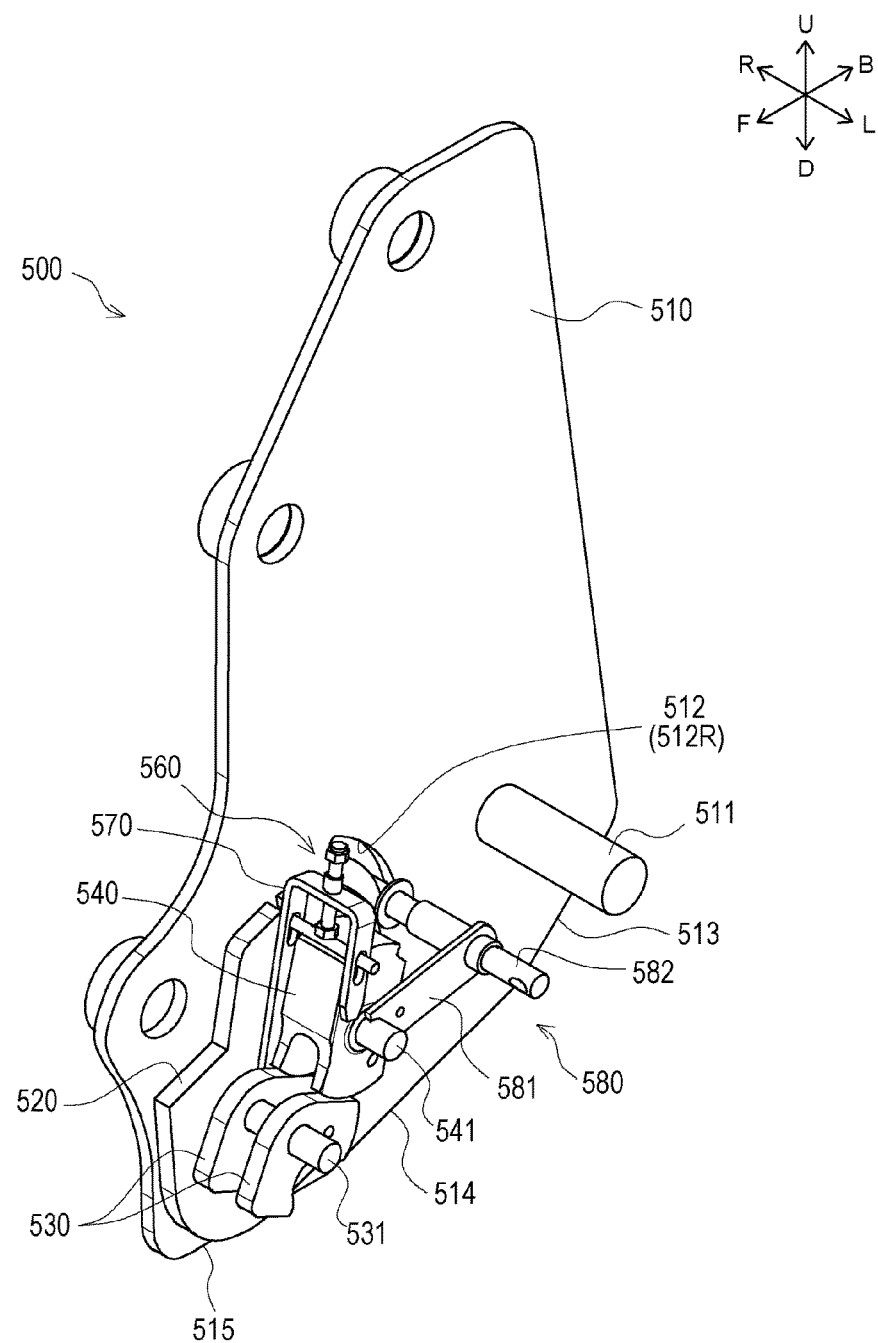
FIG. 6 is an upper-left perspective view of the subframe unit omitting illustration of a portion according to one or more embodiments.
Figure 7:
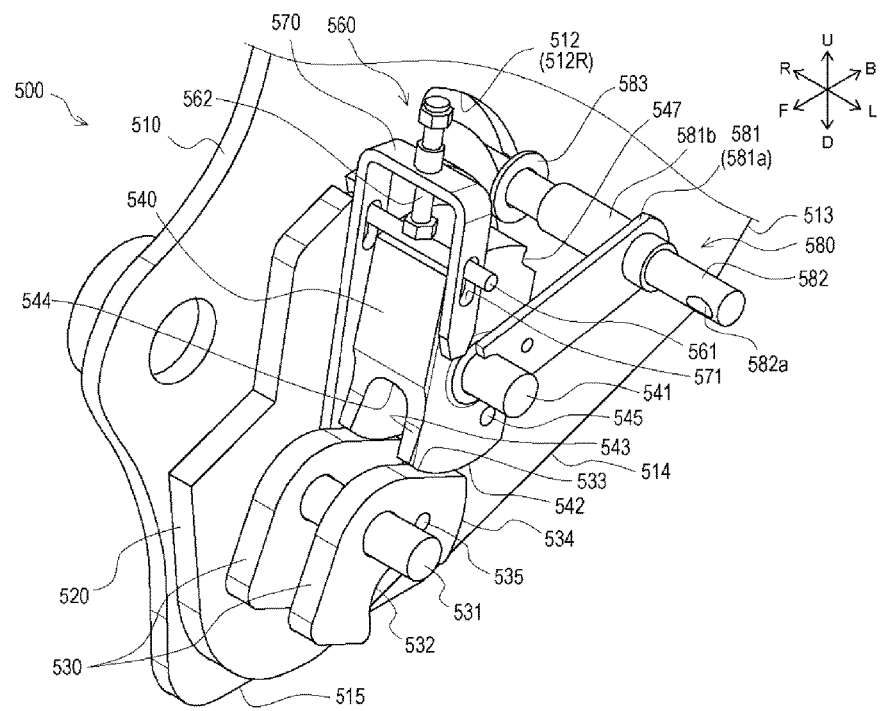
FIG. 7 is an upper-left perspective view of a principal portion of the subframe unit according to one or more embodiments.
Figure 8:
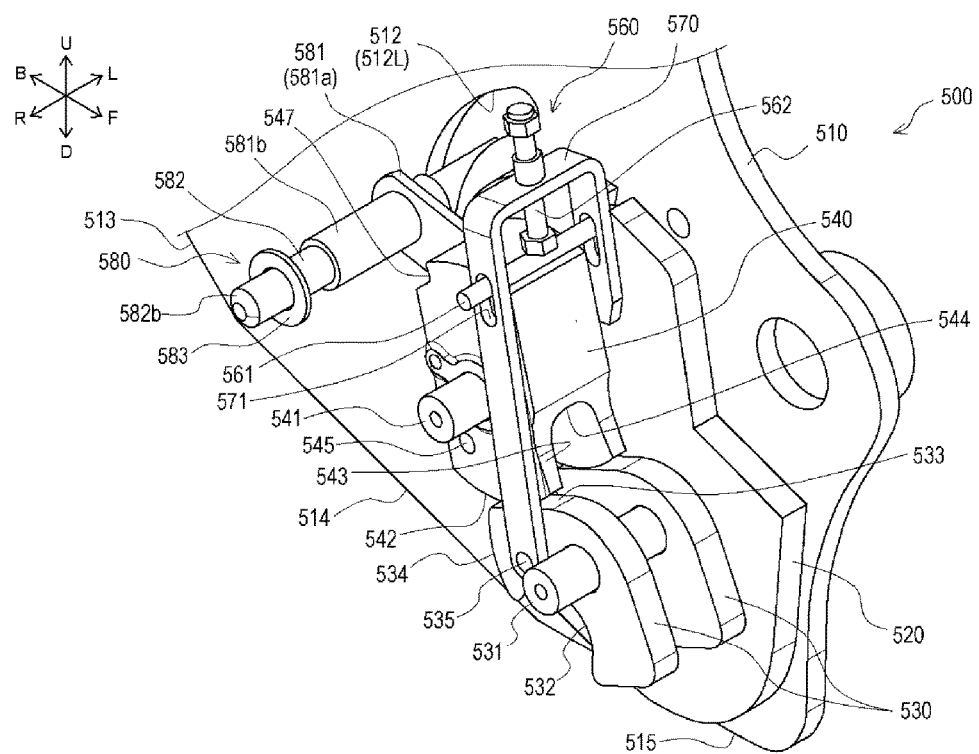
FIG. 8 is an upper-right perspective view of the principal portion of the subframe unit according to one or more embodiments.

The subframe 510, illustrated in FIGS. 5 to 9, is a portion configuring a right portion and a left portion of the subframe unit 500. The subframe 510 is formed in a plate shape whose plate surface faces the left-right direction. The subframe 510 is disposed with a longitudinal direction thereof in the up-down direction. A pair of left and right subframes 510 is provided, these being connected to each other by an appropriate member. Note that in FIGS. 6, 7, 9 to 12, 15, 16, 22, and 23, illustration of the left subframe 510 is omitted for convenience in description. Moreover, in FIG. 8, illustration of the right subframe 510 is omitted for convenience in description. The subframe 510 is formed with the subframe-side pin 511, a regulating hole 512, a subframe first lower surface 513, a subframe second lower surface 514, and a subframe third lower surface 515.

Figure 5:
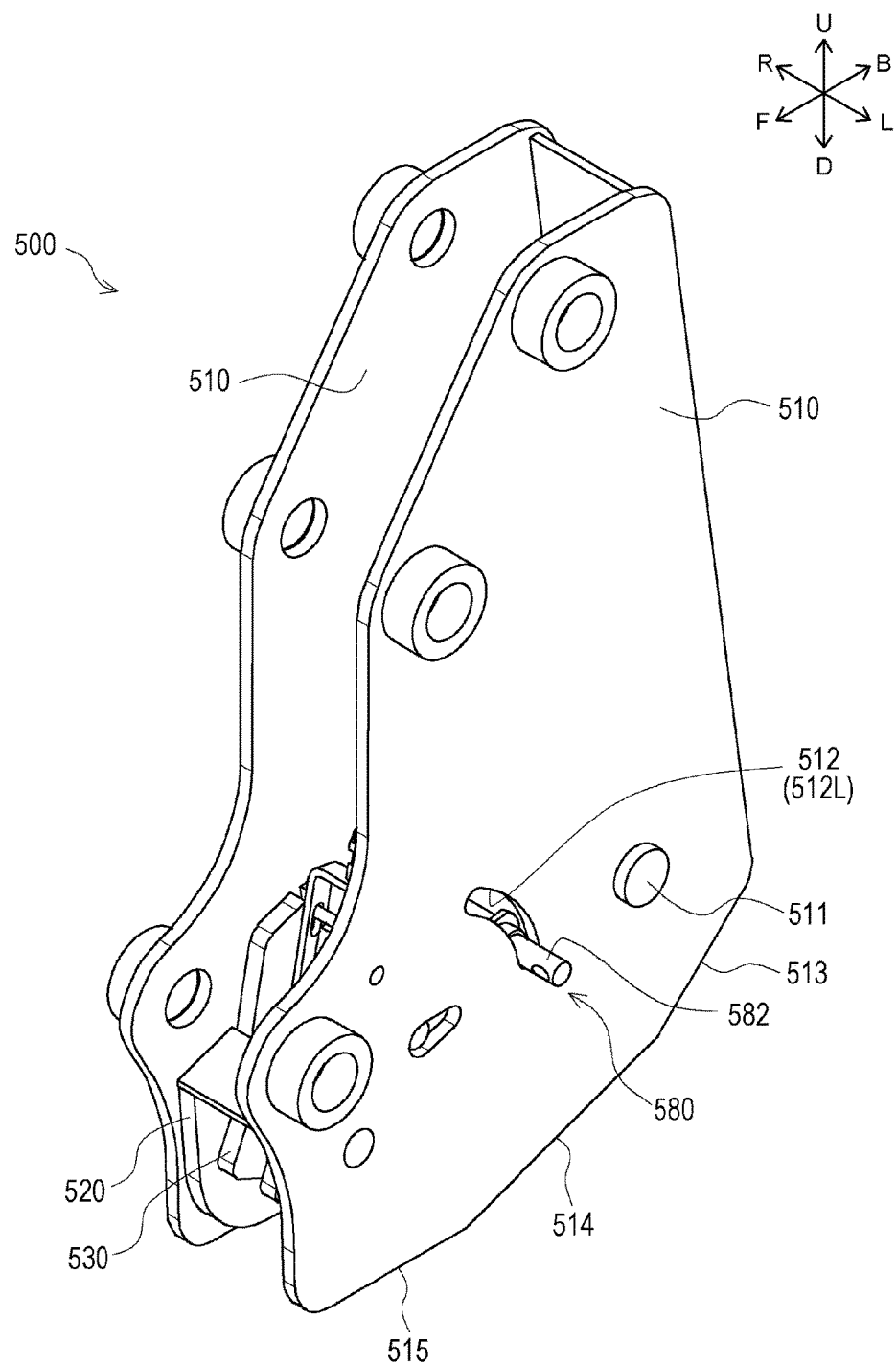
FIG. 5 is an upper-left perspective view of a subframe unit according to one or more embodiments.
Figure 9:
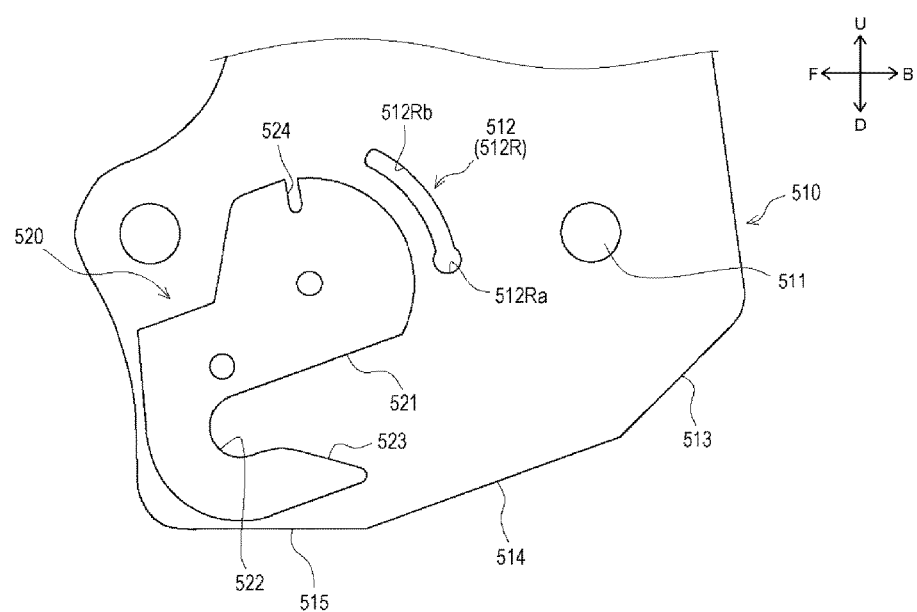
FIG. 9 is an enlarged left side view of a right subframe according to one or more embodiments.

The subframe-side pin 511, illustrated in FIGS. 5, 6, and 9, is a portion that is held by the main-frame-side hook 132 of the supporting frame 130 (see FIG. 3). The subframe-side pin 511 is formed in a cylindrical shape. The subframe-side pin 511 is fixed in a lower-back portion of the subframe 510 in a state of having an axis thereof in the left-right direction. The subframe-side pin 511 is provided between the pair of left and right subframes 510 so as to connect the pair of left and right subframes 510.

The regulating hole 512, illustrated in FIGS. 5 to 9, is for regulating an operation range of an operation lever 582 that is described below. The regulating hole 512 is formed so as to penetrate the subframe 510 in the left-right direction. The regulating hole 512 is formed in a partial ring shape of a central angle of about 50° around a swing center (swing shaft 541) of the lock bar 540, which is described below. The regulating hole 512 is formed behind and above the swing shaft 541 (see FIG. 11 and the like).

Furthermore, the regulating hole 512 formed in the subframe 510 on an outer side of the vehicle body 1 (in FIG. 5 and the like, a left side; also "regulating hole 512L" hereinbelow) is formed to have a constant width across its entirety. In contrast, the regulating hole 512 formed in the subframe 510 on an inner side of the vehicle body 1 (in FIG. 5 and the like, a right side; also "regulating hole 512R" hereinbelow) is formed so a width of a portion other than a lower end portion thereof is smaller than this lower end portion (see FIG. 9).

Specifically, a lower end portion 512Ra of the regulating hole 512R is formed in a substantially circular shape. A width of this lower end portion 512Ra (a diameter of the circle) is formed to be substantially identical to the width of the regulating hole 512L. The width of the portion other than the lower end portion of the regulating hole 512R (arc-shaped portion from an upper end portion to a vicinity of the lower end portion; "arc portion 512Rb") is formed to be smaller (narrower) than the width of the regulating hole 512L.

The subframe first lower surface 513, illustrated in FIGS. 5, 9, and 10, configures a back portion of a lower surface of the subframe 510. The subframe first lower surface 513 is formed inclined frontward and downward. An incline angle of the subframe first lower surface 513 is formed to be, for example, about 45 degrees.

The subframe second lower surface 514, illustrated in FIGS. 5, 9, and 10, configures a front-back intermediate portion of the lower surface of the subframe 510. The subframe second lower surface 514 is formed continuously from and in front of the subframe first lower surface 513. The subframe second lower surface 514 is formed inclined frontward and downward more gently than the subframe first lower surface 513. An incline angle of the subframe second lower surface 514 is formed to be, for example, about 20 degrees.

The subframe third lower surface 515, illustrated in FIGS. 5, 9, and 10, configures a front portion of the lower surface of the subframe 510. The subframe third lower surface 515 is formed continuously from and in front of the subframe second lower surface 514. The subframe third lower surface 515 is formed at an incline angle that is closer to horizontal than the subframe second lower surface 514 and is formed to be, for example, horizontal (having an incline angle of 0 degrees). The incline angle of the subframe third lower surface 515 is formed to differ from incline angles of a subframe-side upper slideway 521 and a subframe-side lower slideway 523 that are described below (see FIG. 9). Moreover, the incline angle of the subframe third lower surface 515 is formed to differ from incline angles of the main-frame-side lower slideway 133 and the main-frame-side upper slideway 134 (see FIG. 10).

The guide plate 520, illustrated in FIGS. 5 to 9, guides the main frame 100 to the installation position when mounting the subframe unit 500 on the main frame 100 and holds the main frame 100 in this installation position. The guide plate 520 is formed in a plate shape whose plate surface faces the left-right direction. A pair of left and right guide plates 520 is provided. The guide plates 520 are respectively fixed to inner sides of the pair of left and right subframes 510. Note that as with the subframe 510, illustration of the guide plate 520 is omitted as appropriate according to the drawing for convenience in description. The guide plate 520 is formed with the subframe-side upper slideway 521, the subframe-side hook 522, the subframe-side lower slideway 523, and a notch portion 524.

The subframe-side upper slideway 521, illustrated in FIGS. 9 and 10, is for guiding the main-frame-side pin 131 to the installation position when mounting the subframe unit 500 on the main frame 100. The subframe-side upper slideway 521 is formed in a lower end portion of the guide plate 520 and in a flat shape having a surface facing substantially downward. More specifically, the subframe-side upper slideway 521 is formed as a frontwardly descending incline whose height in the up-down direction decreases in the course of heading frontward. The subframe-side upper slideway 521 is formed to be parallel to the main-frame-side lower slideway 133. The subframe-side upper slideway 521 is formed to extend from a back end portion of the guide plate 520 to a vicinity of a front end portion thereof (more specifically, the subframe-side hook 522, which is described below).

The subframe-side hook 522, illustrated in FIGS. 9 and 10, is a portion that holds the main-frame-side pin 131 of the main frame 100. The subframe-side hook 522 is formed in a lower-front portion of the guide plate 520. The subframe-side hook 522 is formed to be substantially U-shaped, opening to the back in a side view (more specifically, backward and upward), and can support the main-frame-side pin 131, which is described below, from below. The subframe-side hook 522 is connected to a front end portion of the subframe-side upper slideway 521.

The subframe-side lower slideway 523, illustrated in FIGS. 9 and 10, is for guiding the main-frame-side pin 131 to the installation position when mounting the subframe unit 500 on the main frame 100. The subframe-side lower slideway 523 is formed in a flat shape having a surface facing substantially upward so as to oppose the subframe-side upper slideway 521. More specifically, the subframe-side lower slideway 523 is formed so as to be continuous with a back end portion of the subframe-side hook 522 and as a backwardly descending incline whose height in the up-down direction decreases in the course of heading backward.

The notch portion 524, illustrated in FIG. 9, regulates movement of a detent pin 561 that is described below. The notch portion 524 is formed so an upper end portion of the guide plate 520 is opened. The notch portion 524 is formed so as to extend downward from the upper end portion of the guide plate 520.

The thumb 530, illustrated in FIGS. 6 to 8 and 10 to 12, holds the main-frame-side pin 131 in an immovable manner in the subframe-side hook 522 (prevents the main-frame-side pin 131 from separating from the subframe-side hook 522). The thumb 530 is provided between the pair of left and right guide plates 520. A pair of left and right thumbs 530 is provided. The thumb 530 is formed to be substantially L-shaped in a side view. The thumb 530 is principally equipped with a swing shaft 531, an engaging groove 532, a thumb-side first abutting surface 533, a thumb-side second abutting surface 534, and a connecting shaft 535.

The swing shaft 531 supports the thumb 530 in a swingable manner. An axis of the swing shaft 531 is disposed in the left-right direction. The swing shaft 531 is disposed above the subframe-side hook 522. Both ends of the swing shaft 531 are respectively fixed to the left and right guide plates 520. The swing shaft 531 is inserted into a front-back central portion of the pair of left and right thumbs 530.

The engaging groove 532, illustrated in FIGS. 7, 8, and 10 to 12, is a portion that engages with the main-frame-side pin 131. The engaging groove 532 is formed in a lower and front-back central portion of the thumb 530. The engaging groove 532 is formed in a semicircular arc shape opening downward in a side view. The engaging groove 532 is formed so a diameter thereof is substantially identical to a diameter of the main-frame-side pin 131 in a side view.

The thumb-side first abutting surface 533, illustrated in FIGS. 7, 8, 11, and 12, is a back side surface of the thumb 530. The thumb-side first abutting surface 533 is formed in a flat shape with a backward- and upward-facing surface.

The thumb-side second abutting surface 534, illustrated in FIGS. 7, 8, 11, and 12, is a back side surface of the thumb 530. The thumb-side second abutting surface 534 is formed in a curved shape with a backward- and downward-facing surface. More specifically, the thumb-side second abutting surface 534 is formed in an arc shape whose center is the swing shaft 531 in a side view.

The connecting shaft 535, illustrated in FIGS. 7, 8, 11, and 12, connects the pair of left and right thumbs 530. An axis of the connecting shaft 535 is disposed in the left-right direction. The connecting shaft 535 is disposed behind and below the swing shaft 531. Both ends of the connecting shaft 535 are respectively fixed to the pair of left and right thumbs 530. This connects the pair of left and right thumbs 530 to each other, making them able to swing integrally.

The lock bar 540, illustrated in FIGS. 6 to 8 and 10 to 12, regulates swinging of the thumb 530. The lock bar 540 is provided between the pair of left and right guide plates 520. The lock bar 540 is formed in an oval shape having a pair of arcs in a side view. The lock bar 540 is disposed behind and above the thumb 530. The lock bar 540 is principally equipped with the swing shaft 541, a lock-bar-side first abutting surface 542, a lock-bar-side second abutting surface 543, a groove portion 544, a connecting shaft 545, a slideway 546, and a locked portion 547.

The swing shaft 541 supports the lock bar 540 in a swingable manner. An axis of the swing shaft 541 is disposed in the left-right direction. Both ends of the swing shaft 541 are respectively fixed to the left and right guide plates 520. The swing shaft 541 is inserted into a central portion of the lock bar 540.

The lock-bar-side first abutting surface 542, illustrated in FIGS. 7, 8, 11, and 12, is a front side surface of the lock bar 540. The lock-bar-side first abutting surface 542 is formed in a curved shape with a frontward- and downward-facing surface. More specifically, the lock-bar-side first abutting surface 542 is formed in an arc shape whose center is the swing shaft 541 in a side view.

The lock-bar-side second abutting surface 543, illustrated in FIGS. 7, 8, 11, and 12, is a front side surface of the lock bar 540. The lock-bar-side second abutting surface 543 is formed in a flat shape with a frontward- and upward-facing surface.

Figure 12:
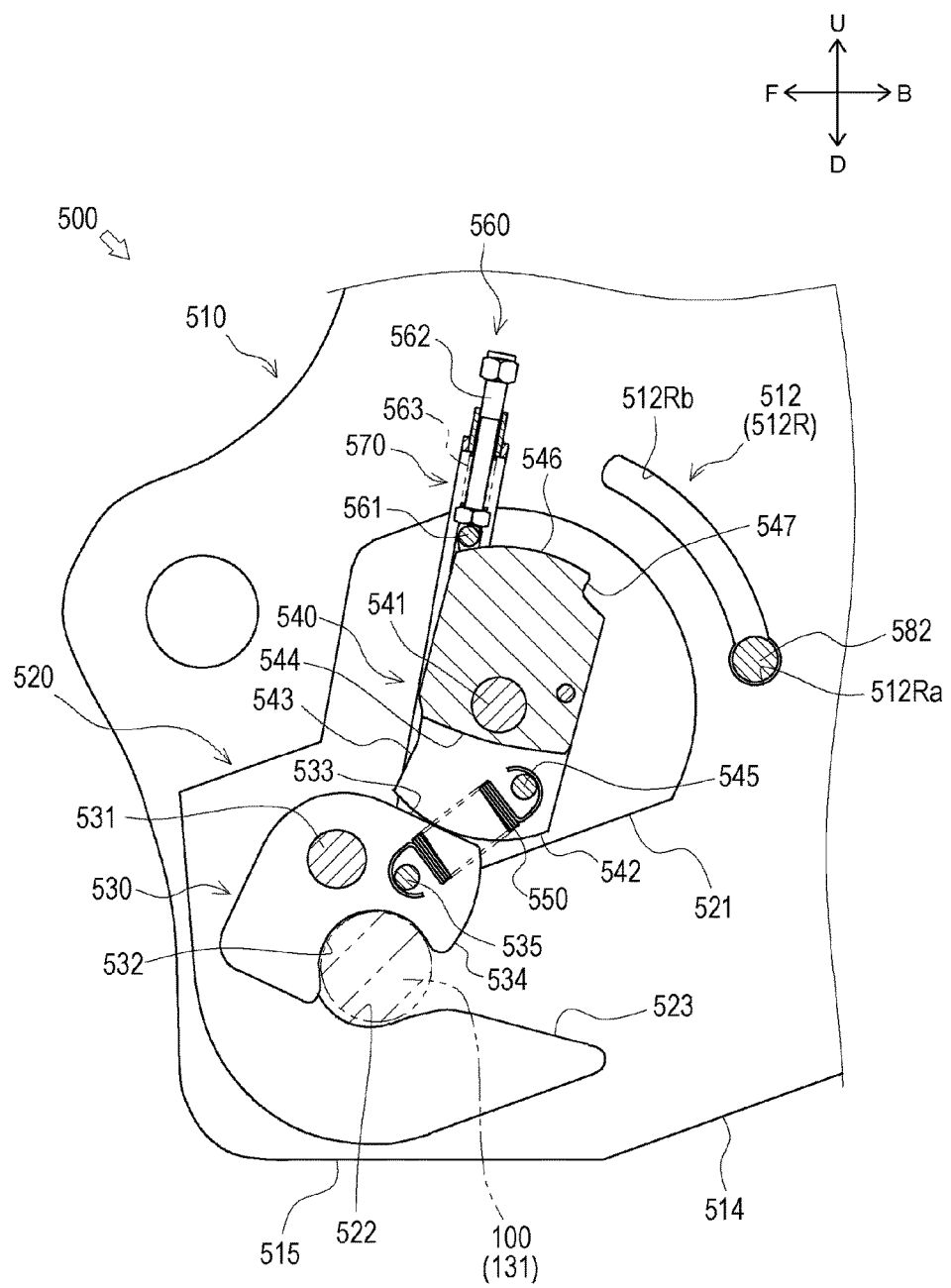
FIG. 12 is a left-side-view cross section illustrating the portion of the subframe unit in the state of being held by the main frame according to one or more embodiments.

The groove portion 544, illustrated in FIGS. 7, 8, and 12, is formed in a lower portion of the lock bar 540. More specifically, the groove portion 544 is formed so a left-right center of the lower portion of the lock bar 540 is upwardly concave (toward a swing-shaft 541 side).

The connecting shaft 545, illustrated in FIGS. 7, 8, 11, and 12, has the spring 550, which is described below, connected thereto. An axis of the connecting shaft 545 is disposed in the left-right direction. The connecting shaft 545 is fixed to a lower-back portion of the lock bar 540 (vicinity of a back end portion of the groove portion 544). The connecting shaft 545 is disposed spanning the groove portion 544 from left to right.

Figure 11:
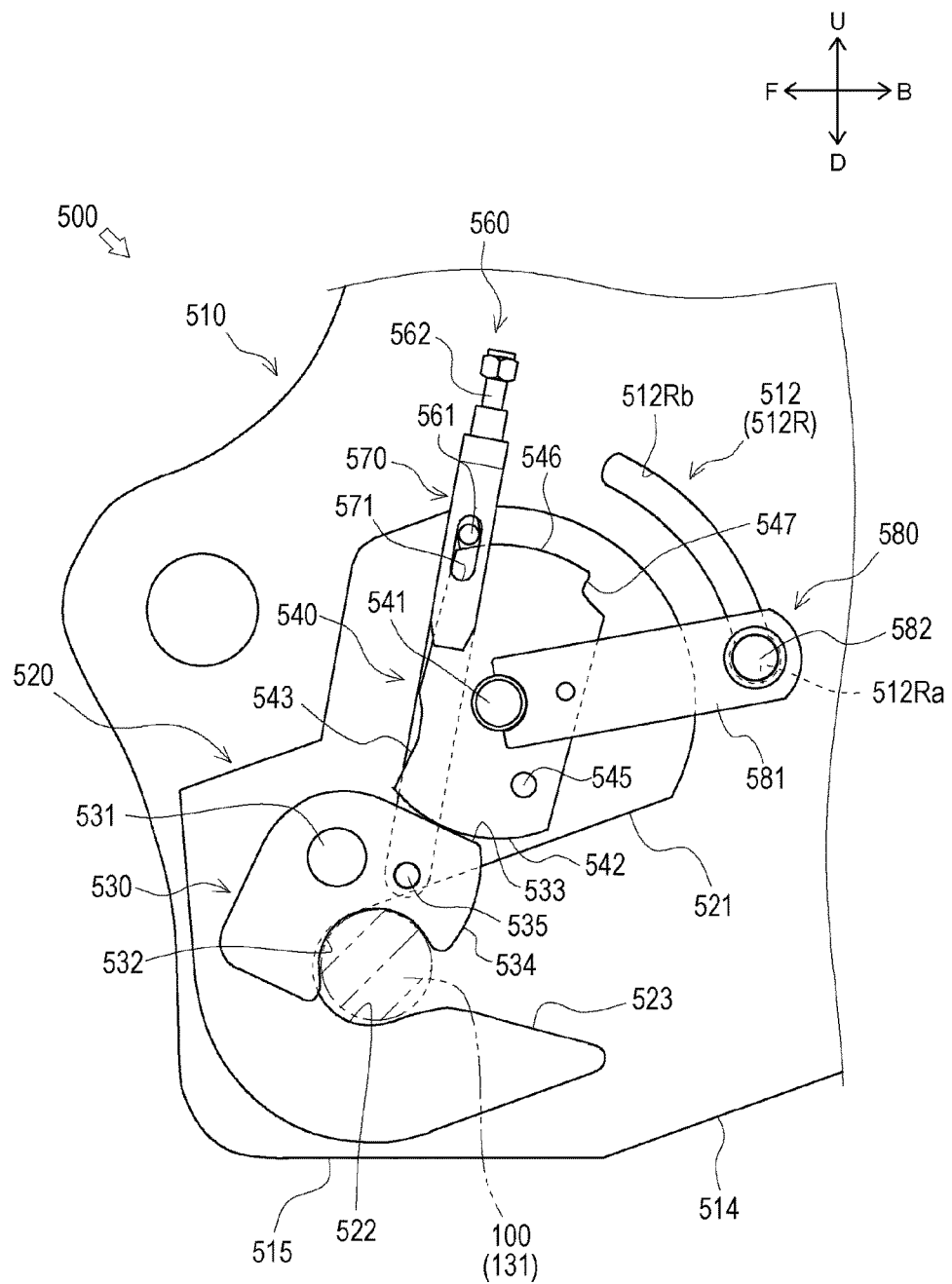
FIG. 11 is a left side view illustrating a portion of the subframe unit in a state of being held by the main frame according to one or more embodiments.

The slideway 546, illustrated in FIGS. 11 and 12, is a surface that guides the detent pin 561 that is described below on an outer peripheral portion of the lock bar 540. The slideway 546 is formed in a curved shape with a backward- and upward-facing surface. More specifically, the slideway 546 is formed in an arc shape whose center is the swing shaft 541 in a side view. The slideway 546 is formed on an opposite side of the lock-bar-side first abutting surface 542, interposing the swing shaft 541 therebetween.

The locked portion 547, illustrated in FIGS. 7, 8, 11, and 12, is a portion for locking the detent pin 561 that is described below. The locked portion 547 is formed on the outer peripheral portion of the lock bar 540. The locked portion 547 is formed behind and adjacent to the slideway 546. The locked portion 547 is formed by a surface rising along a radial direction of the lock bar 540.

The spring 550, illustrated in FIG. 12, is for biasing the thumb 530 and the lock bar 540 in a predetermined direction. The spring 550 is formed by a tension coil spring. The spring 550 is disposed between the pair of left and right thumbs 530 and spanning an interior of the groove portion 544 of the lock bar 540. One end of the spring 550 is connected to the connecting shaft 535 of the thumb 530. Another end of the spring 550 is connected to the connecting shaft 545 of the lock bar 540. By a biasing force of the spring 550, the thumb 530 is biased counterclockwise in a left side view and the lock bar 540 is biased clockwise in a left side view. Note that to simplify illustration, the spring 550 is only illustrated in FIG. 12.

The detent mechanism 560, illustrated in FIGS. 7, 8, and 10 to 12, is for regulating the swinging of the lock bar 540. The detent mechanism 560 is principally equipped with the detent pin 561, a bolt 562, and a spring 563.

The detent pin 561 is formed in a cylindrical shape. The detent pin 561 is provided so both end portions, left and right, are respectively inserted into the notch portions 524 of the pair of left and right guide plate 520 (see FIG. 9) in a state where an axis thereof is in the left-right direction. This enables the detent pin 561 to move (slide) up and down along a longitudinal direction of the notch portion 524.

The bolt 562 is a member abutting the detent pin 561 from above. The bolt 562 is disposed in a state where a head portion faces downward. The bolt 562 is supported in a slidable manner on an upper surface of the release arm 570, which is described below. The head portion (lower end portion) of the bolt 562 abuts the detent pin 561 from above.

The spring 563 biases the bolt 562 downward. The spring 563 is formed by a compression coil spring. The spring 563 is disposed between the head portion of the bolt 562 and the upper surface of the release arm 570 that is described below. By this spring 563, the bolt 562 is continually biased downward, which in turn continually biases the detent pin 561 downward. Note that to simplify illustration, the spring 563 is only illustrated in FIG. 12.

The release arm 570, illustrated in FIGS. 7, 8, and 10 to 12, is for releasing the regulating of the swinging of the lock bar 540 by the detent mechanism 560 as appropriate. The release arm 570 is formed by bending an elongated plate to be substantially U-shaped. By being bent to be substantially U-shaped and opened downward, the release arm 570 is formed to have a pair of left and right side surfaces and an upper surface. The pair of left and right side surfaces of the release arm 570 is disposed so as to be respectively positioned on both sides, left and right, of the lock bar 540. The upper surface of the release arm 570 is disposed so as to be positioned above the lock bar 540. A lower end portion (lower end portion of the right side surface) of the release arm 570 is rotatably supported by the connecting shaft 535 of the thumb 530 (see FIGS. 8 and 11). A long hole 571 is formed in the release arm 570.

The long hole 571, illustrated in FIGS. 7, 8, and 11, is formed in each of the pair of left and right side surfaces of the release arm 570. The long hole 571 is formed extending a predetermined length along a longitudinal direction of the side surface of the release arm 570. Both ends of the detent pin 561 are respectively inserted into the pair of left and right long holes 571.

The operation mechanism 580, illustrated in FIGS. 7, 8, and 10 to 13, is for swinging the lock bar 540 when removing the subframe unit 500 from the main frame 100. The operation mechanism 580 is principally equipped with an arm portion 581, the operation lever 582, a washer 583, and a spring 584.

The arm portion 581, illustrated in FIGS. 7, 8, 11, and 13, is a member that is fixed to the lock bar 540. The arm portion 581 has a main-body portion 581a and a boss portion 581b.

The main-body portion 581a is a substantially rectangular plate in a side view. One end portion (front end portion) of the main-body portion 581a is fixed to a left surface of the lock bar 540 by an appropriate fastener (such as a bolt). The main-body portion 581a is disposed so as to extend backward from the lock bar 540.

Figure 13:
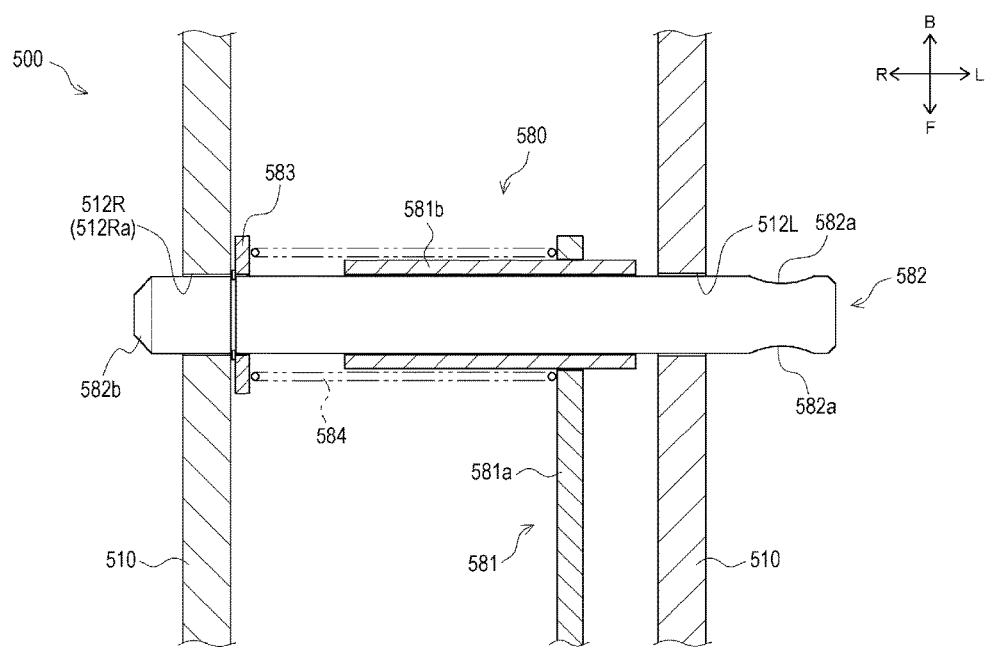
FIG. 13 is a plan-view cross section illustrating an operation mechanism according to one or more embodiments.

The boss portion 581b, illustrated in FIG. 13, is a cylindrical member. An axis of the boss portion 581b is disposed in the left-right direction. The boss portion 581b is fixed in a state of being inserted into a back end portion of the main-body portion 581a.

The operation lever 582 is a member that a worker grips and operates. The operation lever 582 is formed to be substantially cylindrical. An axis of the operation lever 582 is disposed in the left-right direction. The operation lever 582 is inserted in a slidable manner into the boss portion 581b. A diameter of the operation lever 582 is formed to be substantially identical to the width of the regulating hole 512L formed in the subframe 510 and the width (diameter) of the lower end portion 512Ra of the regulating hole 512R. The operation lever 582 is principally formed with a concave portion 582a and an acute portion 582b.

The concave portion 582a, illustrated in FIGS. 7 and 13, is a portion formed by recessing an outer peripheral surface of the operation lever 582. The concave portion 582a is formed in a vicinity of a left end portion of the operation lever 582. A pair of concave portions 582a is formed interposing an axial core of the operation lever 582. In this manner, by forming the concave portion 582a in the cylindrical operation lever 582, the operation lever 582 can be made easy to grip (easy to operate).

The acute portion 582b, illustrated in FIGS. 8 and 13, is a portion of a shape that is substantially a truncated cone formed to decrease in diameter in the course of heading to a right end of the operation lever 582. A diameter of a distal end (right end) of the acute portion 582b is formed to be smaller than the width of the arc portion 512Rb of the regulating hole 512R formed in the subframe 510 (see FIG. 9).

The washer 583, illustrated in FIGS. 7, 8, and 13, is a member of a shape that is substantially an annular plate. A right end portion of the operation lever 582 is inserted into the washer 583. Movement of the washer 583 to the right and left relative to the operation lever 582 is regulated by an appropriate locking tool.

The spring 584, illustrated in FIG. 13, is for biasing the operation lever 582 to the right. The spring 584 is formed by a compression coil spring. The spring 584 is disposed between the main-body portion 581a of the arm portion 581 and the washer 583. By this spring 584, the washer 583 is continually biased to the right, which in turn continually biases the operation lever 582 to the right. Note that to simplify illustration, the spring 584 is only illustrated in FIGS. 13 and 14.

Both end portions, left and right, of the operation lever 582 are respectively inserted into the regulating holes 512 of the pair of left and right subframes 510. More specifically, in the mounted state, the left end portion of the operation lever 582 is inserted into a lower end portion of the regulating hole 512L of the left subframe 510. Moreover, the right end portion of the operation lever 582 is inserted into the lower end portion 512Ra of the regulating hole 512R of the right subframe 510. A movement range (swinging range) of the operation lever 582 is regulated by the regulating hole 512. The worker can easily confirm the mounted state by visually confirming that the operation lever 582 is protruding sideways from the lower end portion 512Ra of the regulating hole 512R.

Next, a method of removing the front loader 20 (more specifically, a portion of the front loader 20 other than the main frame 100) from the vehicle body 1 is described.

FIGS. 10 and 11 illustrate the state where the subframe unit 500 is mounted on the main frame 100 (the mounted state). In the mounted state, the main-frame-side pin 131 is held by the subframe-side hook 522 and the subframe-side pin 511 is held by the main-frame-side hook 132 (see FIG. 10).

At this time, the lock bar 540 is held by the biasing force of the spring 550 in a position, in a movement range thereof determined by the operation lever 582 and the regulating hole 512, that is maximally swung in a clockwise direction (regulated position). The lock-bar-side first abutting surface 542 of the lock bar 540 abutting the thumb-side first abutting surface 533 of the thumb 530 regulates the swinging of the thumb 530 in the counterclockwise direction in the left side view. This holds the thumb 530 in a position where the engaging groove 532 engages with the main-frame-side pin 131 (engaging position) and prevents the main-frame-side pin 131 separating from the subframe-side hook 522. At this time, the main-frame-side pin 131 is fixed by the left and right subframe-side hooks 522 and the engaging groove 532 positioned therebetween.

At this time, because the lock-bar-side first abutting surface 542 of the lock bar 540 (arc-shaped surface whose center is the swing shaft 541) abuts the thumb-side first abutting surface 533 of the thumb 530 (flat surface), a pressing force the lock bar 540 receives from the thumb 530 acts in a direction heading toward the swing center of the lock bar 540 (swing shaft 541). That is, the pressing force from the thumb 530 does not act in a direction of swinging the lock bar 540 (circumferential direction). This enables the pressing force received from the thumb 530 to prevent the swinging of the lock bar 540.

Furthermore, in the mounted state, the detent pin 561 is pressed against the slideway 546 of the lock bar 540. Because the slideway 546 is formed in a smooth arc shape, the detent pin 561 does not lock with the lock bar 540, and the detent pin 561 does not regulate the swinging of the lock bar 540.

Furthermore, in the mounted state, the operation lever 582 is inserted into the lower end portion 512Ra of the regulating hole 512R of the subframe 510 (see FIG. 12). Because the width of the arc portion 512Rb of the regulating hole 512R is smaller than the diameter of the operation lever 582, the operation lever 582 cannot move within this regulating hole 512R. In this manner, because movement is regulated by the regulating hole 512R, erroneous actuation of the operation lever 582 can be prevented.

Figure 14:
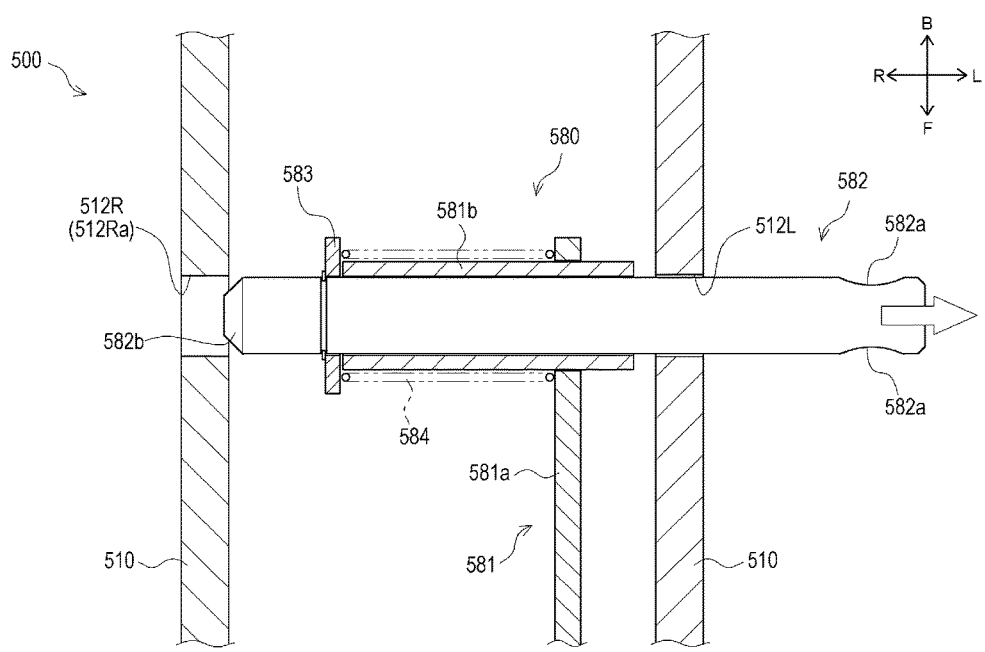
FIG. 14 is a plan-view cross section illustrating the operation mechanism in a state where an operation lever is pulled out according to one or more embodiments.

In a situation of swinging the lock bar 540 from the mounted state using the operation lever 582, as illustrated in FIG. 14, the operation lever 582 is pulled to the outer side (left side) until the washer 583 abuts the boss portion 581b. This enables the operation lever 582 to greatly protrude on an outer side of the subframe 510, making the operation lever 582 easy to grip (easy to operate).

Furthermore, by pulling out the operation lever 582 to the outer side, of the operation lever 582, only the acute portion 582b is positioned in the regulating hole 512R. At this time, the diameter of the acute portion 582b positioned in the regulating hole 512R is formed to be substantially identical to the width of the arc portion 512Rb of the regulating hole 512R (see FIG. 12). Because of this, in a state where the operation lever 582 is pulled out to the outer side, the regulating hole 512R does not regulate the movement of the operation lever 582. That is, the operation lever 582 can move along the regulating hole 512R (arc portion 512Rb).

Figure 15:
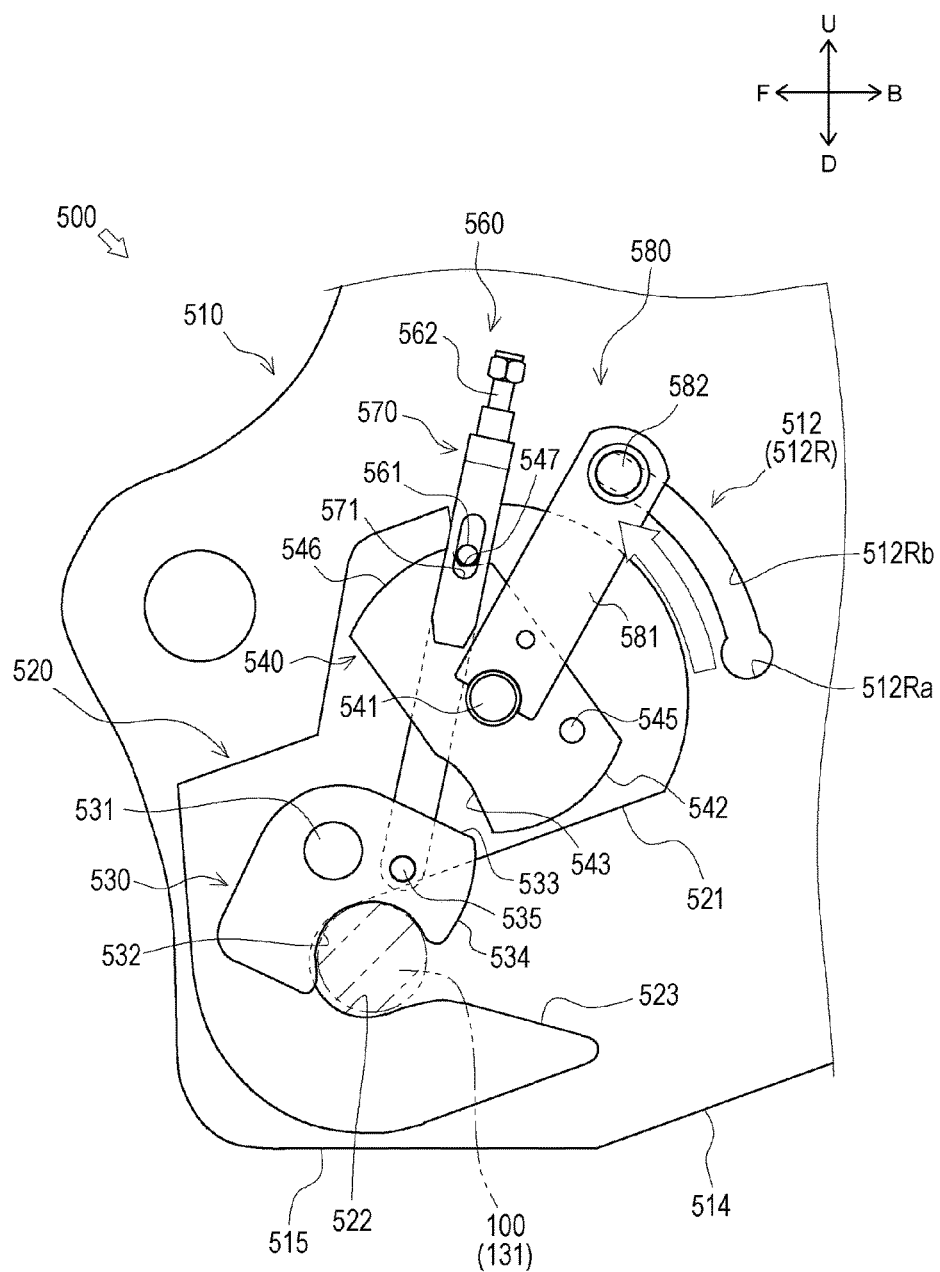
FIG. 15 is a left-side-view cross section illustrating the portion of the subframe unit in a state where the operation lever is operated according to one or more embodiments.

When the operation lever 582 is moved in the counterclockwise direction in the left side view along the regulating hole 512 while the operation lever 582 is still pulled out, the lock bar 540 swings in the counterclockwise direction in the left side view in conjunction therewith (see FIG. 15).

When the lock bar 540 swings about 50° in the counterclockwise direction in the left side view (until the operation lever 582 is positioned in a vicinity of the upper end portion of the regulating hole 512), the detent pin 561 locks with the locked portion 547 of the lock bar 540. Because of this, the swinging of the lock bar 540 in the clockwise direction in the left side view is regulated by the detent pin 561 and the locked portion 547. That is, the lock bar 540 is held in this position (regulating release position). In this state, the lock bar 540 does not return to an original position (regulated position) even if the worker lets go of the operation lever 582.

In the state illustrated in FIG. 15, the vehicle body 1 is made to retreat in a state where the front loader 20 (portion other than the main frame 100) is lowered to the ground. The main frame 100 (main-frame-side pin 131) then relatively moves backward relative to the subframe unit 500 while pressing a back portion of the thumb 530 upward (see FIG. 16). The thumb 530 swings in the counterclockwise direction in the left side view by a pressing force from the main-frame-side pin 131 and the biasing force of the spring 550. In the left side view, when the thumb 530 swings to a position where a gap between a lower-back surface of the thumb 530 and an upper surface of the subframe-side hook 522 becomes no less than the diameter of the main-frame-side pin 131 (release position), the engagement between the thumb 530 and the main frame 100 (main-frame-side pin 131) is released. By causing the vehicle body 1 to retreat further from this state, the subframe unit 500 can be removed from the main frame 100.

Figure 16:
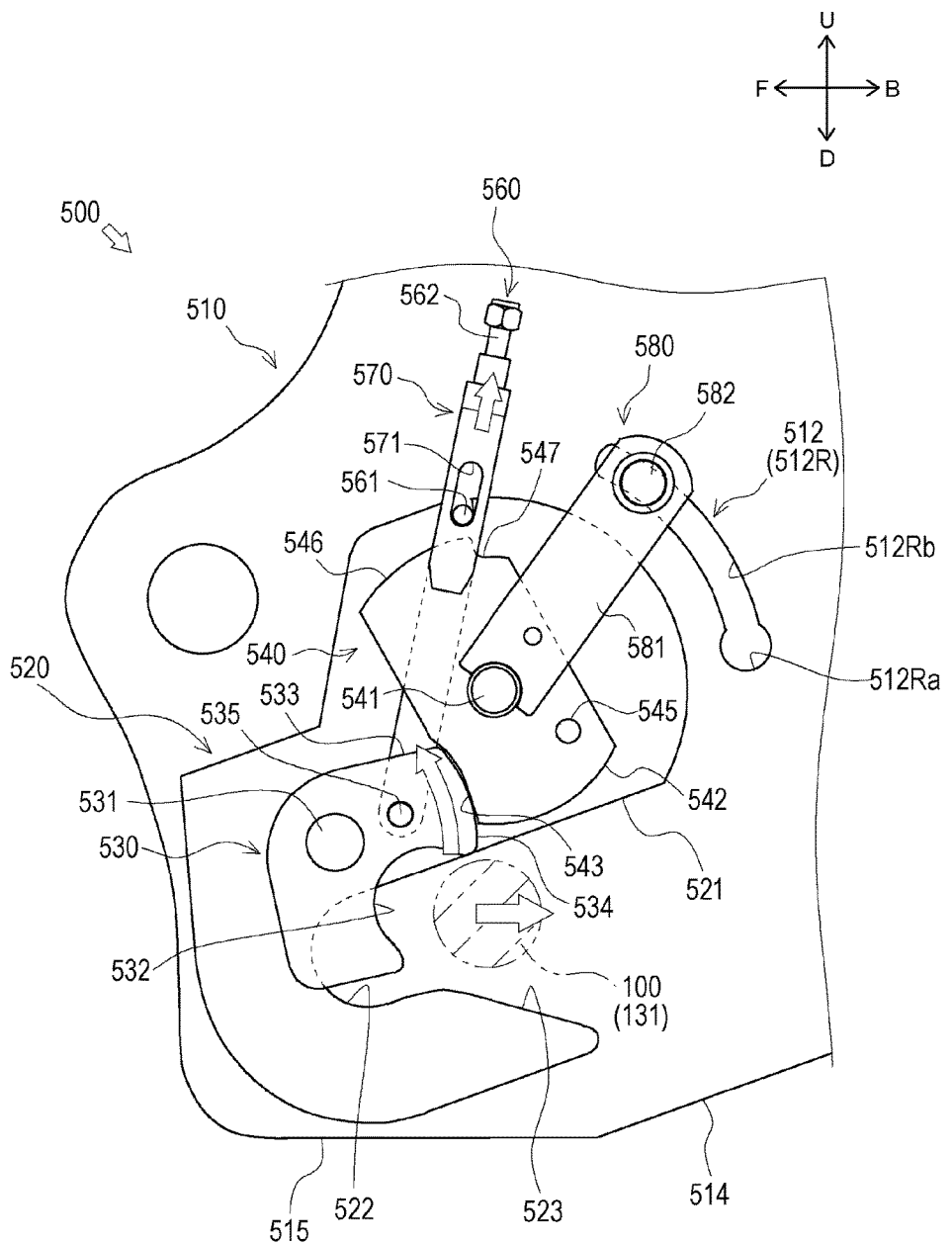
FIG. 16 is a left side view illustrating the portion of the subframe unit being removed from the main frame according to one or more embodiments.

Furthermore, when the thumb 530 swings in the counterclockwise direction in the left side view, as illustrated in FIG. 16, the release arm 570 connected to the connecting shaft 535 of the thumb 530 is pushed upward. When the release arm 570 is pushed upward, the detent pin 561 is pushed upward by a lower end portion of the long hole 571 of the release arm 570. This separates the detent pin 561 from the lock bar 540, releasing the lock between the detent pin 561 and the locked portion 547 of the lock bar 540. That is, the release arm 570 releases the regulation of the swinging of the lock bar 540 by the detent pin 561.

When the lock between the detent pin 561 and the locked portion 547 is released, the lock bar 540 swings in the clockwise direction in the left side view due to the biasing force of the spring 550. When the lock bar 540 swings, the thumb-side second abutting surface 534 of the thumb 530 and the lock-bar-side second abutting surface 543 of the lock bar 540 abut (see FIG. 16). This regulates the swinging of the lock bar 540 in the clockwise direction in the left side view.

At this time, because the thumb-side second abutting surface 534 of the thumb 530 (arc-shaped surface whose center is the swing shaft 531) abuts the lock-bar-side second abutting surface 543 of the lock bar 540 (flat surface), a pressing force the thumb 530 receives from the lock bar 540 acts in a direction heading toward the swing center of the thumb 530 (swing shaft 531). That is, the pressing force from the lock bar 540 does not act in a direction of swinging the thumb 530 (circumferential direction). This enables the pressing force received from the lock bar 540 to prevent the swinging of the thumb 530.

In this manner, by causing the vehicle body 1 to retreat after operating the operation lever 582 to release the lock between the thumb 530 and the main-frame-side pin 131 in the state where the front loader 20 (portion other than the main frame 100) is lowered to the ground, the subframe unit 500, the boom 300, and the bucket 400 of the front loader 20 can be easily removed from the main frame 100.

Furthermore, because the subframe-side hook 522 is opened backward and upward and the main-frame-side hook 132 is opened frontward and downward, when the subframe unit 500 is removed from the main frame 100, the subframe unit 500 is positioned slightly lower than the original installation position.

Next, a method of mounting the front loader 20 (more specifically, the portion of the front loader 20 other than the main frame 100) on the vehicle body 1 is described. Note that FIGS. 17 to 29 illustrate the left main frame 100 and the left subframe unit 500 among the pair of left and right main frames 100 and the pair of left and right subframe units 500.

The vehicle body 1 is caused to advance in the state where the front loader 20 (portion other than the main frame 100) is removed from the main frame 100 and lowered to the ground, causing the main frame 100 to approach the subframe unit 500. In the state where the front loader 20 is lowered to the ground, the subframe unit 500 is positioned lower than the original installation position. That is, the subframe-side pin 511 is positioned lower than the main-frame-side hook 132 that holds the subframe-side pin 511 and the subframe-side hook 522 is positioned lower than the main-frame-side pin 131 that holds the subframe-side hook 522 (see FIG. 17).

Figure 17:
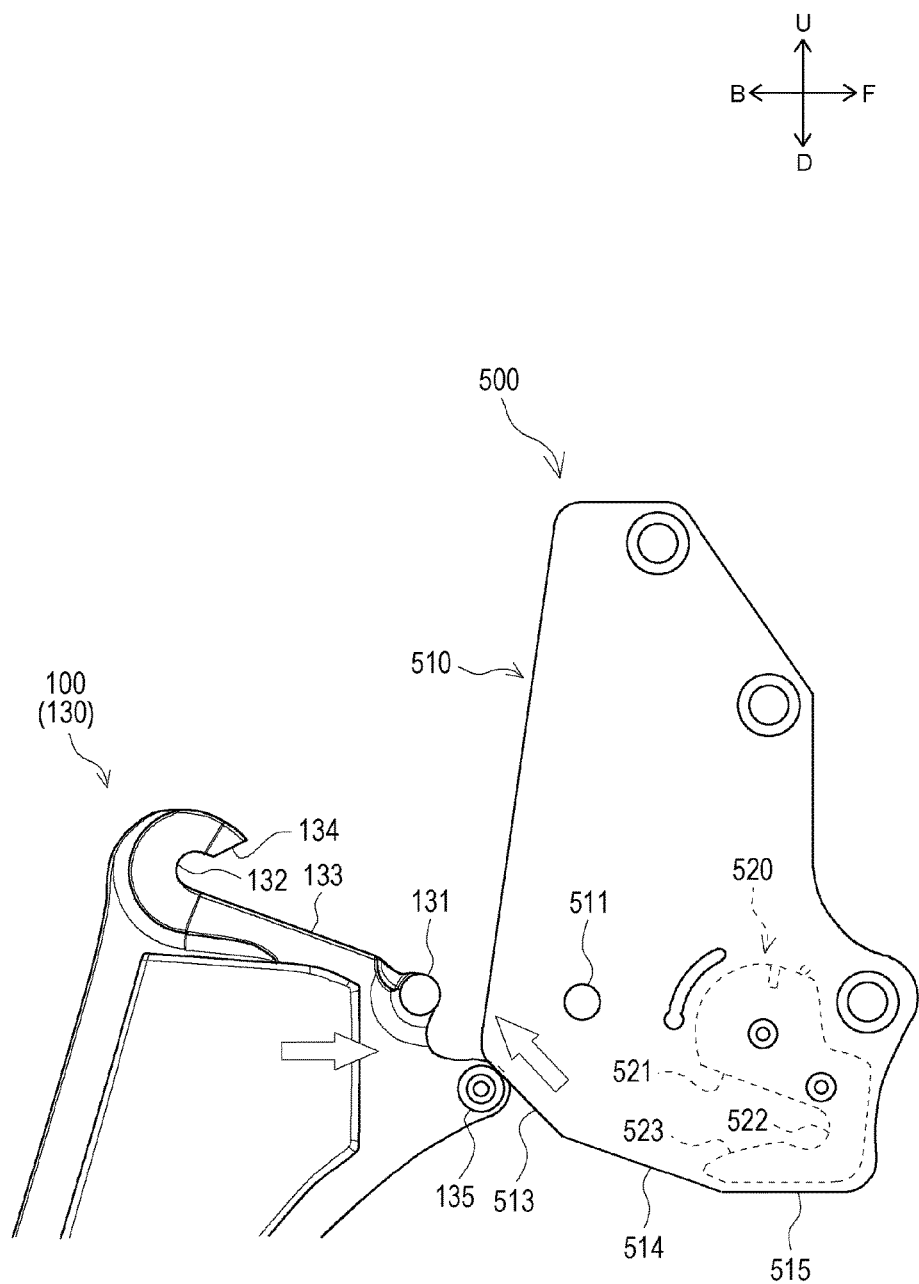
FIG. 17 is a right side view illustrating a state where a subframe first lower surface abuts a roller in mounting the subframe unit on the main frame according to one or more embodiments.

As illustrated in FIG. 17, when the vehicle body 1 is advanced, first, of the pair of left and right subframe first lower surfaces 513, the subframe first lower surface 513 in a lower position abuts the roller 135. Afterward, the other subframe first lower surface 513 also abuts the roller 135. When the vehicle body 1 is further advanced, the subframe unit 500 relatively moves backward and upward relative to the main frame 100 (along the subframe first lower surface 513) by the subframe first lower surface 513 moving on the roller 135. This lifts the subframe unit 500 upward.

Here, the roller proximal portion 135b or the roller distal portion 135c of the roller 135 is formed so the outer diameter gradually decreases in the course of heading toward a roller-central-portion 135a side (see FIG. 4). Because of this, the subframe first lower surface 513 is guided to the roller-central-portion 135a side when lifted onto the roller proximal portion 135*b* or the roller distal portion 135*c*. This enables a position of the subframe unit 500 in the left-right direction to be adjusted.

Figure 18:
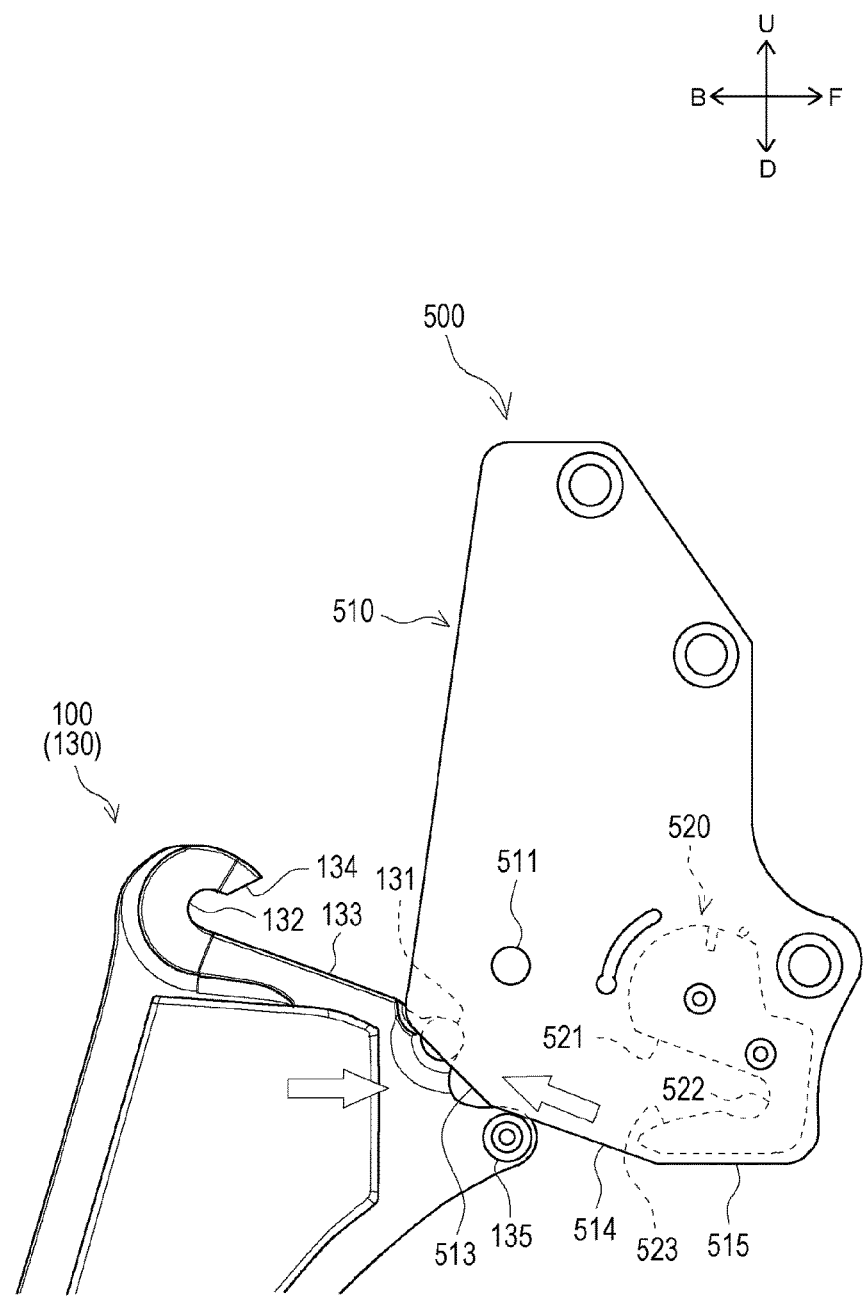
FIG. 18 is a right side view illustrating a state where a subframe second lower surface abuts the roller in mounting the subframe unit on the main frame according to one or more embodiments.

When the vehicle body 1 is caused to further advance, as illustrated in FIG. 18, the subframe second lower surface 514 starts to move on the roller 135. The subframe unit 500 relatively moves backward and upward relative to the main frame 100 (along the subframe second lower surface 514) by the subframe second lower surface 514 moving on the roller 135. Because the incline angle of the subframe second lower surface 514 is gentler than that of the subframe first lower surface 513, the subframe unit 500 relatively moves backward relative to the main frame 100 while rising gently.

This enables a height of the subframe unit 500 to approach a height of the original installation position (installation height). Specifically, a position of the subframe-side pin 511 in the up-down direction becomes roughly the same height as a position of the main-frame-side hook 132 in the up-down direction (see FIG. 19). Moreover, a position of the subframe-side hook 522 in the up-down direction becomes roughly the same height as a position of the main-frame-side pin 131 in the up-down direction (see FIG. 19).

In this manner, the subframe unit 500 can be lifted by the subframe first lower surface 513 and the subframe second lower surface 514, formed as the frontwardly descending inclines, moving on the roller 135. This enables the height of the subframe unit 500 to approach the original installation height. That is, the positioning of the subframe-side pin 511 and the main-frame-side hook 132 in the up-down direction and the positioning of the subframe-side hook 522 and the main-frame-side pin 131 in the up-down direction can be adjusted.

Furthermore, because the subframe first lower surface 513 is formed as a comparatively steep incline, when causing the vehicle body 1 to advance, the subframe unit 500 can be lifted at once in a comparatively short movement distance. The height of the subframe unit 500 can then be finely adjusted by the subframe second lower surface 514, which is a comparatively gentle incline.

Figure 19:
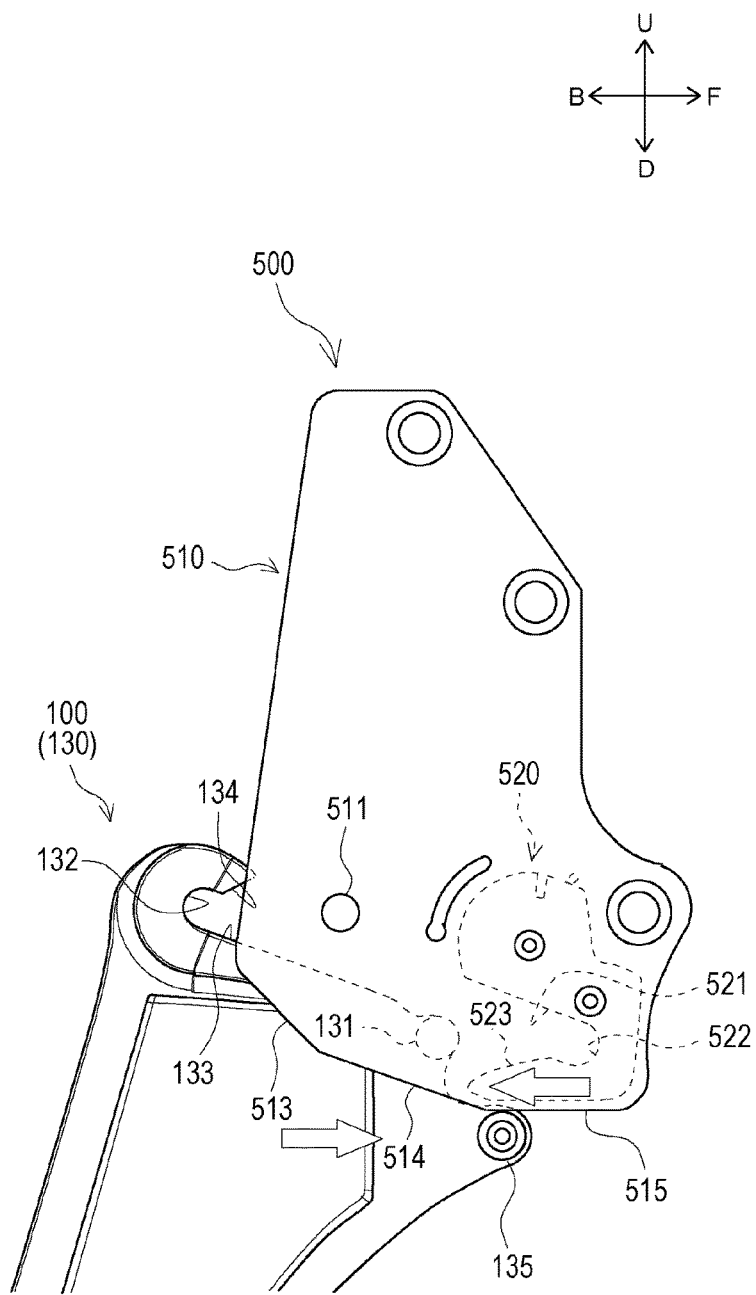
FIG. 19 is a right side view illustrating a state where a subframe third lower surface abuts the roller in mounting the subframe unit on the main frame according to one or more embodiments.

When the vehicle body 1 is caused to further advance, as illustrated in FIG. 19, the subframe third lower surface 515 starts to move on the roller 135. The subframe unit 500 relatively moves backward relative to the main frame 100 (along the subframe third lower surface 515) by the subframe third lower surface 515 moving on the roller 135. Because the subframe third lower surface 515 is formed to be horizontal, the subframe unit 500 does not rise any further and relatively moves backward relative to the main frame 100.

Figure 20:
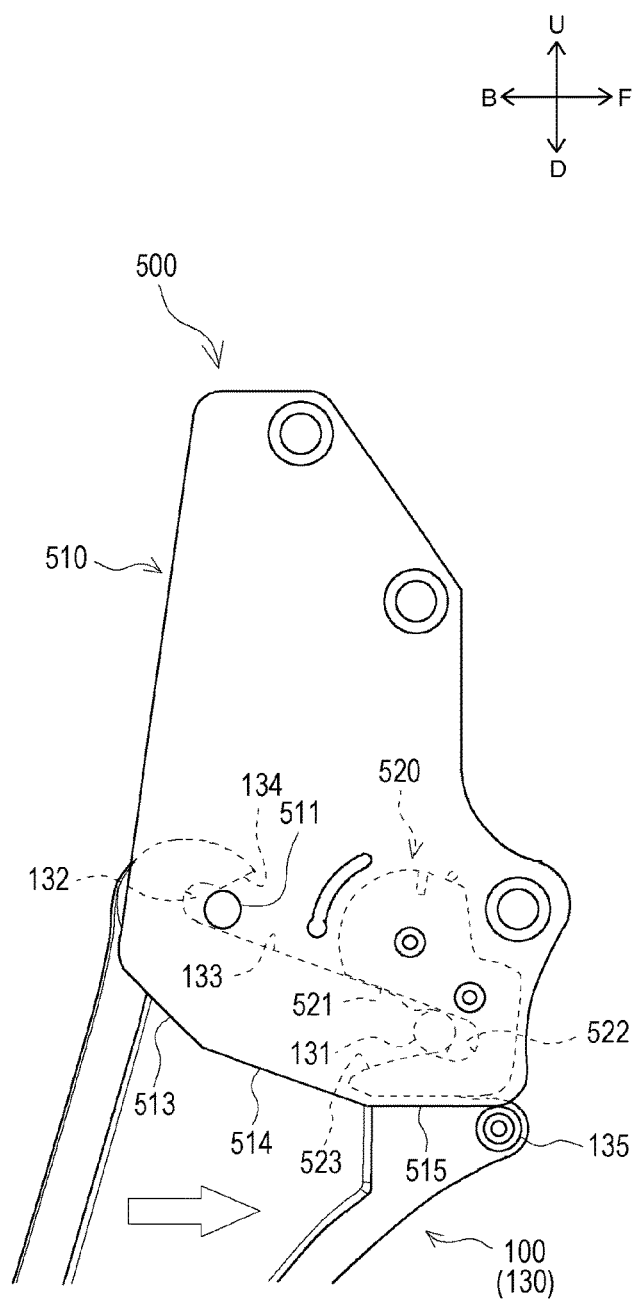
FIG. 20 is a right side view illustrating a state where a main-frame-side pin abuts a subframe-side upper slideway and a subframe-side pin abuts a main-frame-side lower slideway in mounting the subframe unit on the main frame according to one or more embodiments.

When the vehicle body 1 is caused to further advance, as illustrated in FIG. 20, the mainframe-side pin 131 abuts the subframe-side upper slideway 521 and is guided to the subframe-side hook 522 by the subframe-side upper slideway 521. Moreover, the subframe-side pin 511 abuts the main-frame-side lower slideway 133 and is guided to the main-frame-side hook 132 by the main-frame-side lower slideway 133. This separates the subframe third lower surface 515 from the roller 135 by the subframe unit 500 relatively moving backward and upward along the main-frame-side lower slideway 133 (subframe-side upper slideway 521) (see FIG. 21).

In this manner, by the subframe third lower surface 515 relatively moving backward on the roller 135, the main-frame-side pin 131 can be guided to the subframe-side hook 522 and the subframe-side pin 511 can be guided to the main-frame-side hook 132.

Figure 22:
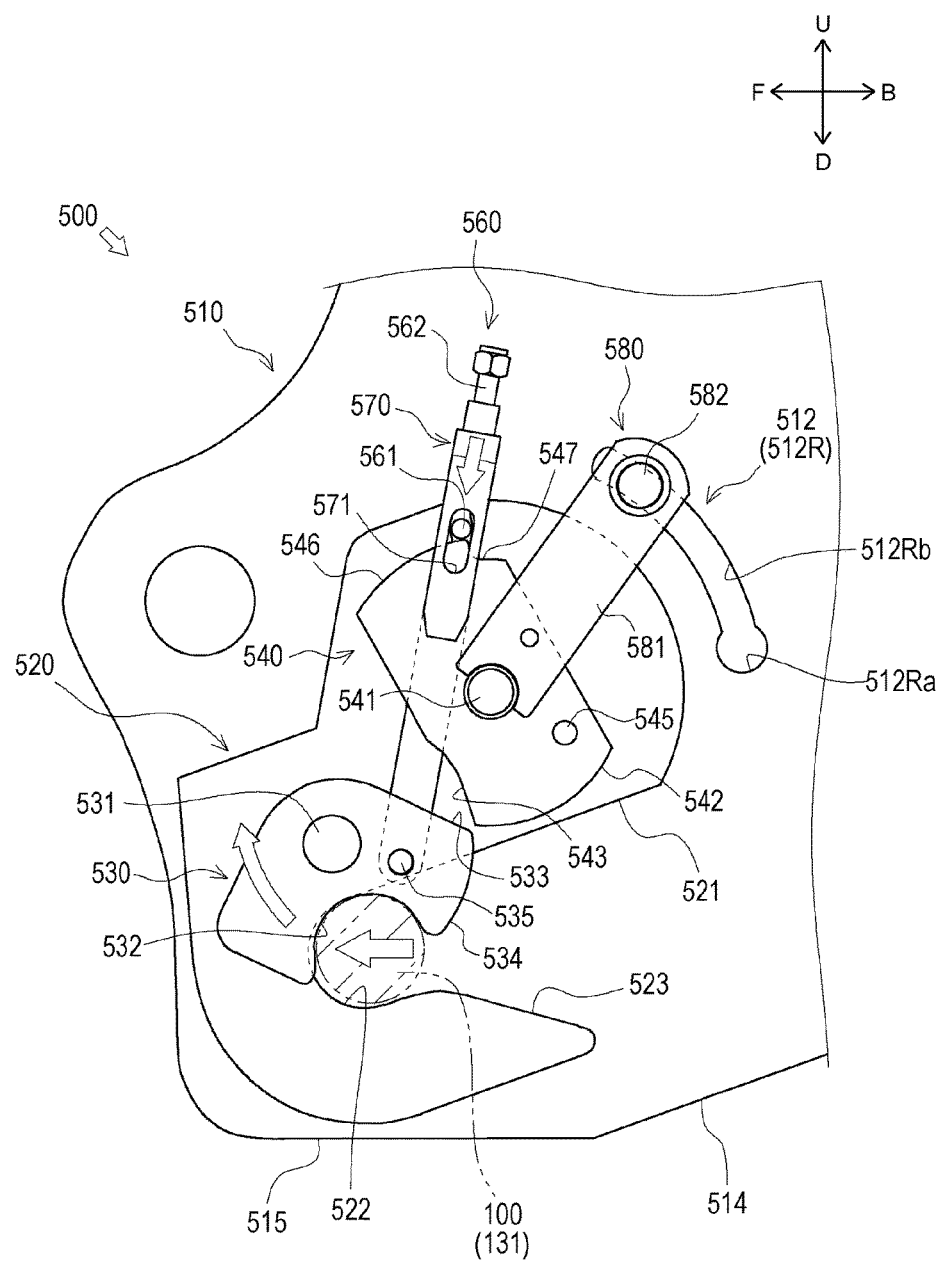
FIG. 22 is a left side view illustrating the portion of the subframe unit in a state where a thumb is returned to an engaging position according to one or more embodiments.
Figure 23:
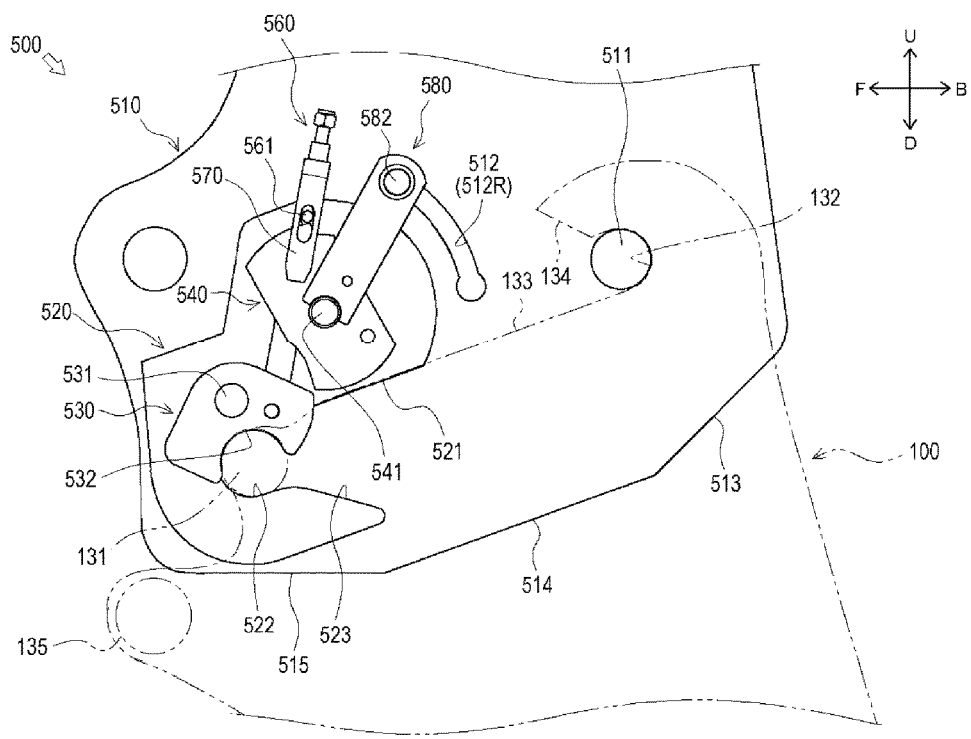
FIG. 23 is a left side view illustrating a portion of the main frame and the subframe unit in the state where the thumb is returned to the engaging position according to one or more embodiments.

As illustrated in FIGS. 22 and 23, when being guided to the subframe-side hook 522, the main-frame-side pin 131 presses a front end portion of the thumb 530 frontward, causing the thumb 530 to swing in the clockwise direction in the left side view (frontward and upward). This causes the thumb 530 to return to the engaging position and engage with the main-frame-side pin 131.

Furthermore, in conjunction with the swinging of the thumb 530, the release arm 570 is pulled downward. When the release arm 570 is pulled down, the detent pin 561 being pushed up by the release arm 570 once again abuts the slideway 546 of the lock bar 540.

Furthermore, by the thumb 530 swinging, the thumb 530 (thumb-side second abutting surface 534) and the lock bar 540 (lock-bar-side second abutting surface 543) separate. This enables the lock bar 540 to swing clockwise in the left side view.

The lock bar 540 swings clockwise in the left side view due to the biasing force of the spring 550 and again moves to the regulated position (see FIGS. 10 and 11). In this state, the lock bar 540 regulates the swinging of the thumb 530, enabling separation of the main-frame-side pin 131 from the subframe-side hook 522 to be prevented.

In this manner, the subframe unit 500 as well as the boom 300 and the bucket 400 provided on the subframe unit 500 can be easily mounted on the main frame 100 by simply causing the vehicle body 1 to advance in the state where the front loader 20 (portion other than the main frame 100) is lowered to the ground.

Therefore, when working to detach or attach the front loader 20, conventional work such as hydraulically operating the boom 300 for positioning with the main frame 100 and pulling out and inserting a pin to fix the boom 300 to the main frame 100 can be made unnecessary. Moreover, the worker no longer has to enter and exit the cabin 10 for this work. Therefore, decreased man-hours when detaching and attaching the front loader 20 and a shortened work time that accompanies this become possible.

Furthermore, because the main frame 100 and the subframe unit 500 have structures whereby they position each other, the main frame 100 and the subframe unit 500 can be positioned smoothly.

Furthermore, even in a situation where, in the state where the subframe unit 500 is lowered to the ground, a difference between the height at this time and the original installation height is large, this difference can be made small by the subframe first lower surface 513 and the subframe second lower surface 514 moving on the roller 135. This enables the main-frame-side pin 131 to reach a height of being able to abut the subframe-side upper slideway 521, enabling the main-frame-side pin 131 to be guided to the subframe-side hook 522. Moreover, the subframe-side pin 511 reaches a height of being able to abut the main-frame-side lower slideway 133, enabling the subframe-side pin 511 to be guided to the main-frame-side hook 132. In this manner, a height difference between the installation position of the subframe unit 500 before mounting and the original installation position can be allowed.

Figure 21:
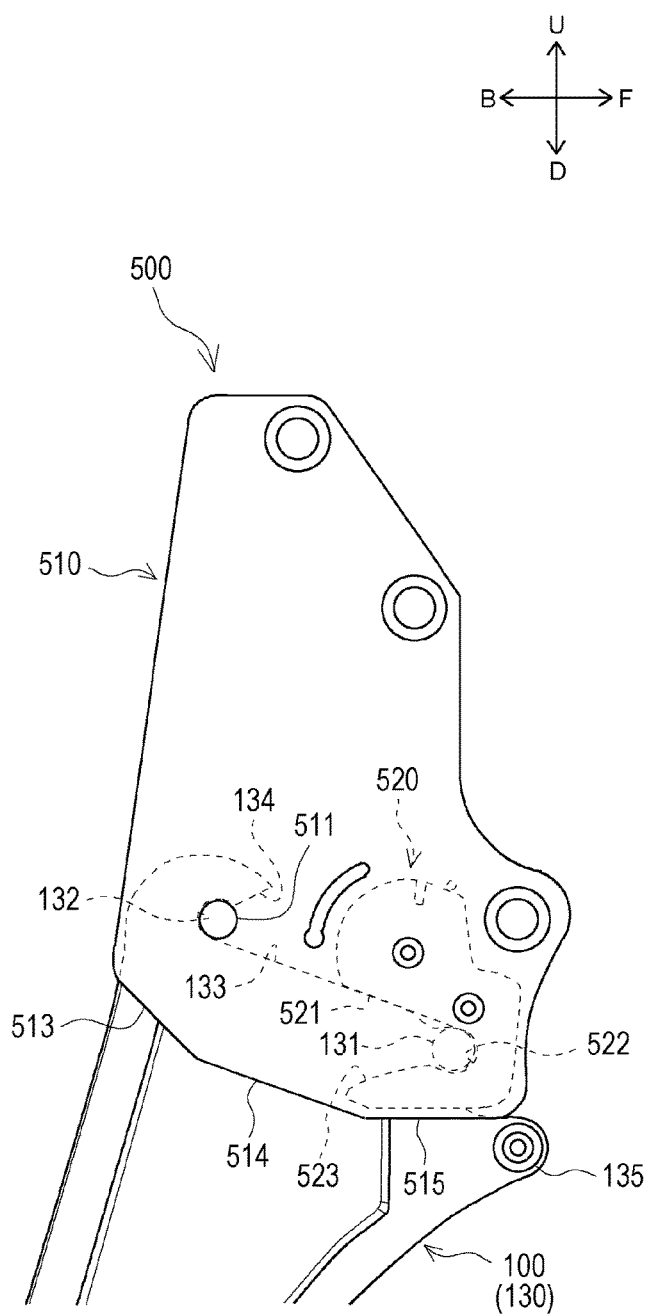
FIG. 21 is a right side view illustrating a state where the subframe unit is mounted on the main frame according to one or more embodiments.

Furthermore, the subframe 510 is ultimately mounted in a state of being separated from the roller 135 (see FIG. 21). This enables the subframe-side pin 511 to be easily pulled out from the main-frame-side hook 132 when removing the front loader 20 (subframe unit 500) from the vehicle body 1. That is, a gap (height difference) between the subframe 510 (subframe third lower surface 515) and the roller 135 can be made to serve as a draft of the subframe-side pin 511. Moreover, in the state where the subframe 510 is mounted, the roller 135 is positioned in front of the subframe 510 (more specifically, a lower-front end portion of the subframe 510 [portion closest to the roller 135]). In this manner, when mounting of the subframe 510 is completed, the roller 135 separates from the subframe 510 and is disposed in a position of protruding in front of the subframe 510. By confirming this characteristic position of the roller 135, the worker can easily confirm that mounting of the subframe 510 is completed normally.

Furthermore, because the pair of left and right rollers 135 is respectively disposed on the inner side of the supporting frame 130 (left-right central side of the vehicle body 1), the driver in the cabin 10 can view the roller 135. Therefore, the driver in the cabin 10 can perform mounting work while confirming a state wherein the subframe unit 500 is being mounted on the main frame 100. In one or more embodiments of the present invention in particular, the roller 135 is provided so as to be positioned below the line connecting the main-frame-side pin 131 and the main-frame-side hook 132. This disposition enables a visibility of the roller 135 to be improved (made to stand out compared to the main-frame-side pin 131 and the like), enabling the mounting work to be performed easily. Moreover, because the roller 135 is disposed in front of the main-frame-side pin 131, the main-frame-side hook 132, the main-frame-side lower slideway 133, and the main-frame-side upper slideway 134, when mounting the subframe 510, the roller 135 can be swiftly abutted to the subframe 510. This enables the position of the subframe 510 to be adjusted swiftly.

Furthermore, in the state of being on the ground, the subframe unit 500 may be inclined in the front-back direction in the state of being lowered to the ground. Described below is a method of mounting the front loader 20 on the vehicle body 1 in a situation where the subframe unit 500 lowered to the ground is in a state of being inclined backward from an original installation attitude due to, for example, ground unevenness (backwardly inclined state).

By causing the vehicle body 1 to advance, the subframe first lower surface 513 and the subframe second lower surface 514 relatively move backward on the roller 135 (as in FIGS. 17 and 18). This lifts the subframe unit 500. The subframe third lower surface 515 then starts to move on the roller 135.

Figure 24:
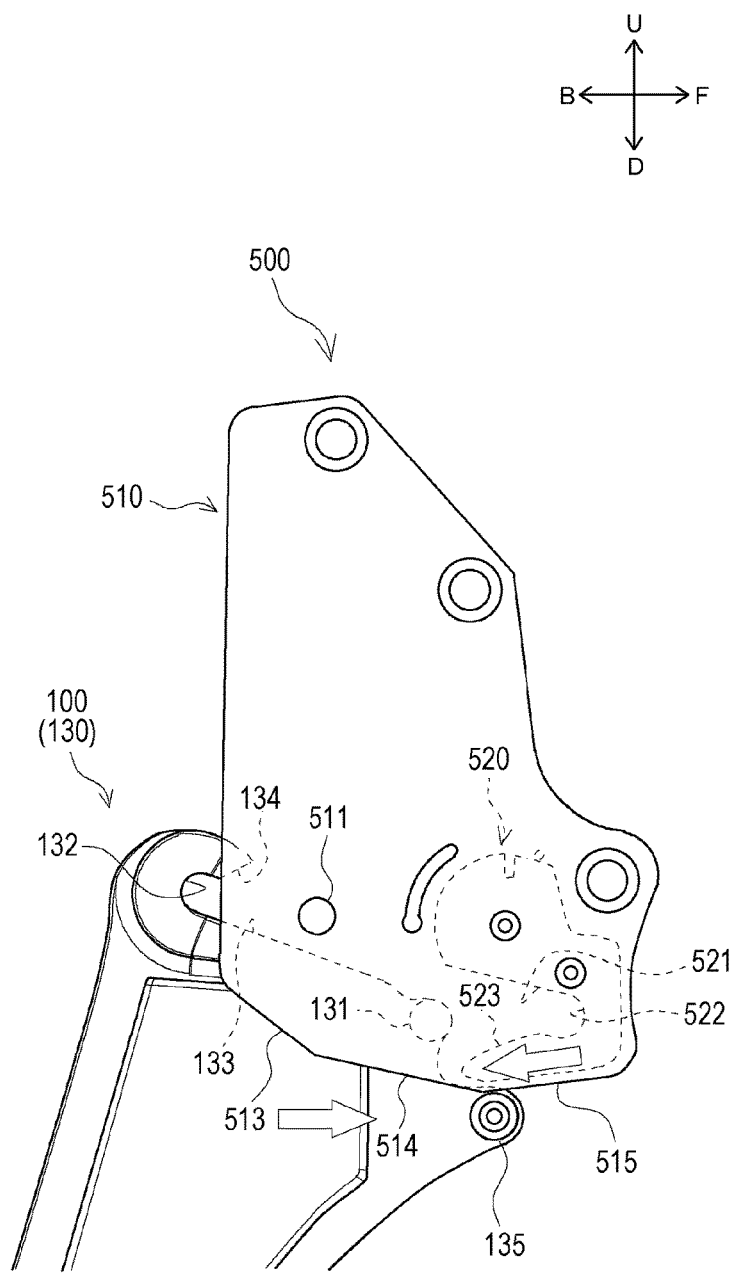
FIG. 24 is a right side view illustrating a state where the subframe third lower surface abuts the roller in mounting a subframe unit in a backwardly inclined state on the main frame according to one or more embodiments.

As illustrated in FIG. 24, because the subframe unit 500 is inclined backward from the original installation attitude, the subframe third lower surface 515 is in a state of being inclined slightly backward and downward. Because of this, the subframe unit 500 relatively moves backward relative to the main frame 100 while gradually descending (along the subframe third lower surface 515) by the subframe third lower surface 515 moving on the roller 135.

Figure 25:
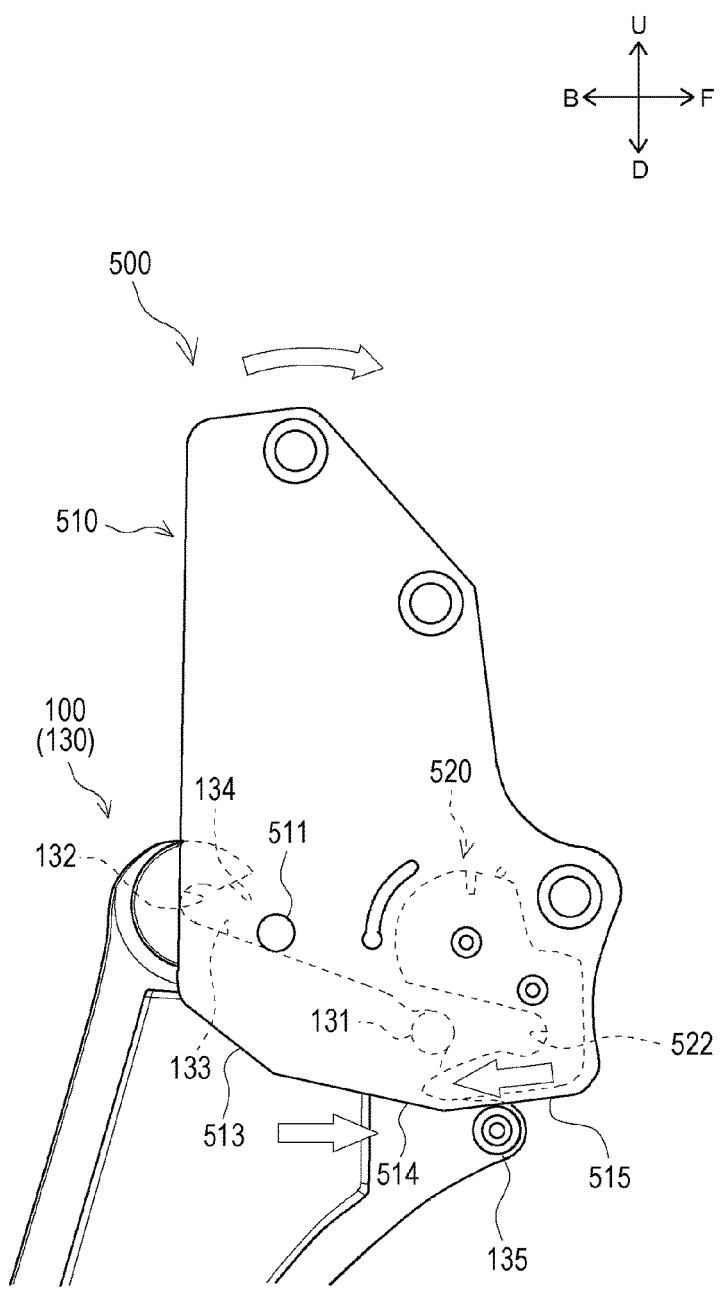
FIG. 25 is a right side view illustrating a state where the subframe-side pin abuts the main-frame-side lower slideway in mounting the subframe unit in the backwardly inclined state on the main frame according to one or more embodiments.

When the vehicle body 1 is caused to further advance, as illustrated in FIG. 25, the subframe-side pin 511 abuts the main-frame-side lower slideway 133 and is guided to the main-frame-side hook 132 by the main-frame-side lower slideway 133.

At this time, the subframe third lower surface 515 attempts to move on the roller 135 at the same time as the subframe-side pin 511 attempts to move along the main-frame-side lower slideway 133. Whereas the main-frame-side lower slideway 133 is inclined frontward and downward, the subframe third lower surface 515 is inclined backward and downward; as such, when the vehicle body 1 is caused to further advance, the subframe 510 gradually starts to incline to the front.

Figure 26:
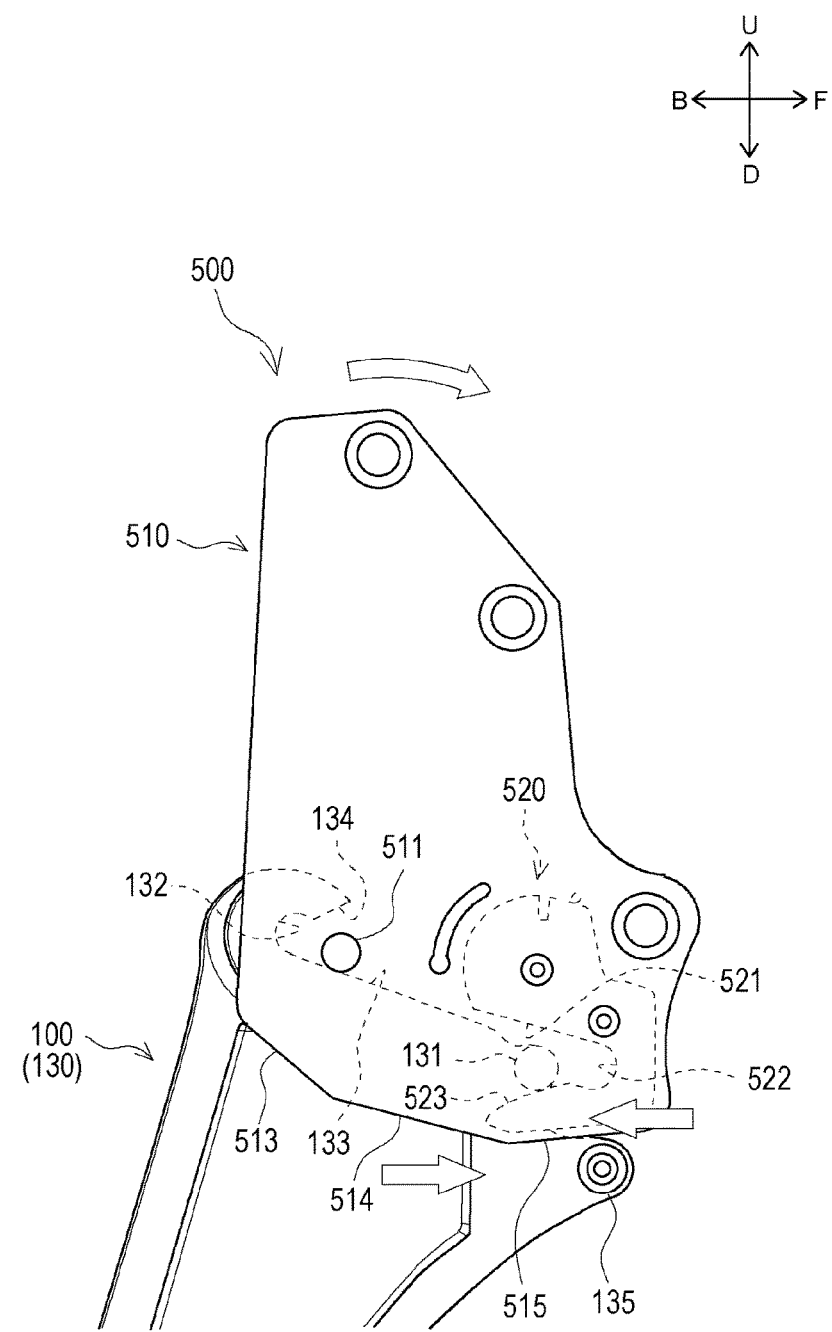
FIG. 26 is a right side view illustrating a state where the main-frame-side pin abuts the subframe-side lower slideway in mounting the subframe unit in the backwardly inclined state on the main frame according to one or more embodiments.

Even still, because the subframe unit 500 is inclined backward from the original attitude, a height different between the subframe-side pin 511 and the subframe-side hook 522 is less than a height difference between the subframe-side pin 511 and the subframe-side hook 522 in the original attitude, which is inclined neither frontward nor backward (see FIG. 20 and the like). Therefore, when the vehicle body 1 is caused to further advance, as illustrated in FIG. 26, the main-frame-side pin 131 abuts not the subframe-side upper slideway 521 (see FIG. 20) but the subframe-side lower slideway 523 and is guided to the subframe-side hook 522 by the subframe-side lower slideway 523. At this time, the subframe-side pin 511 continues to be guided to the main-frame-side hook 132 by the main-frame-side lower slideway 133. Whereas the main-frame-side lower slideway 133 is inclined frontward and downward, the subframe-side lower slideway 523 is inclined backward and downward; as such, when the vehicle body 1 is caused to further advance, the subframe 510 is further inclined to the front. Moreover, by the subframe unit 500 relatively moving backward and upward along the main-frame-side lower slideway 133, the subframe third lower surface 515 separates from the roller 135.

When the vehicle body 1 is caused to further advance, the main-frame-side pin 131 is held by the subframe-side hook 522 and the subframe-side pin 511 is held by the main-frame-side hook 132 (see FIG. 21).

In this manner, even if the subframe unit 500 lowered to the ground is in the backwardly inclined state, by guiding by two slideways of different incline angles (the main-frame-side lower slideway 133 and the subframe-side third lower surface 515 or the main-frame-side lower slideway 133 and the subframe-side lower slideway 523), the subframe unit 500 can be installed on the main frame 100 while correcting the attitude of the subframe unit 500 to the original attitude (angle).

Described next is a method of mounting the front loader 20 on the vehicle body 1 in a situation where the subframe unit 500 lowered to the ground is in a state of being inclined frontward from the original installation attitude (frontwardly inclined state).

By causing the vehicle body 1 to advance, the subframe first lower surface 513 and the subframe second lower surface 514 relatively move backward on the roller 135 (as in FIGS. 17 and 18). This lifts the subframe unit 500 upward. The subframe third lower surface 515 then starts to move on the roller 135.

Figure 27:
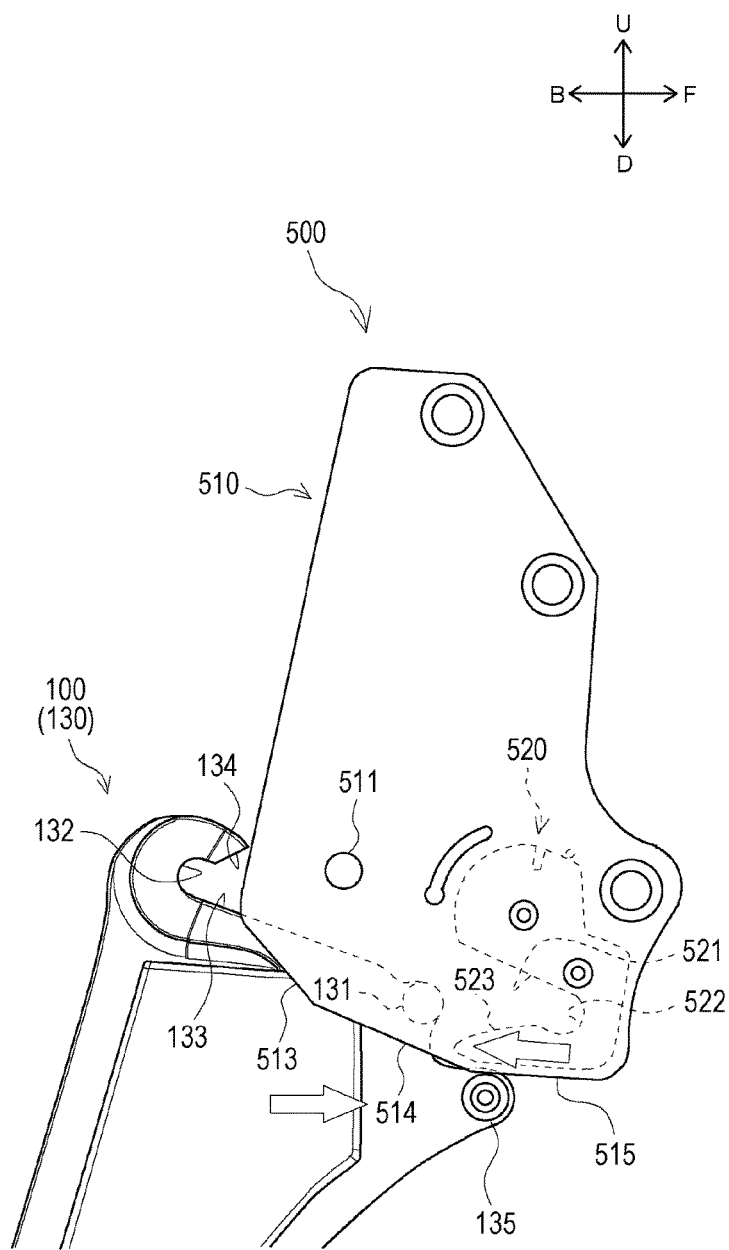
FIG. 27 is a right side view illustrating a state where the subframe third lower surface abuts the roller in mounting a subframe unit in a frontwardly inclined state on the main frame according to one or more embodiments.

As illustrated in FIG. 27, because the subframe unit 500 is inclined frontward from the original installation attitude, the subframe third lower surface 515 is in a state of being inclined slightly frontward and downward. Because of this, the subframe unit 500 relatively moves backward relative to the main frame 100 while gradually ascending (along the subframe third lower surface 515) by the subframe third lower surface 515 moving on the roller 135.

Figure 28:
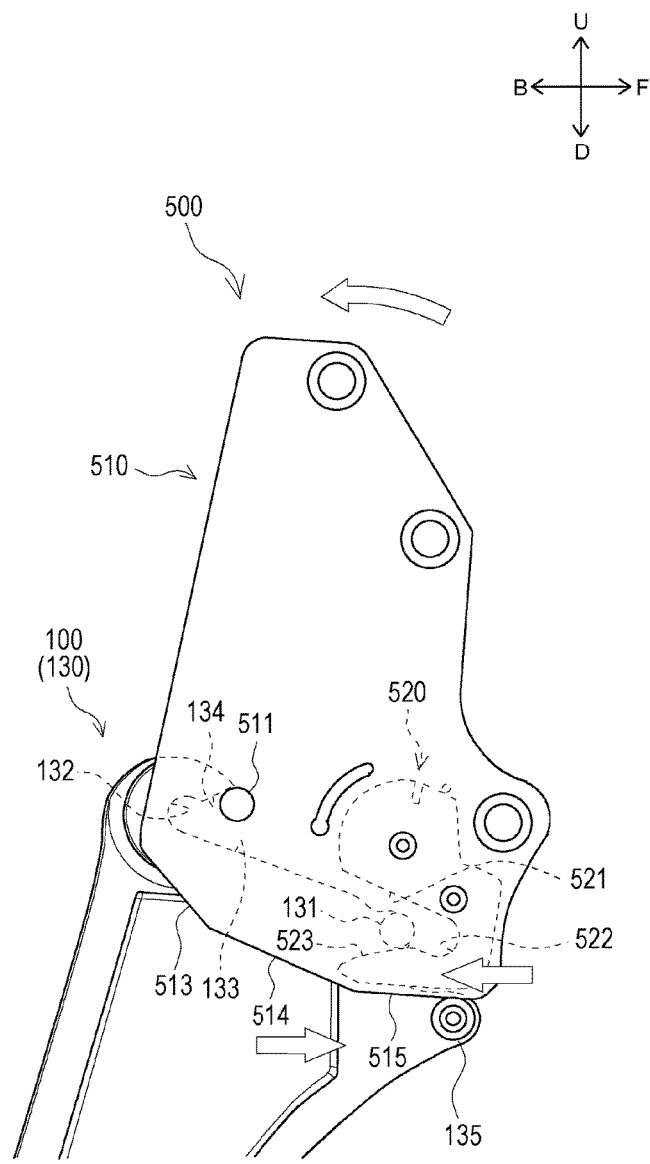
FIG. 28 is a right side view illustrating a state where the subframe-side pin abuts the main-frame-side upper slideway in mounting the subframe unit in the frontwardly inclined state on the main frame according to one or more embodiments.
Figure 29:
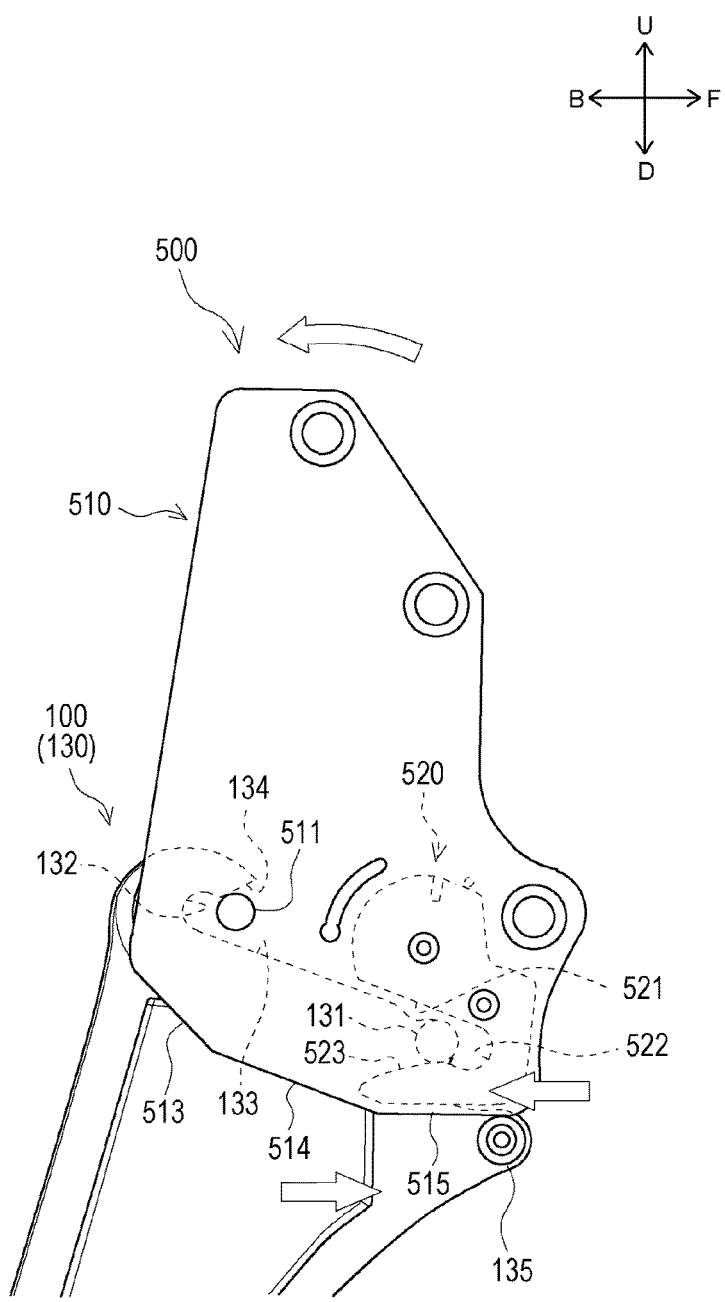
FIG. 29 is a right side view illustrating a state immediately before the subframe unit is mounted on the main frame in mounting the subframe unit in the frontwardly inclined state on the main frame according to one or more embodiments.

Because the subframe unit 500 is inclined frontward from the original attitude, a height different between the subframe-side pin 511 and the subframe third lower surface 515 is greater than a height difference between the subframe-side pin 511 and the subframe third lower surface 515 in the original attitude, which is inclined neither frontward nor backward (see FIG. 20 and the like). Therefore, when the vehicle body 1 is caused to further advance, as illustrated in FIG. 28, the subframe-side pin 511 abuts not the main-frame-side lower slideway 133 (see FIG. 20) but the main-frame-side upper slideway 134 and is guided to the main-frame-side hook 132 by the main-frame-side upper slideway 134.

At this time, the subframe third lower surface 515 attempts to move on the roller 135 at the same time as the subframe-side pin 511 attempts to move along the main-frame-side upper slideway 134. Whereas the main-frame-side upper slideway 134 is inclined backward and downward, the subframe third lower surface 515 is inclined frontward and downward; as such, when the vehicle body 1 is caused to further advance, the subframe 510 gradually inclines to the back (see FIG. 29).

When the vehicle body 1 is caused to further advance, the main-frame-side pin 131 is held by the subframe-side hook 522 and the subframe-side pin 511 is held by the main-frame-side hook 132 (see FIG. 21). At this time, the subframe third lower surface 515 separates from the roller 135.

In this manner, even if the subframe unit 500 lowered to the ground is in the frontwardly inclined state, by guiding by two slideways of different incline angles (the main-frame-side upper slideway 134 and the subframe third lower surface 515), the subframe unit 500 can be installed on the main frame 100 while correcting the attitude of the subframe unit 500 to the original attitude.

Furthermore, because the subframe-side pin 511 can be guided from above and below by the main-frame-side lower slideway 133 and the main-frame-side upper slideway 134, the subframe-side pin 511 can be guided to the main-frame-side hook 132 even if the height of the subframe-side pin 511 is shifted from the original installation height. Likewise, because the main-frame-side pin 131 can be guided from above and below by the subframe-side lower slideway 523 and the subframe-side upper slideway 521, the main-frame-side pin 131 can be guided to the subframe-side hook 522 even if the height of the subframe-side hook 522 is shifted from the original installation height.

As above, an attachment/detachment structure of the front loader 20 of one or more embodiments of the present invention is equipped with the main-frame-side pin 131 (held portion) provided on the main frame 100 provided on the vehicle body 1 or the subframe-side pin 511 (held portion) that is detachable from the main frame 100 and is provided on the subframe 510 that supports the boom 300; the main-frame-side hook 132 (holding portion) that is provided on the main frame 100 and holds the subframe-side pin 511 or the subframe-side hook 522 (holding portion) that is provided on the subframe 510 and holds the main-frame-side pin 131; the roller 135 that is rotatably provided on the main frame 100; and the subframe first lower surface 513, the subframe second lower surface 514, and the subframe third lower surface 515 (abutting portion) that can adjust the positioning in the up-down direction between the subframe-side pin 511 (held portion) and the main-frame-side hook 132 (holding portion) and the positioning in the up-down direction between the main-frame-side pin 131 (held portion) and the subframe-side hook 522 (holding portion) by moving on the roller 135 while abutting the roller 135 when the main frame 100 is relatively moved frontward so as to approach the subframe 510 at a mounting time of being provided on the subframe 510 so as to be inclined relative to a horizontal surface and mounting the subframe 510 on the main frame 100.

This configuration can make work of attaching to and detaching from the vehicle body 1 easier. Specifically, it can make positioning in the up-down direction between the main frame 100 and the subframe 510 easier at the time of mounting on the vehicle body 1.

Furthermore, the abutting portion is formed so at least a portion inclines frontward and downward.

This configuration enables the positioning between the main frame 100 and the subframe 510 to be performed while lifting the subframe 510 in a situation where, at the time of mounting on the vehicle body 1, the subframe 510 is positioned lower than the installation position.

Furthermore, the abutting portion is equipped with the subframe first lower surface 513 (first portion) that is formed to incline frontward and downward and the subframe second lower surface 514 (second portion) that is provided in front of and in continuation from the subframe first lower surface 513 and inclines frontward and downward more gently than the subframe first lower surface 513.

This configuration first lifts the subframe 510 by the subframe first lower surface 513 and next enables the positioning in the up-down direction between the main frame 100 and the subframe 510 by the subframe second lower surface 514 in the situation where, at the time of mounting on the vehicle body 1, the subframe 510 is positioned lower than the installation position.

Furthermore, equipped are the main-frame-side lower slideway 133 and the main-frame-side upper slideway 134 (guiding portion) that are provided on the main frame 100 and, at the time of mounting, guide the subframe-side pin 511 to the main-frame-side hook 132 and the subframe-side upper slideway 521 and the subframe-side lower slideway 523 (guiding portion) that are provided on the subframe 510 and, at the time of mounting, guide the main-frame-side pin 131 to the subframe-side hook 522, wherein the abutting portion is formed to guide the subframe-side pin 511 to the main-frame-side hook 132 and guide the main-frame-side pin 131 to the subframe-side hook 522 by moving on the roller 135 at the time of mounting.

This configuration enables accurate positioning to be performed by the guiding portion (the main-frame-side lower slideway 133 and the main-frame-side upper slideway 134 as well as the subframe-side upper slideway 521 and the subframe-side lower slideway 523) after rough positioning in the up-down direction between the main frame 100 and the subframe 510 is performed by the roller 135 and the abutting portion (the subframe first lower surface 513 and the subframe second lower surface 514) at the time of mounting on the vehicle body 1.

Furthermore, the guiding portion is equipped with the main-frame-side lower slideway 133 (first guiding portion) that is formed to be able to abut the subframe-side pin 511 from below at the time of mounting and is inclined so as to guide the subframe-side pin 511 to the main-frame-side hook 132, the subframe-side lower slideway 523 (first guiding portion) that is formed to be able to abut the main-frame-side pin 131 from below at the time of mounting and is inclined so as to guide the main-frame-side pin 131 to the subframe-side hook 522, the main-frame-side upper slideway 134 (second guiding portion) that is formed to be able to abut the subframe-side pin 511 from above at the time of mounting and is inclined so as to guide the subframe-side pin 511 to the main-frame-side hook 132, and the subframe-side upper slideway 521 (second guiding portion) that is formed to be able to abut the main-frame-side pin 131 from above at the time of mounting and is inclined so as to guide the main-frame-side pin 131 to the subframe-side hook 522.

This configuration can make the positioning in the up-down direction between the main frame 100 an the subframe 510 easy at the time of mounting on the vehicle body 1.

Furthermore, the abutting portion is equipped with the subframe first lower surface 513 (first portion) that is formed inclining frontward and downward, the subframe second lower surface 514 (second portion) that is provided in front of and in continuation from the subframe first lower surface 513 and inclines frontward and downward more gently than the subframe first lower surface 513, and the subframe third lower surface 515 (third portion) that is provided in front of and in continuation from the subframe second lower surface 514 and is formed to be substantially horizontal and at an incline angle different from that of the guiding portion, wherein the subframe third lower surface 515 is formed to move on the roller 135 when the held portion is being guided to the holding portion by the guiding portion at the time of mounting.

This configuration enables an angle of the subframe 510 to be adjusted at the time of mounting on the vehicle body 1.

Furthermore, the roller 135 is formed in the hourglass shape whose central portion in the width direction of the vehicle body 1 has a small diameter.

This configuration can make the positioning in the width direction of the vehicle body 1 between the main frame 100 and the subframe 510 easy at the time of mounting on the vehicle body 1.

Furthermore, the front loader 20 of one or more embodiments of the present invention is equipped with the attachment/detachment structure above.

This configuration enables a front loader 20 to be provided that can make the work of attaching to and detaching from the vehicle body 1 easier.

Furthermore, the tractor (work vehicle) of one or more embodiments of the present invention is provided with the front loader 20 above.

This configuration enables a tractor (work vehicle) to be provided that can make the work of attaching and detaching the front loader 20 to and from the vehicle body 1 easier.

Note that the main-frame-side pin 131 and the subframe-side pin 511 are examples of the held portion of one or more embodiments of the present invention.

Furthermore, the main-frame-side hook 132 and the subframe-side hook 522 are examples of the holding portion of one or more embodiments of the present invention.

Furthermore, the main-frame-side lower slideway 133 and main-frame-side upper slideway 134 as well as the subframe-side upper slideway 521 and subframe-side lower slideway 523 are examples of the guiding portion of one or more embodiments of the present invention.

Furthermore, the main-frame-side lower slideway 133 and the subframe-side lower slideway 523 are examples of the first guiding portion of one or more embodiments of the present invention.

Furthermore, the main-frame-side upper slideway 134 and the subframe-side upper slideway 521 are examples of the second guiding portion of one or more embodiments of the present invention.

Furthermore, the subframe first lower surface 513 is an example of the first portion of one or more embodiments of the present invention.

Furthermore, the subframe second lower surface 514 is an example of the second portion of one or more embodiments of the present invention.

Furthermore, the subframe third lower surface 515 is an example of the third portion of one or more embodiments of the present invention.

Although embodiments of the present invention are described above, the present invention is not limited to this configuration, and many variations are possible within the scope of the invention as stated in the claims.

For example, although one or more embodiments provide two holding portions and two held portions, one or more embodiments may provide one of each. That is, it may provide only one set among a set of the main-frame-side hook 132 (holding portion) and the subframe-side pin 511 (held portion) and a set of the subframe-side hook 522 (holding portion) and the main-frame-side pin 131 (held portion).

Furthermore, although one or more embodiments provide a pair of upper and lower guiding portions, the present invention may provide only an upper guiding portion or a lower guiding portion. That is, it may provide only the main-frame-side lower slideway 133 or the main-frame-side upper slideway 134 or provide only the subframe-side upper slideway 521 or the subframe-side lower slideway 523.

Furthermore, although one or more embodiments form the subframe first lower surface 513 in the back portion of the lower surface of the subframe 510, the present invention is not limited thereto, and one or more embodiments may form this, for example, in a front-back intermediate portion of the lower surface of the subframe 510.

Furthermore, although one or more embodiments configure the lower surface of the subframe 510 by a plurality of flat surfaces of different incline angles (the subframe first lower surface 513, the subframe second lower surface 514, and the subframe third lower surface 515), one or more embodiments of the present invention may configure this by a curved surface whose incline angle becomes gentler in the course of heading frontward.

The stand 200 equipped by the front loader 20 is specifically described below using FIGS. 30 to 44.

The stand 200, illustrated in FIGS. 30 to 33, is for causing the front loader 20 removed from the vehicle body 1 of the tractor to stand independently. One stand 200 each (a pair of left and right stands) is provided to lower-front portions of the left and right booms 300. The stand 200 can be switched between a storage position of being stored along the boom 300 and a supporting position of contacting the ground and being able to support a weight of the front loader 20.

Note that FIGS. 30 to 39 illustrate a state where the stand 200 is in the storage position. Hereinbelow, a configuration of the stand 200 is described based on the state where the stand 200 is in the storage position. Moreover, because the left and rights stands 200 are configured identically, the description below principally focuses on one stand 200 (the stand 200 provided on the right boom 300).

The stand 200 is principally equipped with a main-body portion (main body) 210, a grounding-portion swing shaft 220, a grounding portion (grounding member) 230, a swinging portion (swinging member) 240, an engagement lever 250, and a biasing member 260.

The main-body portion 210, illustrated in FIGS. 32 to 35, is provided in a swingable manner on the boom 300. The main-body portion 210 is formed in a longitudinal shape extending so as to be long in one direction. The main-body portion 210 is formed to be substantially U-shaped in a longitudinal cross section. Specifically, the main-body portion 210 is principally equipped with a bottom surface portion 211, a left surface portion 212, a right surface portion 213, a swing shaft 214, a guiding portion (guiding hole) 215, a holding portion 216, a sliding portion 217, and a bracket 218.

The bottom surface portion 211 is a portion forming a bottom surface of the main-body portion 210. The bottom surface portion 211 is formed in a plate shape whose plate surface substantially faces the up-down direction. The bottom surface portion 211 is formed to extend so as to be long substantially in the front-back direction.

The left surface portion 212 and the right surface portion 213 are portions forming side surfaces of the main-body portion 210. The left surface portion 212 and the right surface portion 213 are formed so as to extend substantially upward from both left and right end portions of the bottom surface portion 211. The left surface portion 212 and the right surface portion 213 are formed in a plate shape whose plate surface faces the left-right direction. The left surface portion 212 and the right surface portion 213 are formed to span an entirety of a longitudinal direction of the bottom surface portion 211.

The swing shaft 214 connects the main-body portion 210 to the boom 300 in a swingable manner. The swing shaft 214 is formed in a substantially cylindrical shape whose axis faces left and right. The swing shaft 214 is disposed so as to penetrate, left and right, vicinities of front end portions of the left surface portion 212 and the right surface portion 213. The swing shaft 214 is rotatably supported on a main-body-portion bracket 310 provided in the lower-front portion of the boom 300. The swing shaft 214 connects the main-body portion 210 to the boom 300 so as to be able to swing up and down.

Figure 36A:
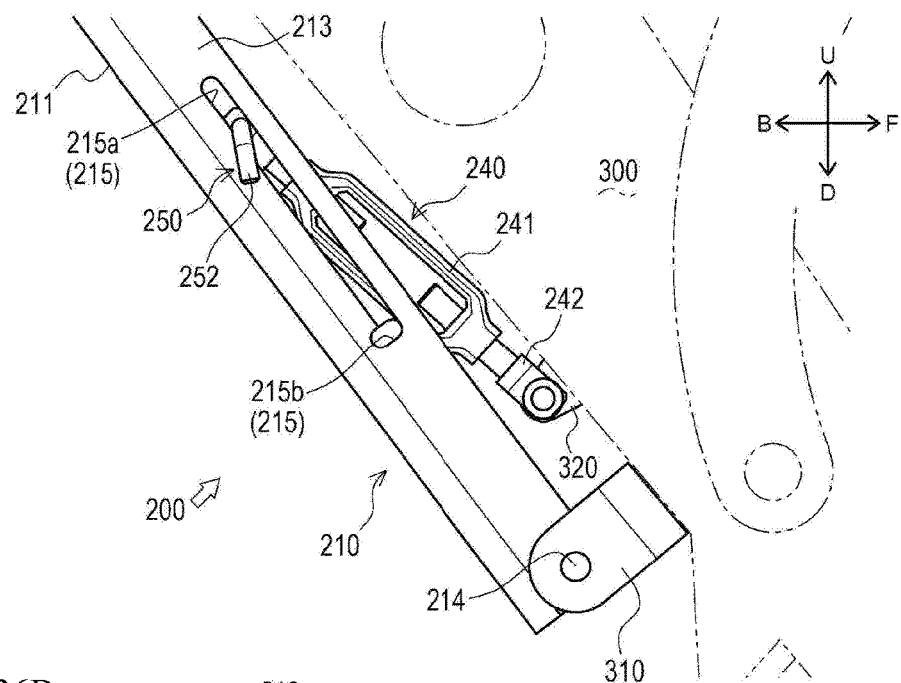
FIG. 36A is a side view illustrating a front end portion of the stand according to one or more embodiments.
Figure 36B:
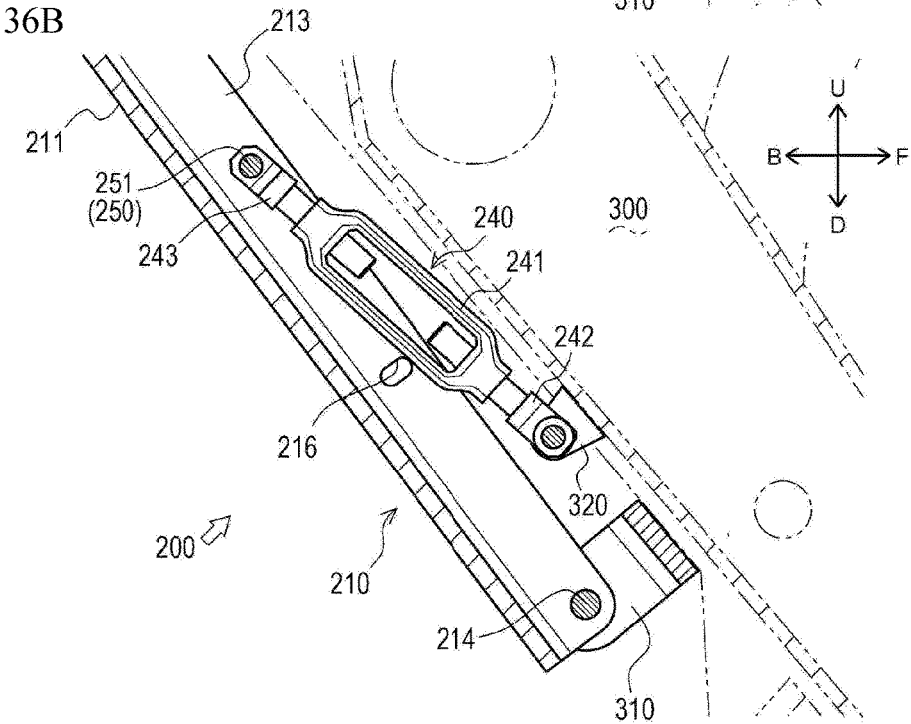
FIG. 36B is a side-view cross section of one or more embodiments.
Figure 37:
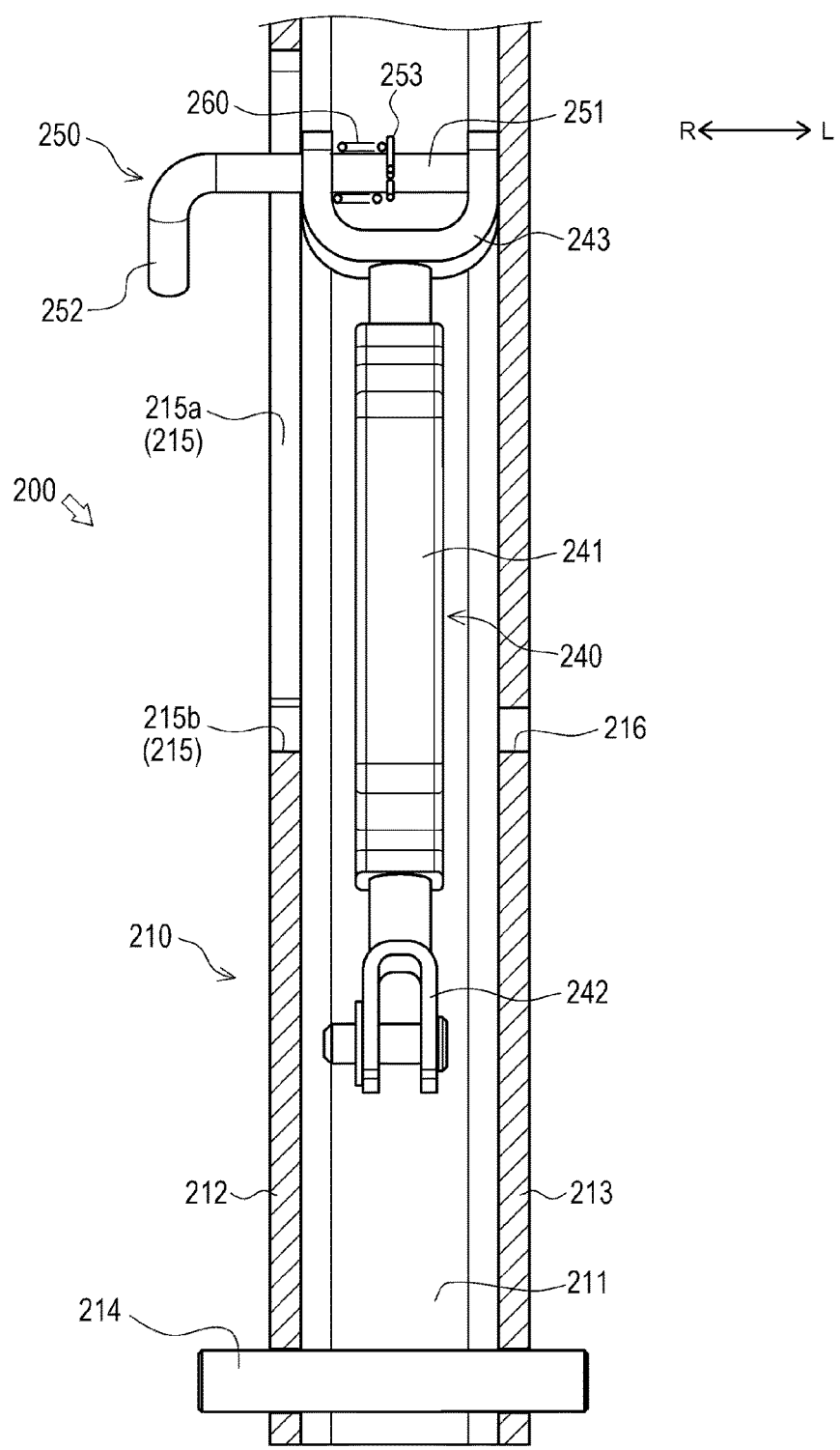
FIG. 37 is a partial cross section of the front end portion of the stand in FIG. 35.

The guiding portion 215, illustrated in FIGS. 36A, 36B, and 37, is a portion that guides the engagement lever 250, which is described below. The guiding portion 215 is formed by a hole that penetrates the right surface portion 213 left and right. The guiding portion 215 is formed in a front-back intermediate portion of the main-body portion 210 (right surface portion 213). The guiding portion 215 is principally equipped with a first guiding portion 215*a* and a second guiding portion 215*b*.

The first guiding portion 215*a* is formed substantially parallel to the longitudinal direction of the main-body portion 210 (right surface portion 213). More specifically, the first guiding portion 215*a* is formed to extend along a line that passes through the swing shaft 214 (swing center of the main-body portion 210) when viewed from an axial direction of the swing shaft 214 (in a side view). The first guiding portion 215*a* is formed to extend a predetermined length. The length of the first guiding portion 215*a* is determined as appropriate according to an attitude of the stand 200 (the storage position and the supporting position).

The second guiding portion 215*b* is formed to be continuous with one end (front end) of the first guiding portion 215*a*. The second guiding portion 215*b* is formed to extend substantially perpendicularly to the longitudinal direction of the main-body portion 210 (that is, the first guiding portion 215*a*). The second guiding portion 215*b* is formed to extend downward from a front end portion of the first guiding portion 215*a*. More specifically, the second guiding portion 215*b* is formed to extend along a line that does not pass through the swing shaft 214 when viewed from the axial direction of the swing shaft 214. The second guiding portion 215*b* is formed to extend a predetermined length. The length of the second guiding portion 215*b* is determined as appropriate according to a swing amount of the front loader 20 when detaching/attaching the front loader 20.

The holding portion 216 is a portion that holds the engagement lever 250 that is described below. The holding portion 216 is formed by a hole that penetrates the left surface portion 212 left and right. The holding portion 216 is formed in a position that opposes, in terms of left and right, the second guiding portion 215*b* formed in the right surface portion 213. Moreover, the holding portion 216 is formed to have the same shape as the second guiding portion 215*b* in a side view. That is, the holding portion 216 is formed to extend substantially perpendicularly to the longitudinal direction of the main-body portion 210.

Figure 38:
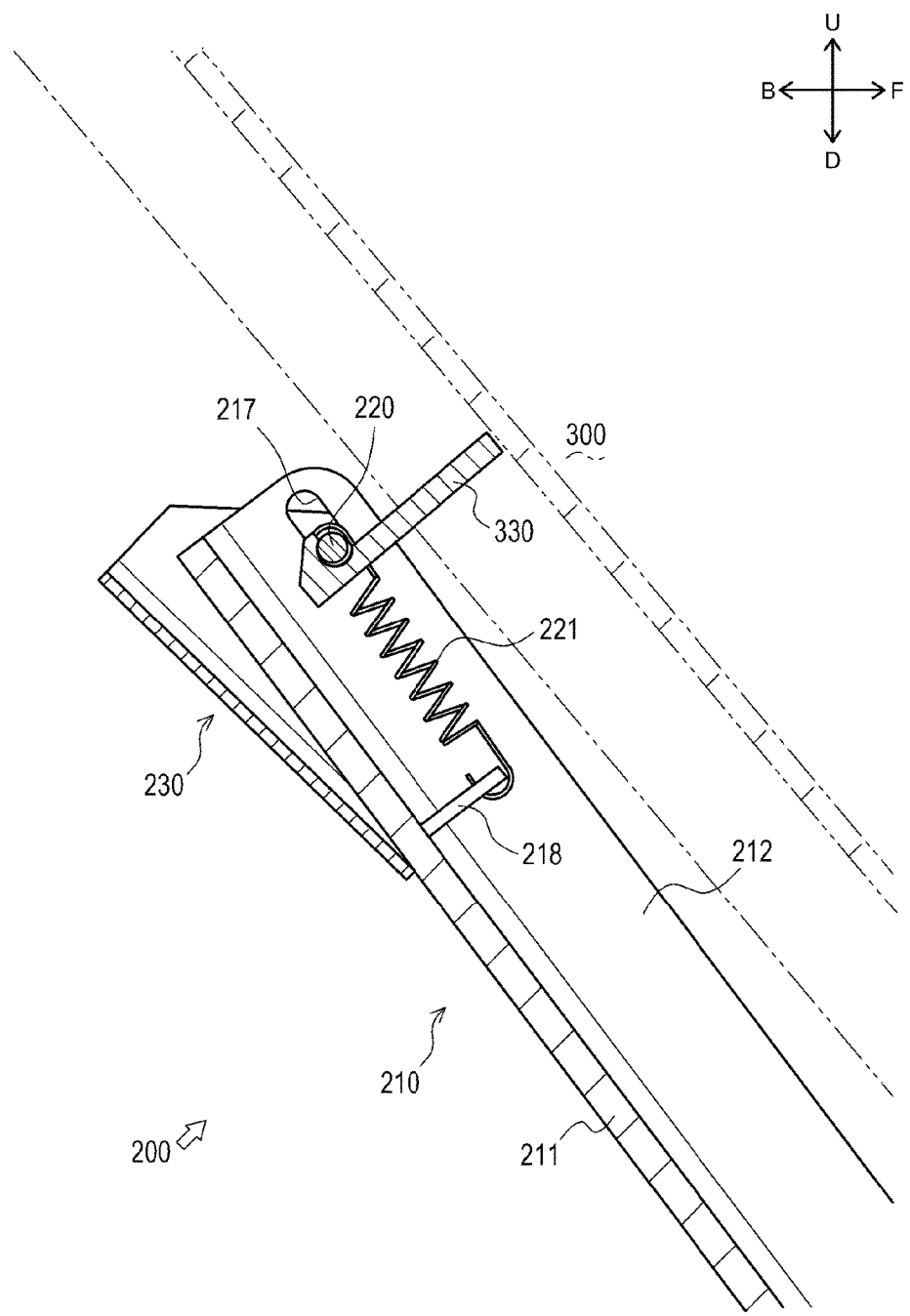
FIG. 38 is a side-view cross section illustrating a back end portion of the stand according to one or more embodiments.
Figure 39:
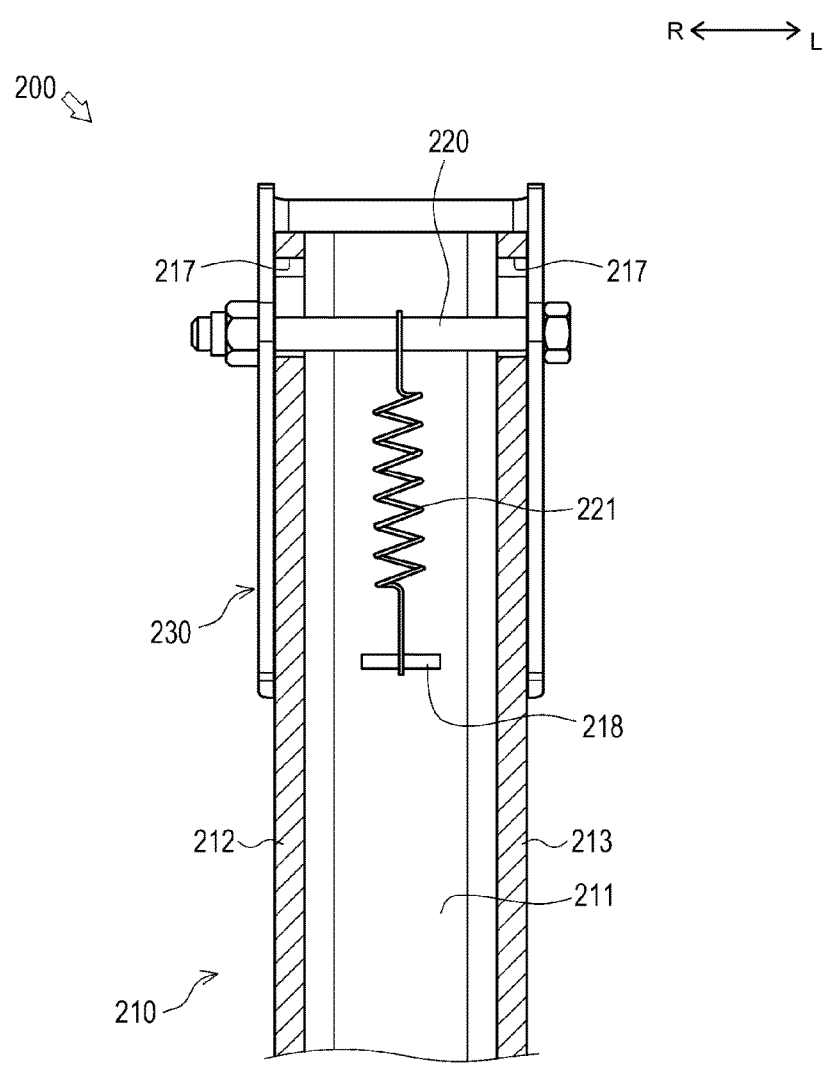
FIG. 39 is a partial cross section of the back end portion of the stand in FIG. 35.

The sliding portion 217, illustrated in FIGS. 38 and 39, is a portion that guides the grounding-portion swing shaft 220, which is described below, in a slidable manner. The sliding portion 217 is formed by a pair of holes that penetrates, left and right, the left surface portion 212 and the right surface portion 213. The sliding portion 217 is formed in a vicinity of a back end portion of the main-body portion 210 (the left surface portion 212 and the right surface portion 213). The sliding portion 217 is formed extending a predetermined length substantially parallel to a longitudinal direction of the left surface portion 212 and the right surface portion 213. The length of the sliding portion 217 is determined as appropriate to a length of an extent that enables the grounding-portion swing shaft 220 that is described below and an engaging portion 330 to engage or enables this engagement to be released.

The bracket 218 is a plate-shaped portion fixed to the bottom surface portion 211. The bracket 218 is provided in a vicinity of a back end portion of an upper surface of the bottom surface portion 211 (in front of the sliding portion 217). The bracket 218 is provided so a plate surface faces substantially front and back and so as to be perpendicular to the bottom surface portion 211.

The grounding-portion swing shaft 220 connects the grounding portion 230, described below, to the main-body portion 210 in a swingable manner. The grounding-portion swing shaft 220 is formed in a substantially cylindrical shape whose axis faces left and right. In one or more embodiments of the present invention, a bolt that is longer than a left-right width of the main-body portion 210 (left-right width of the left surface portion 212 and the right surface portion 213) is used as the grounding-portion swing shaft 220. The grounding-portion swing shaft 220 is inserted into the sliding portion 217 of the main-body portion 210. This enables the grounding-portion swing shaft 220 to slide in the sliding portion 217 along a longitudinal direction of the sliding portion 217. The biasing member 221 is engaged with the grounding-portion swing shaft 220.

The biasing member 221 biases the grounding-portion swing shaft 220 in one direction. The biasing member 221 is configured by a tension coil spring. One end of the biasing member 221 is engaged with the grounding-portion swing shaft 220. Another end portion of the biasing member 221 is engaged with the bracket 218. This continually biases the grounding-portion swing shaft 220 to slide frontward in the sliding portion 217.

Note that as illustrated in FIG. 38, in the state where the stand 200 is switched to the storage position, the grounding-portion swing shaft 220 engages with the engaging portion 330, which is provided on a lower surface of the boom 300. The engaging portion 330 is formed extending downward from the boom 300 and is formed to be substantially L-shaped in a side view, with a lower end portion protruding backward. The grounding-portion swing shaft 220 can engage with the lower end portion of the engaging portion 330.

Figure 32:
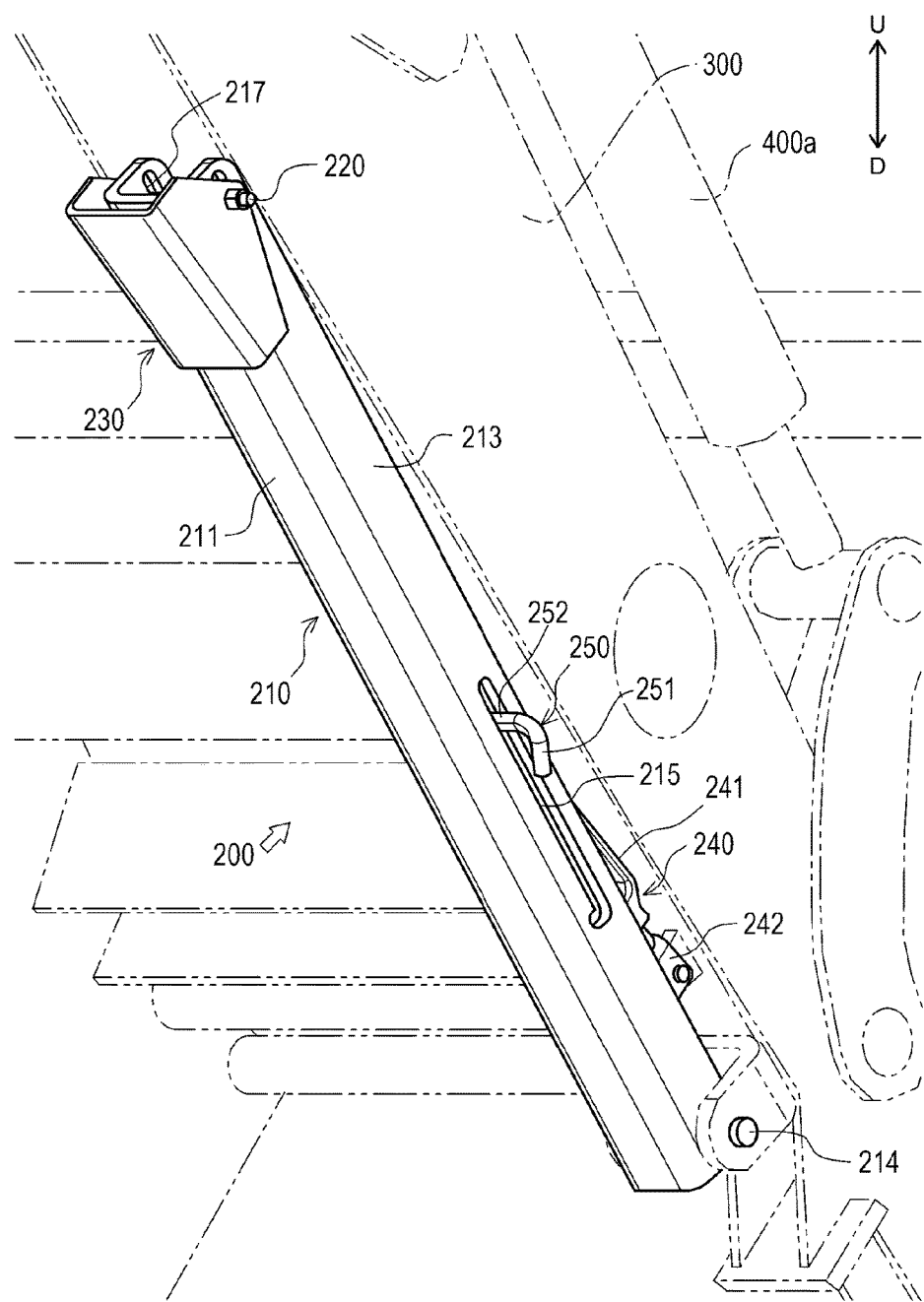
FIG. 32 is a right-back perspective view illustrating the stand according to one or more embodiments.

The grounding portion 230, illustrated in FIGS. 32, 38, and 39, is a portion that contacts the ground when causing the front loader 20 to stand independently. The grounding portion 230 is formed in an upwardly opened steel-channel shape by respectively bending both end portions, left and right, of a steel plate upward. The back end portion of the main-body portion 210 is inserted between both side surfaces, left and right, of the grounding portion 230. In this state, the grounding-portion swing shaft 220 is inserted into both side surfaces, left and right, of the grounding portion 230. This connects the grounding portion 230 in a swingable manner to the main-body portion 210 via the grounding-portion swing shaft 220.

The swinging portion 240, illustrated in FIGS. 36A, 36B, and 37, is a portion that swings in conjunction with the swinging of the main-body portion 210. The swinging portion 240 is principally equipped with a body portion 241, a first connecting portion 242, and a second connecting portion 243.

The body portion 241 is a member that is formed in a longitudinal shape and forms a central portion of the swinging portion 240. Screw holes (not illustrated) are respectively formed in both end portions of the body portion 241.

The first connecting portion 242 is a portion connected to the boom 300. One end portion (back end portion) of the first connecting portion 242 is threaded and fastened in the screw hole in one end portion (front end portion) of the body portion 241. Another end portion (front end portion) of the first connecting portion 242 is connected to the boom 300 so as to be able to rotate up and down. Specifically, a swinging-portion bracket 320 is provided in the lower-front portion of the boom 300 (immediately behind the main-body-portion bracket 310). The front end portion of the first connecting portion 242 is rotatably connected to the swinging-portion bracket 320 via a shaft member.

The second connecting portion 243 is a portion connected to the main-body portion 210 via the engagement lever 250 that is described below. One end portion (front end portion) of the second connecting portion 243 is threaded and fastened in the screw hole in the other end (back end portion) of the body portion 241. Another end portion (back end portion) of the second connecting portion 243 is connected to the main-body portion 210 via the engagement lever 250 that is described below.

By rotating the body portion 241 in an appropriate direction, the swinging portion 240 can change fastening positions of the first connecting portion 242 and the second connecting portion 243 relative to the body portion 241 and freely change a total length of the swinging portion 240. This enables the swinging portion 240 to freely change a length from a position of connecting to the boom 300 (swing center relative to the boom 300) to a position of connecting to the engagement lever 250.

The engagement lever 250 connects the swinging portion 240 and the main-body portion 210 and regulates the swinging of the main-body portion 210 as appropriate. The engagement lever 250 is principally equipped with an insertion portion 251, a gripping portion 252, and a pin 253.

The insertion portion 251 is a portion that is inserted into the main-body portion 210 and the swinging portion 240. The insertion portion 251 is formed in a substantially cylindrical shape whose axis faces left and right. The insertion portion 251 is inserted so as to be able to slide left and right relative to the second connecting portion 243 of the swinging portion 240. Moreover, a left end portion of the insertion portion 251 is extended to outside the main-body portion 210 via the guiding portion 215 of the main-body portion 210. This guides the insertion portion 251 (engagement lever 250) so as to move along the guiding portion 215 and causes a movement range thereof to be regulated by the guiding portion 215.

The gripping portion 252 is a portion gripped by the worker when operating the engagement lever 250. The gripping portion 252 is formed so as to extend from the left end portion of the insertion portion 251 in a direction substantially perpendicular to the insertion portion 251. The gripping portion 252 is formed so as to be positioned on an outer side (to the left) of the main-body portion 210. The insertion portion 251 and the gripping portion 252 can be formed by bending a single cylindrical steel member.

The pin 253, illustrated in FIG. 37, is a portion that abuts the biasing member 260, which is described below. The pin 253 is fixed to the insertion portion 251 on an inner side of the main-body portion 210 (between the left surface portion 212 and the right surface portion 213).

The biasing member 260 biases the engagement lever 250 in one direction. The biasing member 260 is configured by a compression coil spring. The biasing member 260 is inserted into the insertion portion 251 of the engagement lever 250 and disposed between a left end portion of the second connecting portion 243 and the pin 253. The biasing member 260 thereby continually biases the pin 253 (that is, the engagement lever 250) to the right.

The state where the stand 200 configured as above is in the storage position is described below.

Figure 33:
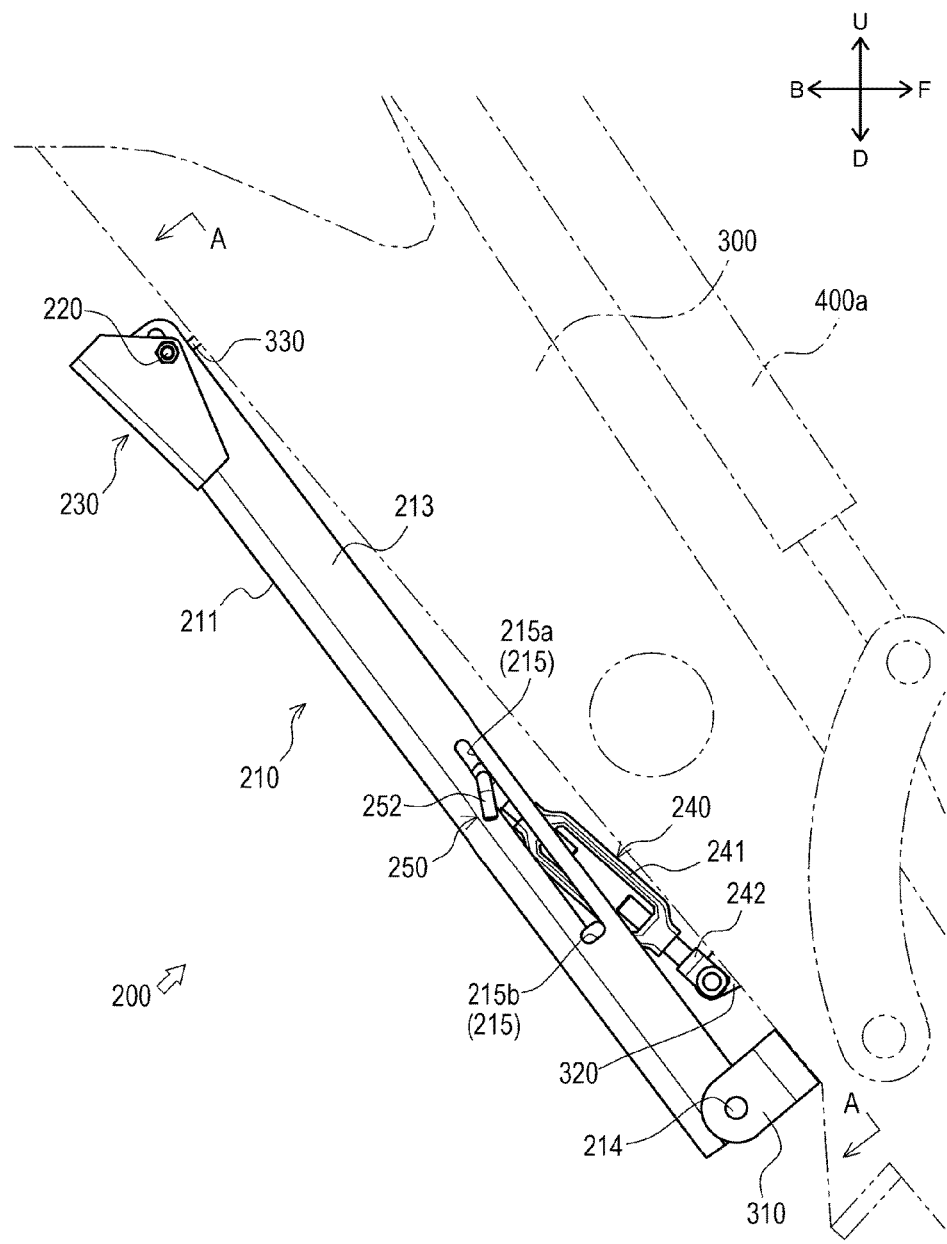
FIG. 33 is a side view illustrating the stand according to one or more embodiments.
Figure 34:
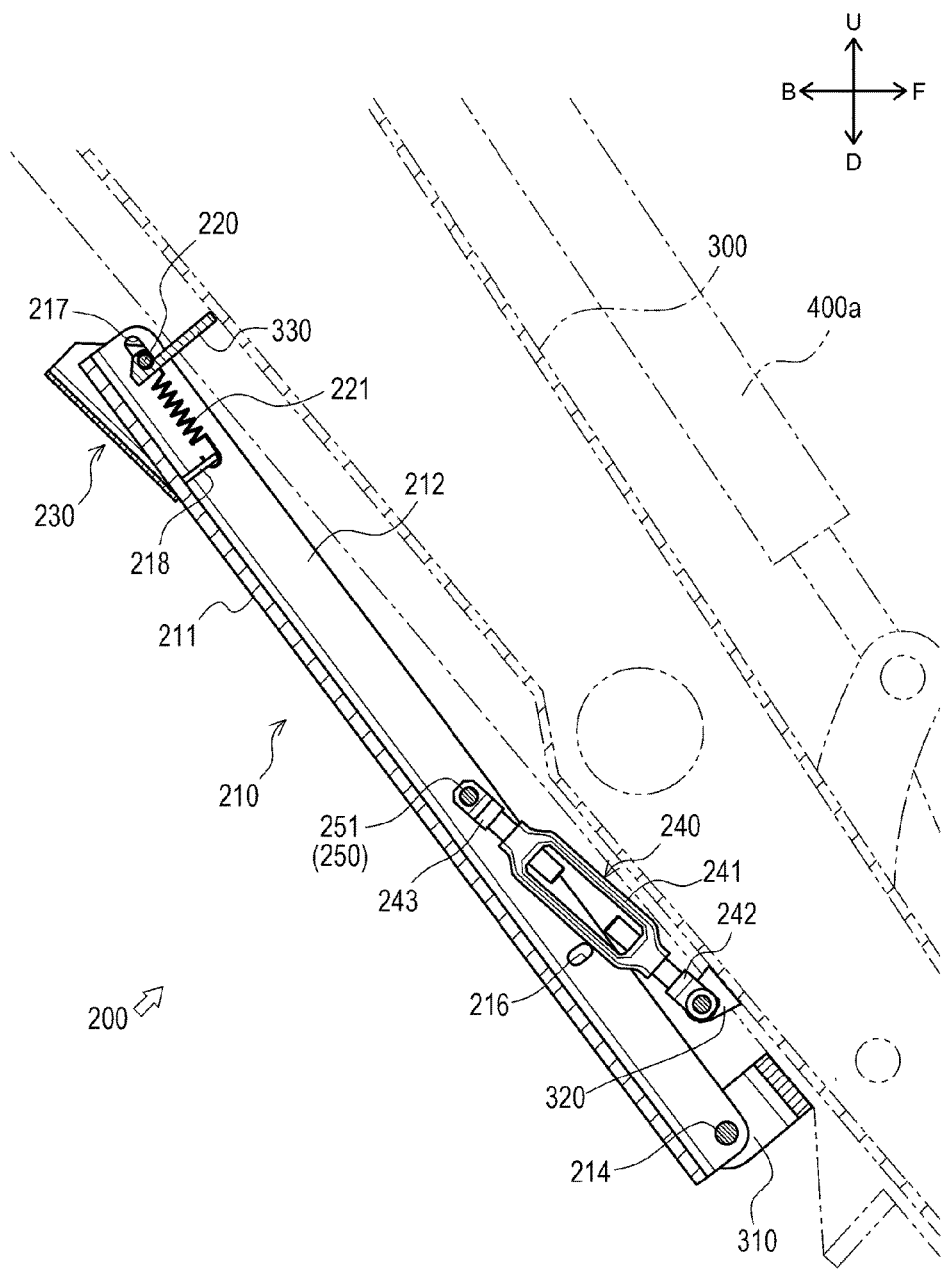
FIG. 34 is a side-view cross section illustrating the stand according to one or more embodiments.
Figure 35:
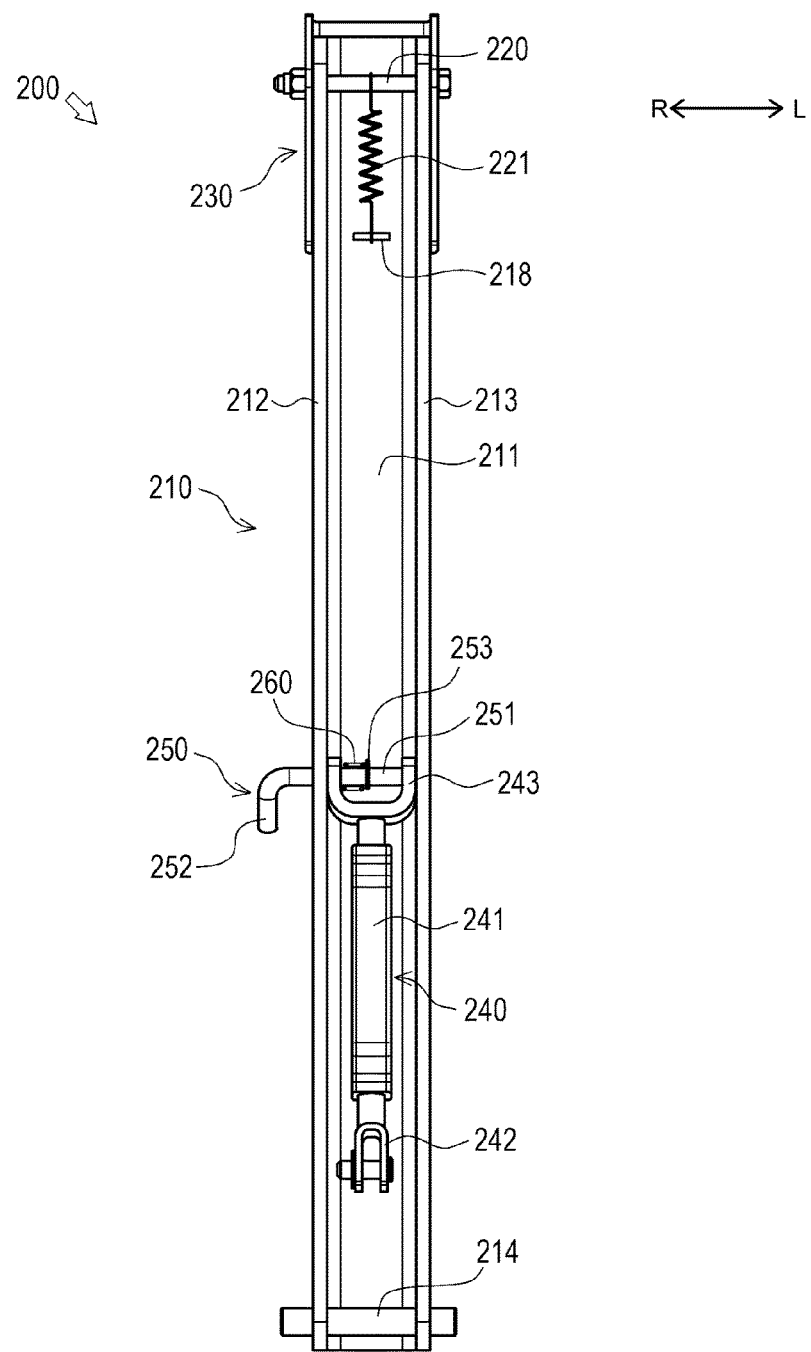
FIG. 35 is a view at A-A in FIG. 33.

As illustrated in FIGS. 32 and 33, in a situation where the stand 200 (main-body portion 210) is in the storage position, the main-body portion 210 is disposed along the boom 300. At this time, as illustrated in FIG. 38, the grounding-portion swing shaft 220 is engaged with the engaging portion 330. Because the grounding-portion swing shaft 220 is biased to the front (in a direction of engaging with the engaging portion 330) by the biasing member 221, the engagement of the grounding-portion swing shaft 220 is not released even if the front loader 20 is met with some impact or the like.

In this manner, by the grounding-portion swing shaft 220 engaging with the engaging portion 330, the main-body portion 210 swinging relative to the boom 300 can be regulated. That is, by the engagement between the grounding-portion swing shaft 220 and the engaging portion 330, the main-body portion 210 can be held in the storage position.

Next, the stand 200 being switched from the storage position to the supporting position is described.

Figure 40:
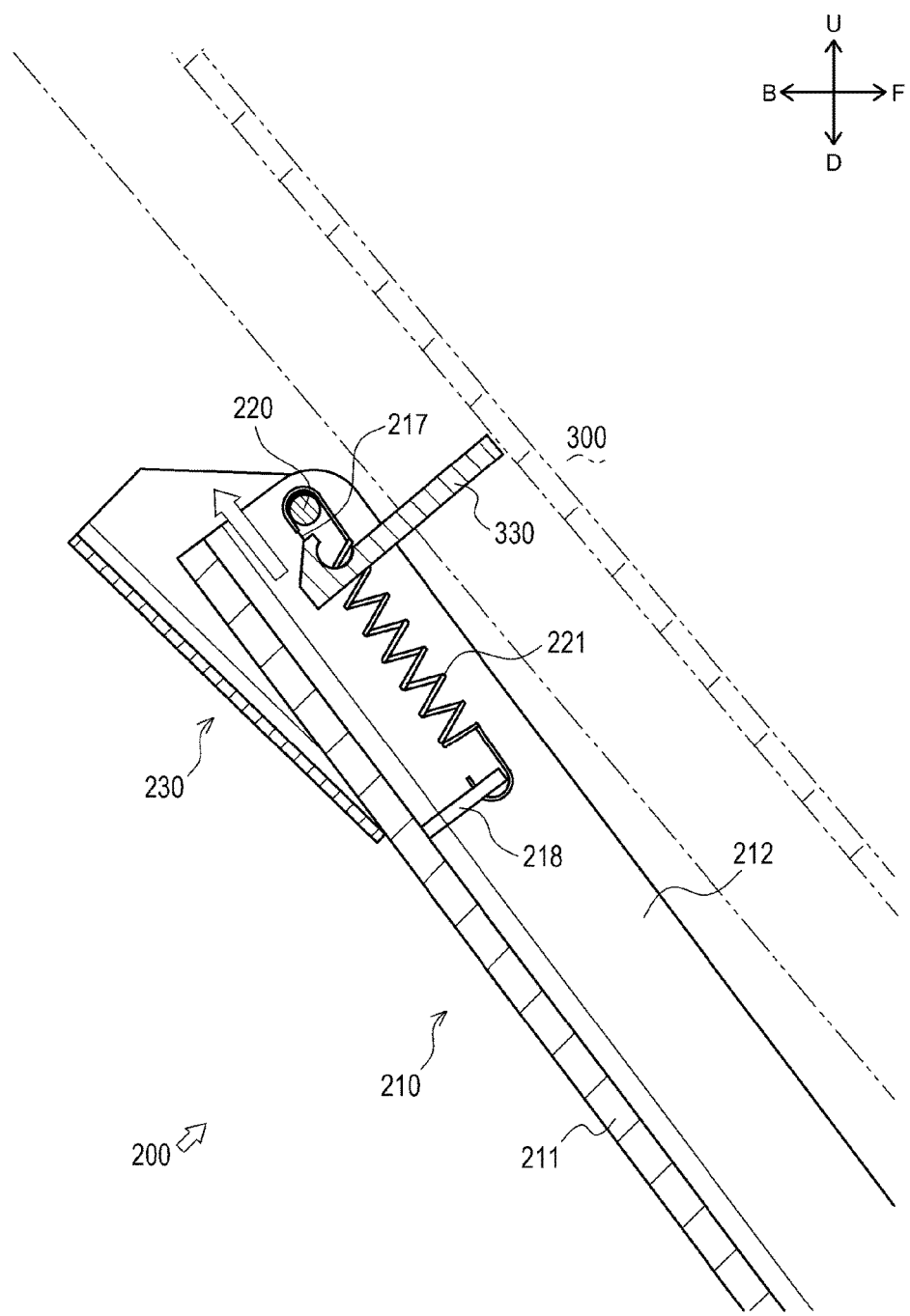
FIG. 40 is a side-view cross section illustrating a state where a grounding portion is slid according to one or more embodiments.

In a situation of switching the stand 200 to the supporting position, first, as illustrated in FIG. 40, the worker grips the grounding portion 230 and slides the grounding portion 230 backward. This causes the grounding-portion swing shaft 220 to slide backward in the sliding portion 217 against the biasing force of the biasing member 221. When the grounding-portion swing shaft 220 slides backward, the engagement between the grounding-portion swing shaft 220 and the engagement portion 330 is released. In this state, the main-body portion 210 becomes able to swing relative to the boom 300.

In this manner, in the situation of switching the stand 200 (main-body portion 210) from the storage position to the supporting position, the worker can easily release the engagement of the main-body portion 210 by simply sliding the grounding portion 230 (see FIG. 40).

Figure 41:
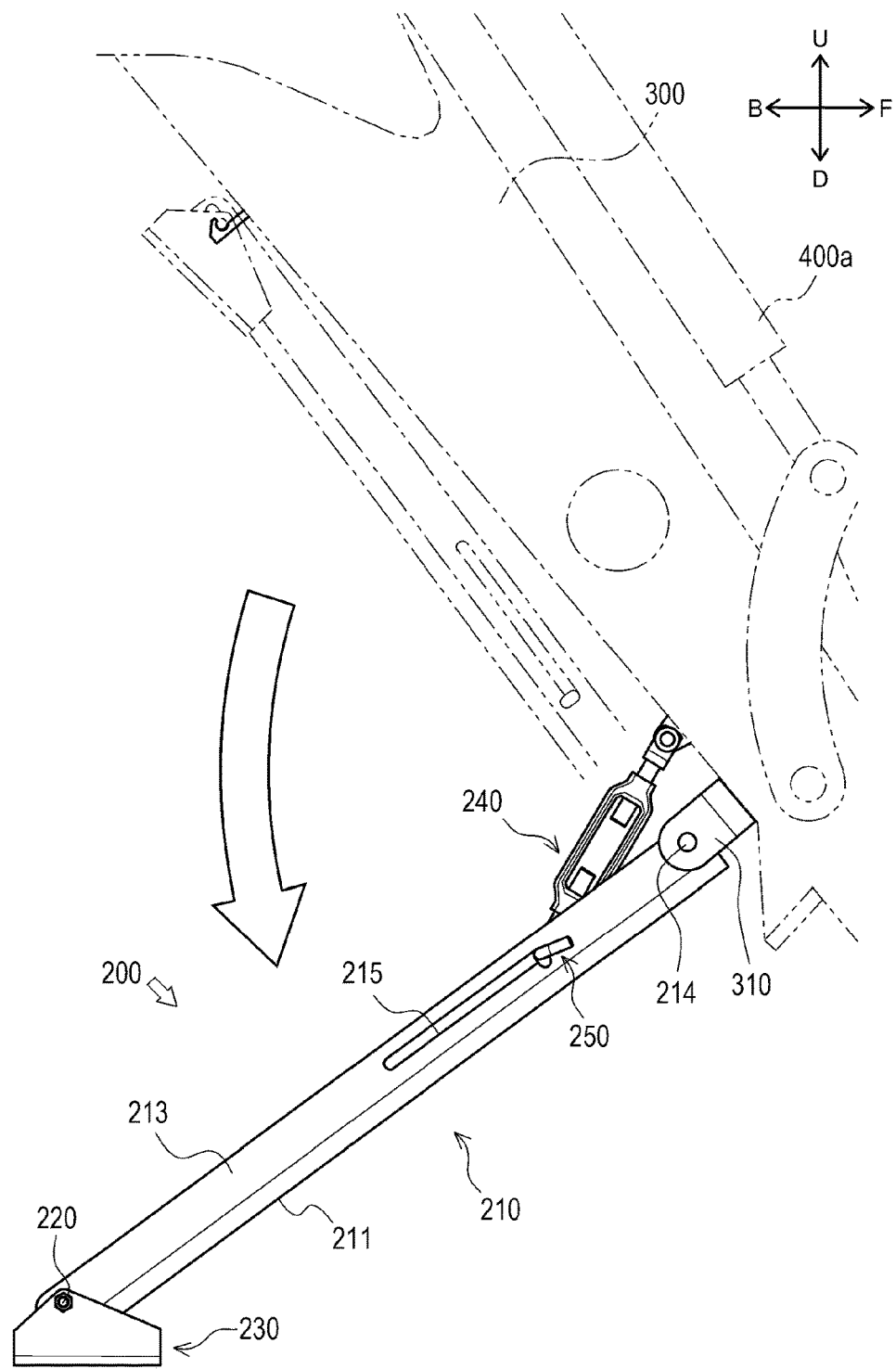
FIG. 41 is a side view illustrating swinging a main-body portion downward according to one or more embodiments.
Figure 42:
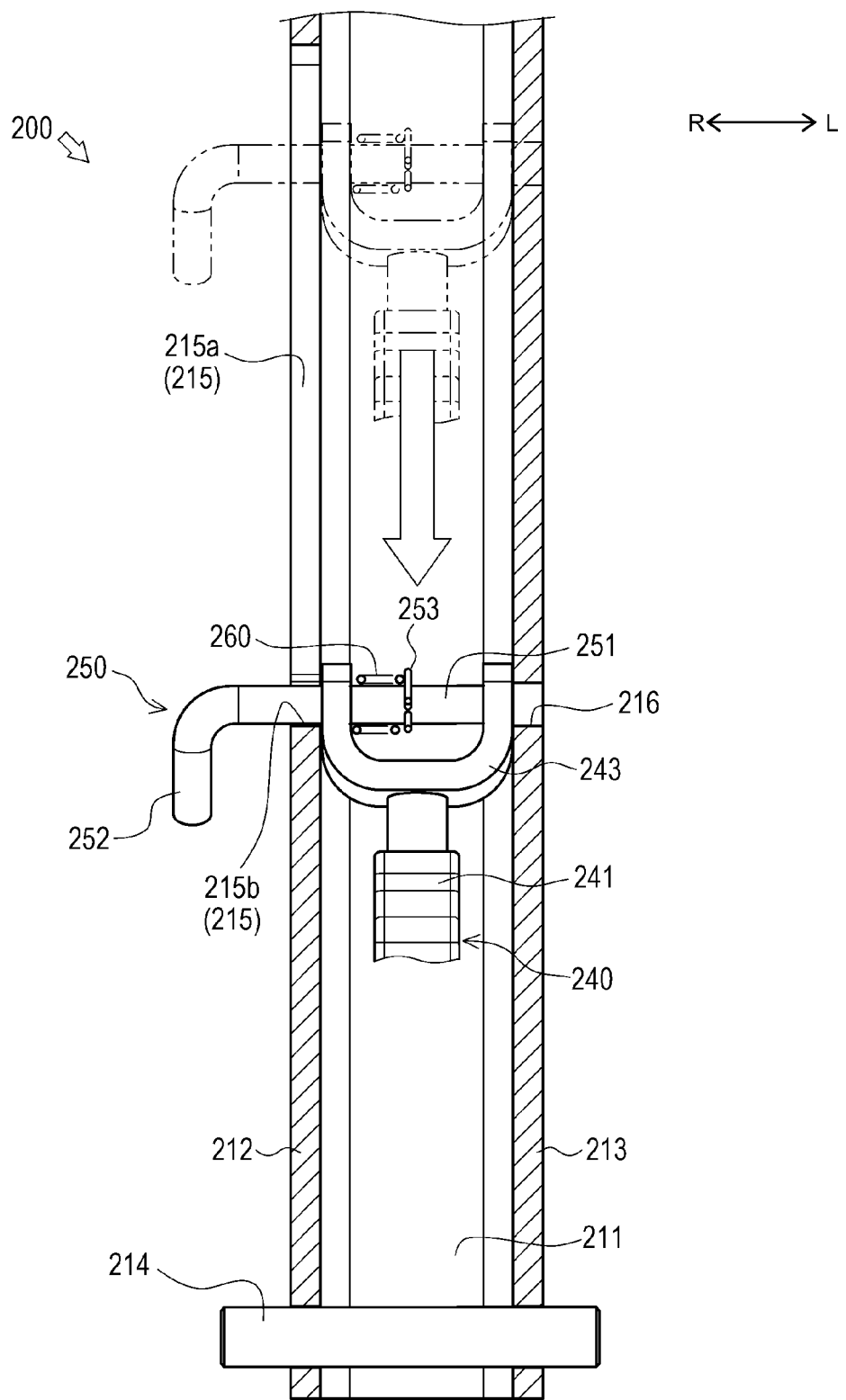
FIG. 42 is a diagram illustrating an engagement lever moving in a guiding portion according to one or more embodiments.

Next, as illustrated in FIG. 41, the worker swings the main-body portion 210 downward. At this time, as illustrated in FIG. 42, in conjunction with the swinging of the main-body portion 210, the engagement lever 250 moves in the guiding portion 215 (first guiding portion 215a) of the main-body portion 210 toward the second guiding portion 215b. At this time, because the movement range of the engagement lever 250 is limited to within the guiding portion 215, the swingable range of the main-body portion 210 is also regulated. This can prevent the main-body portion 210 from swinging to an unintended position.

Figure 43:
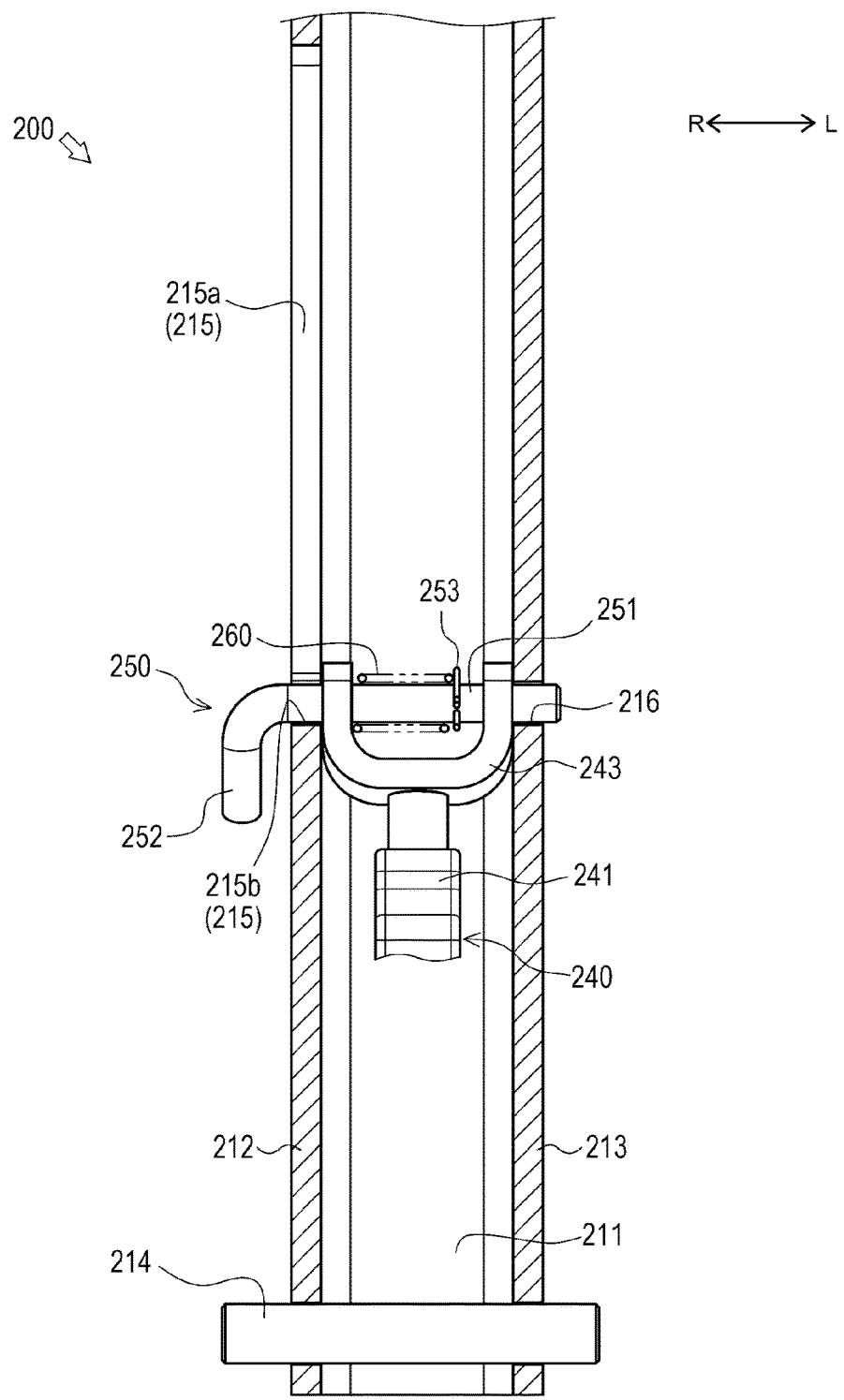
FIG. 43 is a diagram illustrating the engagement lever engaging with a holding portion according to one or more embodiments.

When the main-body portion 210 reaches the supporting position, as illustrated in FIG. 43, the insertion portion 251 of the engagement lever 250 reaches a position of opposing the holding portion 216 formed in the main-body portion 210. When the insertion portion 251 opposes the holding portion 216, the insertion portion 251 slides to the right due to the biasing force of the biasing member 260 and is inserted into the holding portion 216.

When the insertion portion 251 is inserted into the holding portion 216, the holding portion 216 regulates the movement of the insertion portion 251 (engagement lever 250). This can regulate the main-body portion 210 swinging relative to the boom 300. That is, engagement between the engagement lever 250 and the holding portion 216 can hold the main-body portion 210 in the supporting position.

Figure 44:
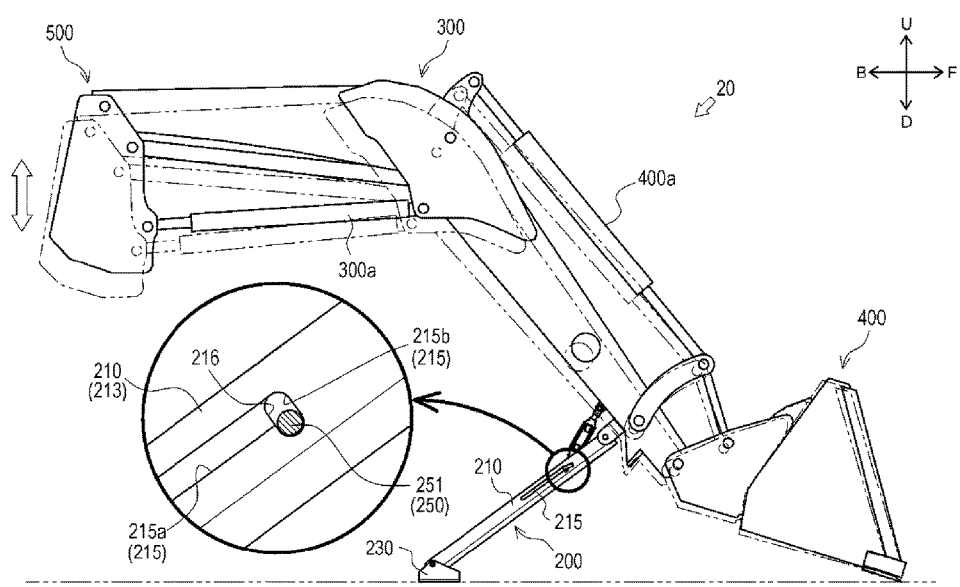
FIG. 44 is a side view illustrating swinging of an independent front loader being permitted according to one or more embodiments.

As illustrated in FIG. 44, by the stand 200 switched to the supporting position, the front loader 20 removed from the vehicle body 1 of the tractor can be made to stand independently. That is, by contacting the ground with the grounding portion 230 of the stand 200 and the bucket 400, the front loader 20 can be stably supported.

Furthermore, the stand 200 can be switched from the supporting position to the storage position by a roughly reverse sequence from the above (sequence of switching the stand 200 from the storage position to the supporting position).

That is, the worker grips the gripping portion 252 of the engagement lever 250 in the state illustrated in FIG. 43 (state of being engaged with the holding portion 216) and slides the engagement lever 250 to the left. This releases the engagement between the engagement lever 250 and the holding portion 216 and enables the main-body portion 210 to swing.

In this manner, in a situation of switching the stand 200 (main-body portion 210) from the supporting position to the storage position, the worker can easily release the engagement of the main-body portion 210 by simply sliding the engagement lever 250.

In this state, the worker swings the main-body portion 210 upward and causes the grounding-portion swing shaft 220 to engage with the engaging portion 330 (see FIG. 38). This enables the main-body portion 210 to be held in the storage position.

In this manner, because the stand 200 of one or more embodiments does not require detaching or attaching a component (such as a fixing pin for regulating the swinging of the main-body portion 210) when switching between the storage position and the supporting position, work of switching positions can be performed easily. Moreover, because component detachment and attachment are unnecessary, misplacement of such a component also does not arise.

Described below is swinging of the front loader 20 being permitted in a state where the stand 200 is switched to the supporting position.

As illustrated in FIG. 44, the holding portion 216 (and the second guiding portion 215b) that engages with the engagement lever 250 in the supporting position is formed to extend substantially perpendicular to the longitudinal direction of the main-body portion 210. This enables the engagement lever 250 to move somewhat in the holding portion 216 along the direction wherein the holding portion 216 extends.

In this manner, because movement of the engagement lever 250 is permitted in the supporting position, an attitude of the front loader 20 removed from the vehicle body 1 can be slightly changed. Specifically, a back portion of the front loader 20 (subframe unit 500) can be moved (swung) slightly up and down with a front portion (bucket 400) as a fulcrum.

In this manner, because up-and-down movement of the subframe unit 500 is permitted, the front loader 20 can be easily detached and attached. With the front loader 20 of one or more embodiments in particular, although the subframe unit 500 moves slightly downward when removed from the vehicle body 1, because this movement is permitted by the stand 200, the front loader 20 can be smoothly removed. Moreover, although the subframe unit 500 moves so as to be lifted when installing the front loader 20 on the vehicle body 1, because this movement is also permitted by the stand 200, the front loader 20 can be smoothly installed.

Described above is the configuration of one stand (the right stand 200) among the pair of right and left stands 200. However, the other stand 200 (the left stand 200) is similarly configured.

Figure 30:
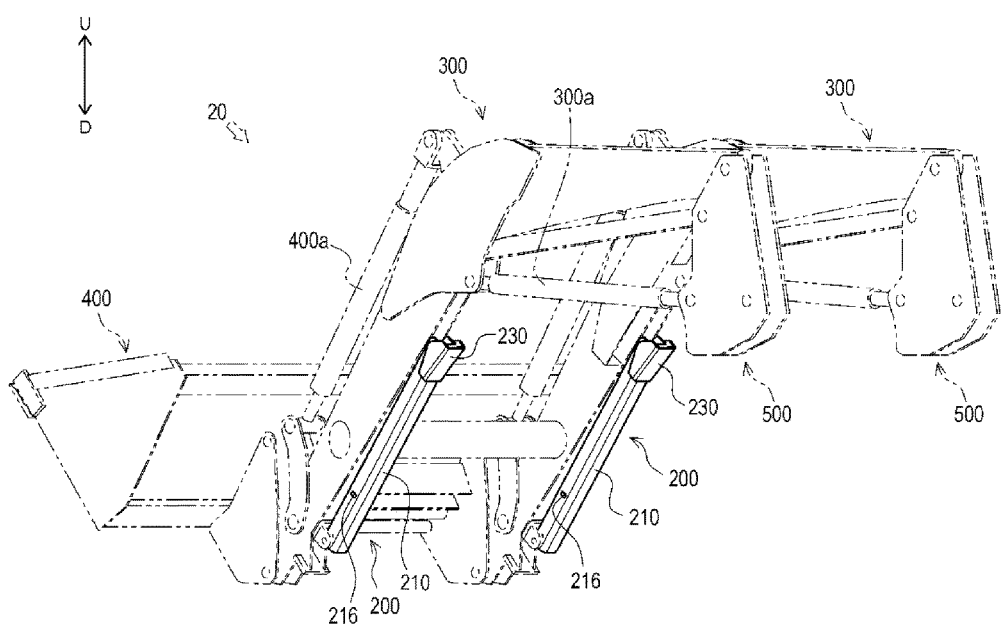
FIG. 30 is a left-back perspective view illustrating the front loader equipped with a stand according to one or more embodiments.
Figure 31:
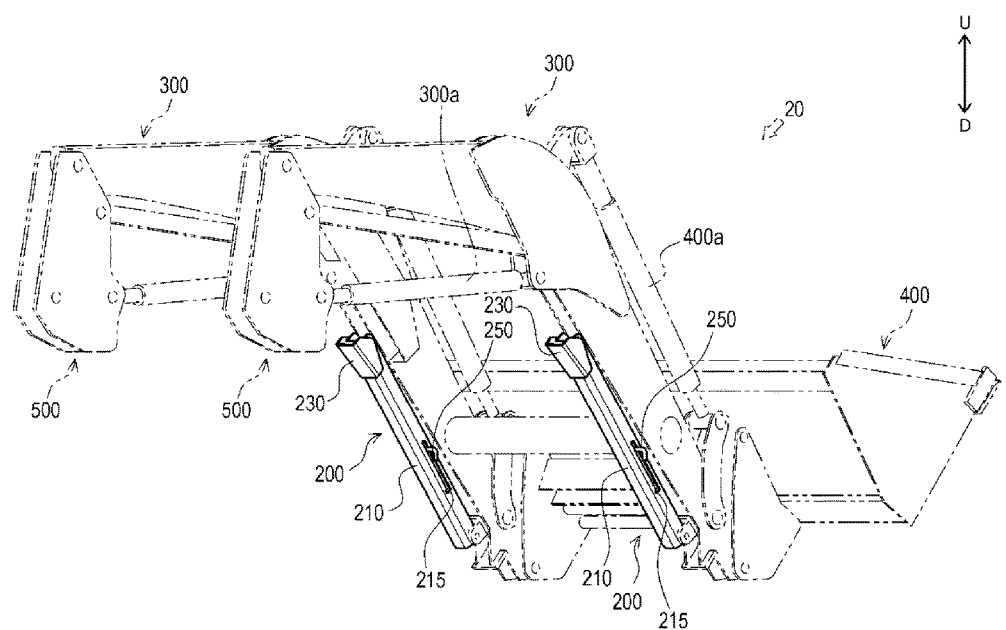
FIG. 31 is a right-back perspective view of one or more embodiments.

Specifically, as illustrated in FIGS. 30 and 31, the pair of left and right stands 200 is configured not to have left-right symmetry but to have the same shape. That is, in both stands 200, the holding portion 216 is formed in the left surface (left surface portion 212) of the main-body portion 210. Moreover, in both stands 200, the guiding portion 215 is formed in a right surface (right surface portion 213) of the main-body portion 210 and the engagement lever 250 protrudes from this guiding portion 215.

In this manner, because both stands 200 are configured to have the same shape, the state of the stands 200 can be easily confirmed. Specifically, as illustrated in FIG. 30, the worker can confirm the holding portions 216 of the left and right stands 200 at once by viewing the left and right stands 200 from the left side of the vehicle body 1 (front loader 20). This enables confirmation at once whether the engagement levers 250 are inserted into the holding portions 216—that is, whether the stands 200 are in the supporting position. Moreover, as illustrated in FIG. 31, the worker can confirm the guiding portions 215 and the engagement levers 250 of the left and right stands 200 by viewing the left and right stands 200 from the right side of the vehicle body 1 (front loader 20). This enables the positions of the engagement levers 250 (and, by extension, the attitude of the stand 200) to be confirmed at once.

Furthermore, by making the pair of left and right stands 200 have the same shape, components of the left and right stands 200 can be standardized, thereby reducing costs.

As above, the stand 200 of the front loader 20 of one or more embodiments is equipped with the main-body portion 210 that is provided on the boom 300 and can swing between the supporting position of being able to support the front loader 20 and the storage position of being stored, a storage-position holding portion (grounding-portion swing shaft 220) that is provided on the main-body portion 210 and can hold the main-body portion 210 in the storage position by engaging with the boom 300, the swinging portion 240 that is provided in a swingable manner on the boom 300, a guided portion (engagement lever 250) that is provided on the swinging portion 240, and the guiding portion 215 that is provided on the main-body portion 210 and regulates the swinging range of the main-body portion 210 by guiding the guided portion.

This configuration enables the stand 200 to be easily used. That is, because no separate fixing member such as a pin for fixing the position of the stand 200 is necessary, the position of the stand 200 can be easily changed. Moreover, by regulating the swinging range of the main-body portion 210, an operability of the stand 200 can be improved.

Furthermore, the swinging portion 240 can change the length thereof from the swing center thereof relative to the boom 300 to the guided portion.

This configuration enables an attitude of the main-body portion 210 to be adjusted according to a shape of the front loader 20, an attachment of the front loader 20, and the like.

Furthermore, the stand 200 is further equipped with a supporting-position holding portion (holding portion 216) that is provided on the main-body portion 210 and can hold the main-body portion 210 in the supporting position by engaging with the guided portion when the main-body portion 210 swings to the supporting position.

Because this configuration enables the main-body portion 210 to be held in the supporting position as well, the front loader 20 can be stably supported.

Furthermore, the guided portion can move in an engaging direction (rightward) of engaging with the supporting-position holding portion and a releasing direction (leftward) of releasing the engagement with the supporting-position holding portion, and further equipped is the biasing member 260 that biases the guided portion in the engaging direction.

This configuration enables the main-body portion 210 to be easily held in the supporting position. That is, the guided portion can be easily engaged with the supporting-position holding portion by the biasing force of the biasing member 260. Moreover, the engagement of the guided portion can be easily released by moving the guided portion in the releasing direction against the biasing force of the biasing member 260.

Furthermore, the supporting-position holding portion is formed as a long hole that extends along the line that does not pass through the swing center of the main-body portion 210 when viewed from a swing-shaft direction of the main-body portion 210.

This configuration can permit up-and-down movement (change in attitude) when detaching and attaching the front loader 20, enabling the front loader 20 to be detached and attached easily.

Furthermore, the guiding portion 215 is equipped with a supporting-time guiding portion (second guiding portion 215b) that is a portion that guides the guided portion when the main-body portion 210 swings to the supporting position and extends along the line that does not pass through the swing center of the main-body portion 210 when viewed from the swing-shaft direction of the main-body portion 210.

This configuration can make up-and-down movement (change in attitude) of the front loader 20 when holding the main-body portion 210 in the supporting position more readily permitted, enabling the front loader 20 to be detached and attached easily.

Furthermore, the stand 200 of the front loader 20 is provided as at least a pair of left and right stands, and the supporting-position holding portions of the pair of left and right stands 200 are respectively formed on the side surfaces of the main-body portion 210 that are in the same direction.

This configuration enables the state of the pair of stands 200 (specifically, whether the main-body portions 210 are held in the supporting position) to be confirmed at once by viewing the pair of stands 200 from the same direction (one side) relative to the front loader 20, enabling confirmation work to be easily performed.

Furthermore, the stand 200 is further equipped with the grounding portion 230 that is provided on the main-body portion 210 and contacts the ground when supporting the front loader 20, wherein the storage-position holding portion connects the grounding portion 230 to the main-body portion 210 in a swingable manner, is provided on the main-body portion 210 in a slidable manner, and, by sliding, can switch between the state of engaging with the boom 300 and the state where engagement with the boom 300 is released.

This configuration enables the stand 200 to be easily used. That is, the main-body portion 210 can be held in the storage position and this holding can be released by a simple operation (sliding the storage-position holding portion). Moreover, a configuration can be simplified by (also) using the storage-position holding portion that holds the main-body portion 210 in the storage position as a swing-shaft portion of the grounding portion.

Furthermore, the front loader 20 is equipped with the stand 200.

Furthermore, the tractor is equipped with the front loader 20.

This configuration enables the stand 200 to be easily used.

Note that the grounding-portion swing shaft 220 is an example of the storage-position holding portion of one or more embodiments of the present invention.

Furthermore, the engagement lever 250 is an example of the guided portion of one or more embodiments of the present invention.

Furthermore, the holding portion 216 is an example of the supporting-position holding portion of one or more embodiments of the present invention.

Furthermore, the second guiding portion 215b is an example of the supporting-time guiding portion of one or more embodiments of the present invention.

Although the embodiments of the present invention are described above, the present invention is not limited to this configuration, and many variations are possible within the scope of the invention as stated in the claims.

For example, although the left and right stands 200 have the same shape in one or more embodiments, these can have shapes with, for example, left-right symmetry.

Furthermore, although one or more embodiments provide two (a pair of left and right) stands 200, a number of stands 200 is not limited.

Furthermore, the shapes of the guiding portion 215 (the first guiding portion 215a and the second guiding portion 215b) and the holding portion 216 (that is, the direction of guiding the engagement lever 250) can be freely changed according to, for example, the shape of the front loader 20.

Furthermore, although one or more embodiments use the shaft of the grounding portion 230 (grounding-portion swing shaft or grounding-member swing shaft 220) as the holding portion (storage-position holding portion) that holds the main-body portion 210 in the storage position as well, the present invention is not limited thereto. That is, the shaft of the grounding portion 230 and the storage-position holding portion can be provided separately.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Vehicle body
20 Front loader

200 Stand
210 Main-body portion (Main body)
215 Guiding portion (Guiding hole)
215a First guiding portion
215b Second guiding portion
216 Holding portion
220 Grounding-portion swing shaft (Grounding-member swing shaft)
230 Grounding portion (Grounding member)
240 Swinging portion (Swinging member)
250 Engagement lever
260 Biasing member (Biasing spring)

The invention claimed is:

1. A stand of a front loader, comprising:
a main body that is disposed on a boom and swings between a supporting position in which the main body supports a front loader and a storage position in which the main body is stored;
a grounding-member swing shaft that is disposed on the main body and engages with the boom to hold the main body in the storage position;
a swinging member swingably disposed on the boom; and
an engagement lever disposed on the swinging member, wherein
the main body has a guiding hole that guides the engagement lever to regulate a swinging range of the main body,
the main body has a supporting-position holding portion that engages with the engagement lever when the main body swings to the supporting position to hold the main body in the supporting position, and
the guiding hole comprises a supporting-time guiding hole that guides the engagement lever when the main body swings to the supporting position, and extends along the line that does not pass through the swing center of the main body when viewed from the swing-shaft direction of the main body,
the main body has a supporting-position holding portion that engages with the engagement lever when the main body swings to the supporting position to hold the main body in the supporting position,
the guiding hole comprises a supporting-time guiding hole that guides the engagement lever when the main body swings to the supporting position, and extends along the line that does not pass through the swing center of the main body when viewed from the swing-shaft direction of the main body, and
the supporting-time guiding hole is a through hole in a side surface of the main body.

2. The stand of a front loader of claim 1, wherein
a length of the swinging member changes from a swing center relative to the boom to the engagement lever.

3. The stand of a front loader of claim 1, wherein
the engagement lever moves in an engaging direction to be engaged with the supporting-position holding portion, and moves in a releasing direction to be released from the engagement with the supporting-position holding portion; and
the engagement lever comprises a biasing spring that biases the engagement lever in the engaging direction.

4. The stand of a front loader of claim 3, wherein
the supporting-position holding portion has a long hole extending along a line that does not pass through a swing center of the main body when viewed from a swing-shaft direction of the main body.

5. The stand of a front loader of claim 3, wherein
the stand of a front loader comprises a pair of left and right stands, each having the supporting-position holding portions, and
the supporting-position holding portions of the pair of left and right stands are respectively formed in side surfaces of the main body that are in the same direction.

6. A front loader, comprising:
the stand of a front loader of claim 1.

7. A work vehicle, comprising the front loader of claim 6.

8. The stand of a front loader of claim 1, wherein
the main body comprises a grounding member that contacts a ground when supporting the front loader; wherein
the grounding-member swing shaft swingably connects the grounding member to the main body, and is slidably disposed on the main body so as to slide to switch between a state of engaging with the boom and a state of being released from the engagement with the boom.

* * * * *